US012753061B2

(12) United States Patent
Ray et al.

(10) Patent No.: US 12,753,061 B2
(45) **Date of Patent: *Oct. 6, 2026**

(54) APPARATUS, SYSTEM AND METHOD FOR FILLING A BEVERAGE CONTAINER

(71) Applicant: CRAFT STANDARD ENTERPRISES, INC., Fayetteville, AR (US)

(72) Inventors: William Ray, Fayetteville, AR (US); Don Ray, Fayetteville, AR (US); Benjamin Simon, Dallas, TX (US); Robert Cardoze, Fayetteville, AR (US); Nick Marcolini, Fayetteville, AR (US); Bora Gulari, Fayetteville, AR (US)

(73) Assignee: CRAFT STANDARD ENTERPRISES, INC., Fayetteville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/008,942

(22) Filed: Jan. 3, 2025

(65) Prior Publication Data

US 2026/0116732 A1 Apr. 30, 2026

Related U.S. Application Data

(60) Continuation of application No. 18/390,467, filed on Dec. 20, 2023, now Pat. No. 12,209,006, which is a (Continued)

(51) Int. Cl.

| | |
|---|---|
| ***B67C 3/34*** | (2006.01) |
| ***B67D 1/08*** | (2006.01) |
| ***C12G 3/04*** | (2019.01) |

(52) U.S. Cl.
CPC .............. *B67C 3/34* (2013.01); *B67D 1/0805* (2013.01); *B67D 1/0835* (2013.01); *C12G 3/04* (2013.01); *B67D 2001/0822* (2013.01)

(58) Field of Classification Search
CPC ........... B67C 3/30; B67C 3/34; B67D 1/0805; B67D 1/0835; B67D 2001/0822
See application file for complete search history.

(56) References Cited

U.S. PATENT DOCUMENTS

| | | | | |
|---|---|---|---|---|
| 55,941 A | 6/1866 | Whitney | B67C 11/02 | 141/297 |
| 194,508 A | 8/1877 | Aenis | B67D 1/0832 | 137/212 |

(Continued)

FOREIGN PATENT DOCUMENTS

| | | |
|---|---|---|
| GB | 606173 | 8/1948 |
| GB | 606173 A | 8/1948 |

(Continued)

OTHER PUBLICATIONS

PCT Notification of Transmittal of the International Search Report and the Written Opinion of the International Searching Authority, or the Declaration, issued from the International Searching Authority, mailed on Dec. 6, 2021, 22 pages.

(Continued)

*Primary Examiner* — Nicolas A Arnett
(74) *Attorney, Agent, or Firm* — Hoffman Warnick LLC

(57) ABSTRACT

Various embodiments include a filling apparatus that can be connected to a valve on a keg, such as a Sankey-D valve, and can be used to pour alcohol and other liquids into the keg, which may be pre-filled with a non-alcoholic drink mix. The filling apparatus has an upper structure which is coupled to a lower portion configured to mate with a keg valve. The filling apparatus may be designed to depress portions of the keg valve to allow for both filling and venting of the keg (Continued)

simultaneously. The filling apparatus may further be designed with features to prevent liquid escape during degassing of the keg. The filling apparatus may include a Sankey-D coupler or a coupler with a probe portion as the lower body portion.

16 Claims, 50 Drawing Sheets

Related U.S. Application Data division of application No. 17/453,475, filed on Nov. 3, 2021, now Pat. No. 11,891,292, which is a continuation-in-part of application No. 17/459,734, filed on Aug. 27, 2021, now Pat. No. 11,511,986, which is a continuation-in-part of application No. 17/365,833, filed on Jul. 1, 2021, now Pat. No. 11,834,317, which is a continuation-in-part of application No. 17/301,458, filed on Apr. 2, 2021, now Pat. No. 11,725,168.

(60) Provisional application No. 63/201,009, filed on Apr. 8, 2021, provisional application No. 63/047,237, filed on Jul. 1, 2020.

(56) References Cited

U.S. PATENT DOCUMENTS 2,539,349 A * 1/1951 Giles .................... B67D 1/0832 222/400.7
3,231,154 A * 1/1966 Johnston .............. B67D 1/0832 222/400.7
3,357,602 A * 12/1967 Sichler ................. B67D 1/0832 137/853
3,439,844 A * 4/1969 Johnston .............. B67D 1/0832 222/400.7
3,712,514 A * 1/1973 LeBlanc ............... F25D 31/006 222/626
3,776,260 A 12/1973 Ruddick .............. B67D 1/0832 137/212
3,866,626 A 2/1975 Johnston .............. B67D 1/0831 141/54
4,494,585 A * 1/1985 Waldecker ............. B67C 11/00 141/297
4,717,048 A * 1/1988 Stenger ................ B67D 1/0832 137/320
4,728,010 A * 3/1988 Johnston .............. B67D 1/0832 137/212
4,823,848 A 4/1989 Sentmore, Sr. ......... B67C 11/00 141/334
4,856,568 A 8/1989 Murphy .................. B67C 11/02 141/382
D306,951 S 4/1990 Brandstrom ................. D23/200
5,389,253 A 2/1995 Cicconi .................. B01D 29/23 210/473
5,921,296 A 7/1999 Porter ..................... B67C 11/02 141/331
6,142,193 A 11/2000 Sanders .................. B67C 11/02 141/331
6,308,869 B1 10/2001 Simpson .............. B67D 1/0847 222/542
6,425,424 B1 7/2002 Ellis Calvo ............. B67C 11/02 141/331
9,643,829 B2 5/2017 Ahlstroem ........... B67D 1/0835
9,828,227 B2 * 11/2017 Dalton ................... G05D 16/08
10,252,901 B2 4/2019 McCrea .................. C12C 5/026
10,266,380 B2 * 4/2019 Fickert ....................... B67C 3/34
11,465,894 B2 10/2022 Corstanje ............. B67D 1/0848
11,511,986 B2 * 11/2022 Ray ...................... B67D 7/0294
11,518,664 B2 * 12/2022 Matheyka ............... B67C 3/007
11,518,668 B2 12/2022 Caputo ................ B67D 1/0841
11,725,168 B2 * 8/2023 Ray ........................... B67C 3/34 222/400.7
11,807,513 B2 11/2023 Ray ...................... B67D 1/0016
11,834,317 B2 * 12/2023 Ray ...................... B67D 1/1405
11,891,292 B2 * 2/2024 Ray ........................... B67C 3/34
12,209,006 B2 * 1/2025 Ray ........................... B67C 3/34
D1,078,038 S 6/2025 Chastain et al.
2003/0127469 A1 7/2003 Terry ....................... B65D 1/06 222/158
2005/0224138 A1 10/2005 Guthrie ................... F16L 11/15 141/340
2005/0279777 A1 * 12/2005 Taguchi .................... B67C 3/34 222/399
2006/0118574 A1 * 6/2006 Anderson ................. B67C 3/32 222/1
2007/0169834 A1 * 7/2007 Monzel ..................... B67C 3/34 141/18
2007/0284332 A1 12/2007 Gowans ............... B65D 47/242 215/44
2009/0178729 A1 7/2009 Ben Zur ................ B67C 11/04 141/331
2012/0097556 A1 4/2012 Gascoine ............. B65D 1/0223 206/216
2012/0111450 A1 5/2012 Claps ................ B01F 35/75465 141/297
2013/0327774 A1 12/2013 Farias, Jr. .............. B65D 83/06 220/288
2015/0291407 A1 10/2015 Fox ......................... B67C 11/02 141/339
2016/0152463 A1 * 6/2016 Ware .................... B67D 1/0802 222/1
2017/0088408 A1 * 3/2017 Fickert ...................... B67C 3/34
2022/0002132 A1 * 1/2022 Ray ...................... B67D 1/1277
2022/0002138 A1 * 1/2022 Ray ...................... B67D 1/1277
2022/0002141 A1 * 1/2022 Ray ........................... B67C 3/34
2022/0055880 A1 * 2/2022 Ray ........................... B67C 3/34

FOREIGN PATENT DOCUMENTS

GB 998004 7/1965
GB 998004 A 7/1965
GB 1115223 5/1968
GB 1115223 A 5/1968
WO WO-2004063087 A1 7/2004 ........... B67D 1/0832
WO 2019110218 A1 6/2019

OTHER PUBLICATIONS

Westby, G., Negroni in Barrel, YouTube.com, Jun. 4, 2013, https://www.youtube.com/watch?v=I6PDYtZ7YoU, 1 page.
Man Skirt Brewing, Filling kegs with Hard Seltzer at Man Skirt Brewing, YouTube.com, May 10, 2020, https://www.youtube.com/watch?v=ROfH5nUvUzk, 1 page.
Invitation to Pay Additional Fees And, Where Applicable, Protest Fee (Form PCT/ISA/206) issued from the International Searching Authority to International Application No. PCT/US21/70354 mailed on Jun. 2, 2021, 14 pages.
PCT International Search Report and Written Opinion for International Application No. PCT/US21/48251, dated Dec. 10, 2021, 13 pages.
'Instructional Video %E2%80%93 For Margarita, Mule, Paloma, and Mojito _v2' (Benjamin Simon) Jan. 27, 2021 [online] retrieved from <URL: https://vimeo.com/505378455> 2021.
'D System Keg Valve' (MicroMatic) May 7, 2019 [online] retrieved from <URL:https:/www.californiacraftbeer.com/wp-content/uploads/2019/05/D-System-Keg-Valves-Safety-and-Quality-Assurance-for-your-Draft-Beer.pdf> 2019.
'Performance Guidelines For Refillable Kegs' (Brewers Association) Mar. 19, 2014 [online] retrieved from <URL:https://www.brewersassociation.org/attachments/0001/4565/Performance_Guidelines_for_Refillable_Kegs.pdf> 2014.
'Instructional Video %E2%80%93 For Margarita, Mule, Paloma, and Mojito _ v2' (Benjamin Simon) Jan. 27, 2021 (Jan. 27, 2021) [online] retrieved from <U RL: https ://vimeo.co m/505378455> entire document.
'D System Keg Valve' (Micro Matic) May 7, 2019 (May 7, 2019) [online] ret rieved from <URL:https://www.ca lifo miac ra flbee r.co

(56) References Cited

OTHER PUBLICATIONS m/wp-conten Vuploa ds/201 9/05/D-Sys te rn-Keg- Valves-Sa fe ty-a nd-Qua lity-Assura nce- for- your-D raft- Bee r.pdf> en tire document, espe cia lly p. 6, 13, 15.

'Performance Guide li ne.s For Refillable Kegs' (Brewers Association) Mar. 19, 2014 (Mar. 19, 2014)[online ] retrieved from <UR L:https ://www.brewe rsass ocla1lon .org/a ttachme nts/0 001/4565/ Perfo rmance_Gu_ fde li nes_for_Re filla ble_ Kegs . pdf> entire document, especially p. 9.

PCT International Preliminary Report on Patentability for International Application No. PCT/US21/70354, dated Jan. 12, 2023, 10 pages.

Notification of Transmittal of the International Search Report and the Written Opinion of the International Searching Authority, or the Declaration issued to International Application No. PCT/US21/ 70354 mailed Sep. 14, 2021, 13 pages.

PCT International Searching Authority, PCT Invitation To Pay Additional Fees And, Where Applicable, Protest Fee, International Application No. PCT/US21/70354, Jun. 2, 2021, pp. 1-3.

PCT Search Report and Written Opinion for International Application No. PCT/US21/70354, dated Sep. 14, 2021, 13 pages.

PCT International Search Report and Written Opinion for International Application No. PCT/US21/59870, dated Mar. 24, 2022, 16 pages.

Notification of Transmittal of the International Search Report (Form PCT/ISA/220) and the Written Opinion of the International Searching Authority (Form PCT/ISA/237), or the Declaration , issued from the International Searching Authority to International Application No. PCT/US21/40186, mailed on Dec. 6, 2021, 20 pages.

* cited by examiner

700

APPARATUS, SYSTEM AND METHOD FOR FILLING A BEVERAGE CONTAINER

CROSS-REFERENCE TO RELATED APPLICATIONS

This application is a continuation filing of, and claims priority to co-pending U.S. patent application Ser. No. 18/390,467, filed Dec. 20, 2023, entitled, "Apparatus, System and Method for Filling a Beverage Container," which is a divisional filing of, and claims priority to U.S. patent application Ser. No. 17/453,475 (now U.S. Pat. No. 11,891, 292), filed Nov. 3, 2021, entitled, "Apparatus, System and Method for Filling a Beverage Container," which claims priority to 63/201,009, filed Apr. 8, 2021, entitled "Apparatus, System and Method for Filling a Beverage Container." U.S. patent application Ser. No. 17/453,475 also claims priority to and is a continuation-in-part of U.S. application Ser. No. 17/459,734, filed Aug. 27, 2021, entitled "Apparatus, System and Method for Filling a Beverage Container," which claims priority to and is a continuation-in-part of U.S. application Ser. No. 17/365,833, filed Jul. 1, 2021, entitled "Apparatus, System and Method for Filling a Beverage Container," which claims priority to and is a continuation-in-part of U.S. application Ser. No. 17/301,458, filed Apr. 2, 2021, entitled "Apparatus, System and Method for Filling a Beverage Container," which claims priority U.S. application No. 63/047,237, filed Jul. 1, 2020, entitled "Keg Spiker." The contents of these priority applications are hereby incorporated by reference in their entirety.

FIELD OF THE INVENTION

The present invention relates generally to an apparatus, system and process for filling a beverage container, and more particularly to system and method for filling a keg with liquid using an apparatus that connects to a conventional keg valve.

BACKGROUND

Bars, restaurants and other establishments that serve alcoholic beverages commonly have serving equipment that includes refrigerators, couplers, regulators, lines and taps for beer kegs. Often, a bar will offer a large selection of beers, each with its own line and customized tap. One of the most common configurations includes a Sankey-D coupler, which is a widely used coupling device in bars and restaurants for beer kegs.

Although this equipment has provided high efficiencies in serving beer, the same is not true for mixed drinks. Alcoholic beverage laws prohibit the sale of spirits in containers larger than 1.75 liters; hence there are no kegs or taps for mixed drinks. At the same time, the preparation of mixed drinks requires skill and experience to know the various constituents of the mixed drink, the relative quantities, and to consistently mix the drink in the right proportions, often in a crowded, busy environment. These factors result in significant losses, inefficiencies and decreased quality arising from inconsistent and inaccurate mixing by bartenders of different skill levels as well as the time it takes even a skilled bartender to combine all the constituents of the mixed drink.

In addition to the prohibition on selling spirits in containers larger than 1.75 liters, there is an additional challenge that has prevented the use of kegs to serve mixed drinks on tap. Kegs are generally filled with a keg filling device that uses an industrial, pressurized system to fill the keg. Conventional keg filling devices require large, high volume tanks and pressure to fill the keg through a coupling device such as a Sankey-D coupler. For example, an industrial filling equipment uses a filling Sankey with a larger internal opening to allow liquid to flow faster when filling than a normal Sankey used for dispensing. These conventional keg filling devices further typically take a large amount of space and fill the keg through a liquid dispensing tube of the coupler. Setting up such conventional keg filling devices requires large spaces and an investment in heavy equipment to install tanks. Further, the conventional keg filling devices cannot be transported without large trucks and cannot be used without large tanks and pressure. Hence, there is no easy way to fill kegs without the use of large, heavy, expensive equipment.

These and other drawbacks have greatly inhibited the efficient serving of mixed drinks at bars, restaurants and other establishments.

SUMMARY

According to an embodiment, an apparatus, system, and method is provided that enables bars, restaurants, and other establishments to serve mixed drinks and craft cocktails on draft using a standard beer keg system, such as a Sankey (or Sanke) keg and related Sankey coupler, lines, and taps. The Sankey keg may include the Sankey-D valve, for example, or other Sankey valves, such as Sankey S, A, G, U, or M type systems. Exemplary embodiments may use a Sankey-D valve as an example; however, this is meant to be non-limiting.

According to one example, a keg having a Sankey-D valve is partially filled with a non-alcoholic, liquid cocktail mix. The keg may be of any type, such as a rubber barrel, beveled barrel, half barrel, slim quarter, quarter barrel, Cornelius keg, and sixth barrel. It should be appreciated that the amount of liquid (e.g., mix and alcohol) will be adjusted based on the keg size. Since the mix is non-alcoholic, there is no prohibition on the use of a keg, such as a standard, 30-liter Sankey-D type keg. In one particular embodiment, a 30-liter keg is partially filled with 21 liters of liquid cocktail mix (e.g., margarita mix). The keg is then shipped to a bar, restaurant or other establishment that serves alcoholic drinks. A keg filling apparatus, which will be described in detail below, is also provided to the bar, restaurant or other establishment. The bartender installs the keg-filling apparatus on the keg valve, degasses the keg, and pours alcohol into the keg via the keg-filling apparatus. The keg-filling apparatus allows the keg to be filled with the alcohol using only gravity, rather than a large, pressurized industrial filling system. Once the specified amounts and types of alcohol (e.g., 9 liters total of one or more spirits) have been poured into the keg and mixed with the cocktail mix, the keg filling apparatus is removed, the contents in the keg are mixed and the keg is ready to be installed in the Sankey-D tap system, just like a beer keg.

Another embodiment includes an apparatus for filling a container (e.g., a keg) with liquid, wherein the container includes a valve that seals the container and a locking recess to receive the filling apparatus. The valve may include multiple parts such as a ball valve and a venting valve that surrounds the ball valve. The filling apparatus may comprise an upper hollow body (e.g., in the shape of a funnel) having a top opening and a bottom opening, the top opening enabling a liquid to be poured into the top opening. The filling apparatus may also comprise a lower hollow body having a valve that is joined to a Sankey-D coupler. The lower hollow body may include a valve or other structure to block liquid flow from the funnel. Specifically, exemplary embodiments may use a structure to open (e.g., depress) the ball valve and the ring valve. The ring valve allows for gas to escape or vent from the container. The ball valve allows for the addition of liquid (e.g., alcohol) to be added to the container. The filling apparatus valve or other structure, may be used to stop liquid flow into the container and block liquid from being vented upward through the funnel when the keg is pressurized (i.e., prior to degassing). The ring valve may be depressed first (that is, prior to the ball valve being depressed) to allow for degassing of the keg prior to the addition of liquid to the keg. After degassing, the valve or other structure is actuated to open a liquid pathway through the filling apparatus to the keg.

According to another embodiment, an apparatus for filling a container (e.g., a keg) with liquid is provided, wherein the container includes a valve that seals the container and a locking recess to receive the filling apparatus. The valve may include multiple parts such as a ball valve and a venting valve that surrounds the ball valve. The filling apparatus may comprise an upper hollow body (e.g., in the shape of a funnel) having a top opening and a bottom opening, the top opening enabling a liquid to be poured into the top opening. The filling apparatus may also comprise a lower hollow body joined to a lower end of the upper hollow body. The lower hollow body may include a valve to block liquid flow from the funnel, a locking ring that locks configured to mate with the container and lock the apparatus into place, a probe that engages with the valve of the container to open the parts of the valve, and a vent pathway for gas. Specifically, exemplary embodiments may open (e.g., depress) the ball valve and the ring valve. The ring valve allows for gas to escape or vent from the container. The ball valve allows for the addition of liquid (e.g., alcohol) to be added to the container. The filling apparatus valve may be used to stop liquid flow into the container and block liquid from being vented upward through the funnel when the keg is pressurized (i.e., prior to degassing).

According to another embodiment, an apparatus for filling a keg with liquid is provided, the keg comprising a valve that seals the container and a locking recess to receive the apparatus, the apparatus including an upper hollow body having a top opening and a bottom opening and tapering from the top opening to the bottom opening, the top opening enabling a liquid to be poured into the top opening and subsequently flow downward, by gravity, to exit the bottom opening; a lower body, joined to the upper hollow body, having a coupling ring, a valve assembly and a probe assembly; the coupling ring configured to engage with the locking recess on the keg; the valve assembly comprising a cylindrical structure having a ball valve located therein, the ball valve comprising an open and a closed position that regulate liquid flow therethrough; the probe assembly configured to engage with the valve when the coupling ring is engaged and comprising a first portion to depress a liquid ball valve portion of the valve and a second portion to depress a ring valve portion of the valve, wherein depressing the liquid ball valve allows for liquid flow from the apparatus into the container when the ball valve is in the open position and wherein depressing the ring valve allows for venting of gas from the keg due to displacement by the liquid flow, the second portion comprising a plurality of gas venting pathways to the atmosphere.

According to an embodiment, the apparatus may have a deflector portion inside of the upper hollow body to prevent liquid from escaping through the apparatus during degassing of the keg prior to filling with alcohol. This deflector portion may be used in place of the valve described above to prevent liquid from escaping. Specifically, the embodiment may including an apparatus for filling a keg with liquid, the keg comprising a valve that seals the keg and a locking recess to receive the apparatus, the apparatus having: an upper hollow body having a top opening and a bottom opening and tapering from the top opening to the bottom opening, the top opening enabling a liquid to be poured into the top opening and subsequently flow downward, by gravity, to exit the bottom opening, the upper hollow body further having a deflector structure located below the top opening and above the bottom opening, the deflector structure further having a sloped underside configured to deflect an impinging liquid stream back downward toward the bottom opening; a lower portion, fixedly joined to the upper hollow body, having a coupling ring, a flange and a probe assembly; the coupling ring configured to engage with the locking recess on the keg; the probe assembly configured to engage with the valve when the coupling ring is engaged and having a first portion to depress a liquid ball valve portion of the valve and a second portion to depress a ring valve portion of the valve, wherein depressing the liquid ball valve allows for liquid flow from the apparatus into the container when the ball valve is in the open position and wherein depressing the ring valve allows for venting of gas from the keg due to displacement by the liquid flow, the second portion comprising a plurality of gas venting pathways to the atmosphere; and the flange covering the coupling ring and the probe assembly, the flange being configured to direct liquid vented during engagement of the coupling ring and the probe assembly downward onto the keg.

According to another embodiment, the apparatus may have a cap or cover configured to mater with the top opening of the upper hollow body and prevent liquid from escaping through the apparatus during degassing of the keg prior to filling with alcohol. The cap or cover may be removable attached to the top opening, which has a mechanism for securing the cap or cover such that it will not be dislodged during degassing of the keg. This cap or cover may be used in place of the valve described above to prevent liquid from escaping.

According to an embodiment, the apparatus may include a sliding piston inside of apparatus that is configured to open and close the liquid pathway though the apparatus as well as actuate the liquid or ball valve on the keg. The sliding piston may prevent liquid from escaping through the apparatus during degassing of the keg prior to filling with alcohol. Specifically, the embodiment may including an apparatus for filling a keg with liquid, the keg comprising a valve that seals the keg and a locking recess to receive the apparatus, the apparatus having: an upper hollow body having a top opening and a bottom opening and tapering from the top opening to the bottom opening, the top opening enabling a liquid to be poured into the top opening and subsequently flow downward, by gravity, to exit the bottom opening; the sliding piston structure being located centrally in the upper portion and extending downward though a lower portion; the sliding piston being movable between an upper and a lower position; the upper position being one in that the liquid pathway though the apparatus is closed and the ball valve of the keg is not actuated by the apparatus, even with the apparatus secured to the keg valve structure; the lower position being one in that the lower portion of the sliding piston depresses the ball valve and creates a liquid pathway through the apparatus. The upper hollow body is fixedly joined to the lower body, having a coupling ring and a probe assembly; the coupling ring configured to engage with the locking recess on the keg; the probe assembly configured to engage with the ring valve when the coupling ring is engaged and having a first portion to depress a ring valve portion of the valve, to allow for a gas exit pathway, the ring valve allowing for venting of gas from the keg due to displacement by the liquid flow.

According to another embodiment, the invention relates to a method for distributing mixed drinks. The method may comprise providing a keg containing a non-alcoholic mix of liquids, wherein the mix is designed to be converted to a mixed drink by addition of alcohol, the quantity of mix in the keg is predetermined to allow for the addition of a predetermined quantity of the alcohol into the keg to complete the mixed drink; and the keg includes a valve such as a Sankey-D valve that is designed to connect to a coupler used to dispense beverages from the keg.

According to another embodiment, the invention relates to a method for preparing mixed drinks. The method may comprise receiving a keg containing a non-alcoholic mix of liquids, wherein (a) the mix is designed to be converted to a mixed drink by addition of alcohol; (b) the quantity of the mix in the keg is predetermined to allow for the addition of a predetermined quantity of the alcohol into the keg to complete the mixed drink; and (c) the keg comprises a valve, e.g., a Sankey-D valve, designed to be connected to a coupler through which the mixed drink is dispensed. The method may also comprise using an apparatus to pour the alcohol into the keg. The method may also comprise mixing the mix with the alcohol to complete the mixed drink in the keg; connecting the keg to a coupler; and dispensing the mixed drink through a tap connected to the coupler.

According to another embodiment, a method of distributing mixed drinks includes: providing a keg containing a non-alcoholic mix of liquids, wherein the mix is designed to be converted to a mixed drink by addition of alcohol; a quantity of mix in the keg is predetermined to allow for the addition of a predetermined quantity of the alcohol into the keg to complete the mixed drink; and the keg comprises a valve that is designed to connect to a coupler used to dispense beverages from the keg; providing an apparatus to engage the keg and for pouring the alcohol into the keg, wherein the apparatus includes an upper hollow body connected a lower portion, the lower portion comprising a probe to displace at least a portion of the valve, and a locking ring to lock the apparatus onto the keg, and actuating at least a portion of the valve to open a liquid pathway though the apparatus to allow the alcohol to be poured into the keg through the upper hollow body and exiting through the lower portion into the keg.

According to another embodiment, a method of preparing mixed drinks includes: receiving a keg containing a non-alcoholic mix of liquids, wherein (a) the mix is designed to be converted to a mixed drink by addition of alcohol; (b) the quantity of the mix in the keg is predetermined to allow for the addition of a predetermined quantity of the alcohol into the keg to complete the mixed drink; and (c) the keg comprises a valve designed to be connected to a coupler through which the mixed drink is dispensed; and using an apparatus to pour the alcohol into the keg, wherein the apparatus includes an upper hollow body connected to a lower portion, the lower portion comprising a locking ring to lock the apparatus onto the keg, a probe to displace at least a portion of the valve, allowing gas to escape from the keg and allowing the alcohol to be poured into the keg through the upper hollow body and exit into the keg through a lower extremity of the lower portion.

According to another embodiment, an apparatus for pouring alcohol into a keg, includes: an upper hollow body connected to a lower portion, the lower portion comprising a locking ring to lock the apparatus onto the keg, and a probe to displace at least a portion of the valve, allowing gas to escape from the keg and allowing the alcohol to be poured into the keg through the upper hollow body and exiting through a lower extremity of the lower portion into the keg.

Exemplary embodiments can provide a solution that significantly reduces the time needed to make the most popular craft cocktails and mixed drinks, which, in turn, increases the number of craft cocktails and mixed drinks sold by the bar, restaurant, or other establishment. For alcoholic beverage distributors, increased throughput at bars, restaurants and other establishments results in an increase in the quantity of spirits sold. Furthermore, embodiments of the invention allow bars and restaurants that own standardized beer keg systems, such as the widely-used Sankey-D keg system, to use their existing equipment to serve craft cocktails and mixed-drinks on draft. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Various embodiments of the invention relate to a filling apparatus for a container such as a keg and related processes and systems for using the filling apparatus to add a liquid such as alcohol to the container. The apparatus may be configured to be a hand-held device designed to release air pressure in the keg and also enable filling the keg with additional liquid by gravity. Various embodiments of the invention can overcome the disadvantages described above.

Figure 1:
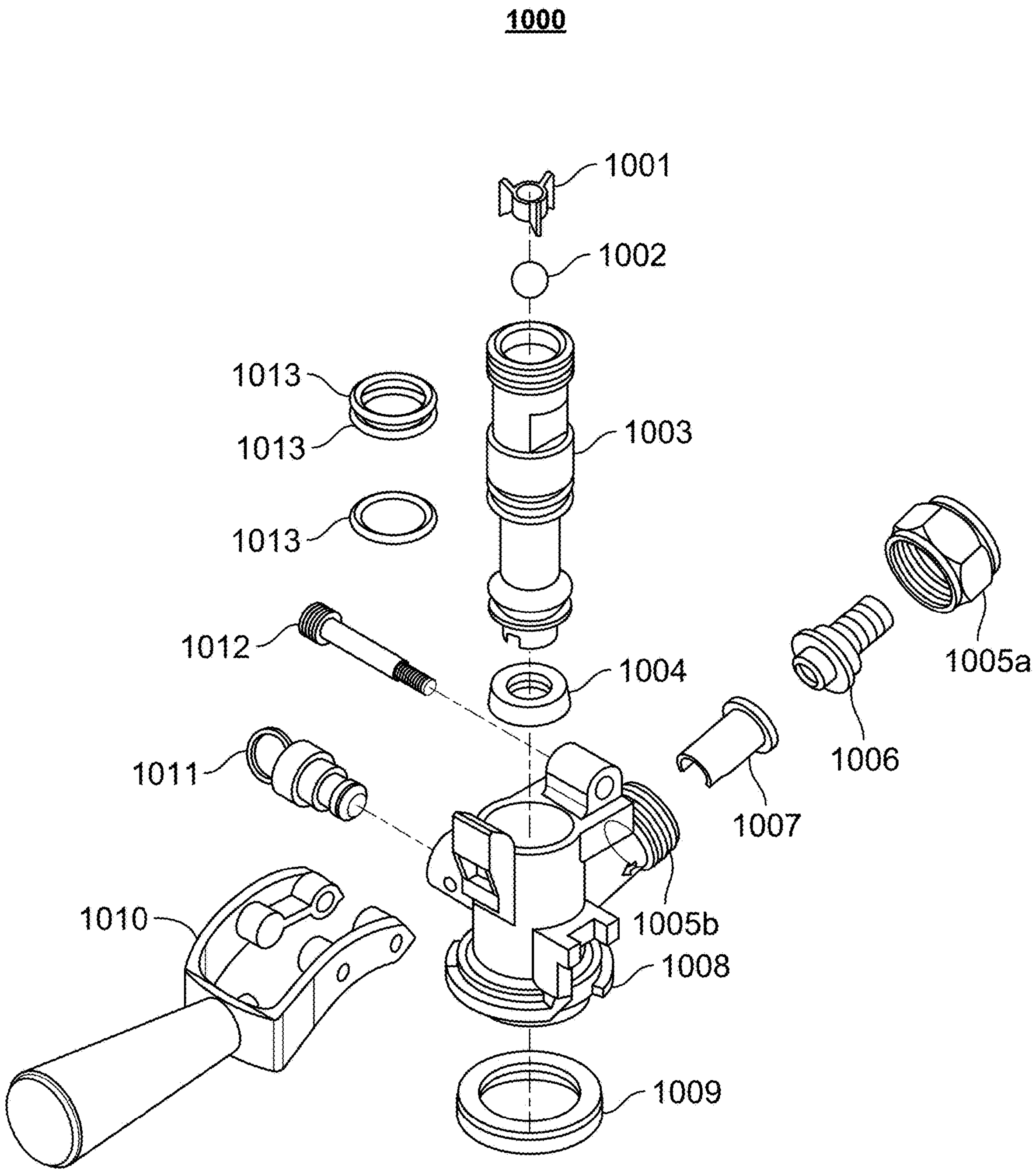
FIG. 1 (Conventional Art)
FIG. 1 illustrates an exemplary Sankey-D coupler (conventional art) that may be used in and with exemplary embodiments.

FIG. 1 illustrates an exemplary conventional Sankey-D coupler 1000 that may be used in exemplary embodiments. This coupler may be attached to a keg after filing the keg using the filling apparatus disclosed herein. The conventional Sankey-D coupler 1000 is used to dispense the mixed drink as conventionally done in a pressurized tap system. The conventional Sankey-D coupler 1000 may comprise a ball retainer 1001, a coupler ball 1002, a probe 1003, a probe seal 1004, a hex nut 1005*a* that mates with threaded portion 1005*b*, a tailpiece 1006 for coupler, a check valve 1007, a coupler body 1008, a bottom seal 1009, a handle assembly 1010, a pressure relief valve 1011, a handle hinge pin 1012, and an O-ring for coupler probe 1003. The coupler body 1008 is designed to mate with the complementary locking threads or teeth of the keg spear valve assembly. The Sankey-D coupler 1000 can be attached to the keg spear valve assembly by placing the coupler onto the valve assembly locking threads or teeth and twisting it to engage the coupler body 1008 with the keg spear valve assembly. Following such engagement, the handle assembly 1010 may be moved to a second position to engage the Sankey-D coupler 1000 probe 1003. The probe 1003 is moved downward within the coupler 1000 to depress the keg spear valve assembly (i.e., the ball valve and the ring valve that are attached to a tube or spear assembly). The Sankey-D coupler, such as that depicted in FIG. 1, once attached to the keg, can serve two functions: 1) it opens both the venting valve and the ball or beer valve simultaneously so that pressure can be added to the top of inside of the keg (using the probe), and 2) the liquid can be released from the keg through the ball valve once the tap is opened on the bar, in a restaurant, and/or at other event venues.

The keg may be designed to have a keg bung in which a valve (e.g., a valve having a ball valve (sometimes referred to as a beer valve) and a ring valve (sometimes referred to as a venting or CO2 valve)) is received. The keg bung may be externally threaded around its exterior circumference. The keg bung may located at the center portion on the upper surface of the keg. This valve may be referred to a Sankey-D valve. The valve may be secured to the keg by the threads surrounding the keg bung to allow for removal. The valve may include a tube that is integrally attached thereto. The tube may be referred to as a spear. The valve and spear may be removable as single piece on metal kegs. In some embodiments, the valve may be manufactured with the keg and be integral to the keg. For example, the valve (and spear) may be integral to PET kegs in a conventional arrangement.

The tube is designed to extend into the keg to allow for liquid flow in or out of the keg. For example, when liquid is added to the keg through the ball valve (e.g., beer valve), the liquid is directed downward through this tube and flows into the keg at the lower portion into the liquid volume in the keg, causing the liquid level in the keg to rise, which in turn displaces gas located above the liquid level. This gas may then exhaust through the venting valve (when it is open) and be directed out to the atmosphere outside of the keg volume. In a typical use of a keg, when liquid is being dispensed from the keg, the venting valve (e.g., CO2 valve) is opened to add pressure to the top of the liquid in the keg, so when the tap is opened at the bar, liquid can flow through the ball valve (also known as a beer valve) out of the keg.

FIGS. 2A, 2B, 2C, 2D, and 2E (collectively referred to as FIG. 2) show a device according to exemplary embodiments. The device 200 may have three primary parts. First, a Sankey-D coupler 202 is located at the lower end of the device. The Sankey-D coupler 202 may be the same as that shown in FIG. 1. Second, the upper portion of the device may include a funnel assembly 204. Third, a valve assembly 206 may be located between the funnel assembly 204 and the Sankey-D coupler 202. The valve assembly 206 may by cylindrical in construction and serve as the joining structure for the funnel assembly and Sankey-D coupler. The valve assembly may be constructed of metal, plastic, polymer, or any other semi-rigid or rigid material which is machinable, moldable, castable or formable with physical properties such that it is rigid and able to maintain its shape and be of sufficient strength and stiffness so as to allow it to functionally perform in the manner described herein.

The valve assembly 206 may have two positions: open and closed. In FIG. 2, the valve assembly 206 is in an open position. This position allows for a fluid path from the funnel through the Sankey-D coupler. The second position closes off that fluid path. The valve assembly 306 may rotate through 90 degrees between the open and closed positions. The valve assembly 206 may be a ball valve. Other types of valves may be used such as a butterfly valve.

The funnel assembly 204 may have an opening 208 at its upper portion and an outlet 210 at its lower portion. The opening 208 may be larger than the outlet 210. The opening 208 may be circular as shown. In various embodiments, the opening 208 may have other shapes, such as polygonal. The funnel assembly 204 may vertically taper down from the opening 208 to the outlet 210. The outlet 210 may be cylindrical and join with the valve assembly 206 at cylindrical portion 212. The valve assembly 206 may join with the Sankey-D coupler 202 at 214 as shown in FIG. 2.

The funnel assembly 204 may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein. The funnel assembly may be of various sizes according to exemplary embodiments. For example, the funnel assembly may be sized to accommodate up one liter of fluid. In other embodiments, the funnel assembly may be of different sizes. For example, funnel assembly may be sufficiently large (e.g., about 5.5 inches wide by about 4.25 inches high) to accommodate a reasonable amount of fluid for flow into the keg to allow for filling of the keg in a minimum of time.

The funnel assembly 204 may be joined to the Sankey-D coupler 202 through the valve assembly 206. In exemplary embodiments, the funnel assembly 204 and the valve assembly 206 may be molded directly onto the Sankey-D coupler 202. Others methods of joining may be used such as threading, welding, gluing, soldering, machining, carving, 3D printing, and so forth. As used herein the term "coupled" is not meant to be limiting and intended to be broadly defined to encompass removable attachments, permanent attachments, fixed attachments, integrated, integral, etc. According to exemplary embodiments, in normal usage, the funnel assembly 204 and valve assembly 206 are not designed to be removed from the Sankey-D coupler 202 and nor is the funnel assembly designed to be detached from the valve assembly 206.

At the base of the Sankey-D coupler 202 are threads 216 configured to engage with complementary threads or teeth on the keg valve structure. The threads 216 may be engaged by positioning them onto the keg threads and twisting the Sankey-D coupler 202 until the threads 216 are fully engaged in order to lock the device 200 in place and create a seal with the keg valve.

Figure 2A:
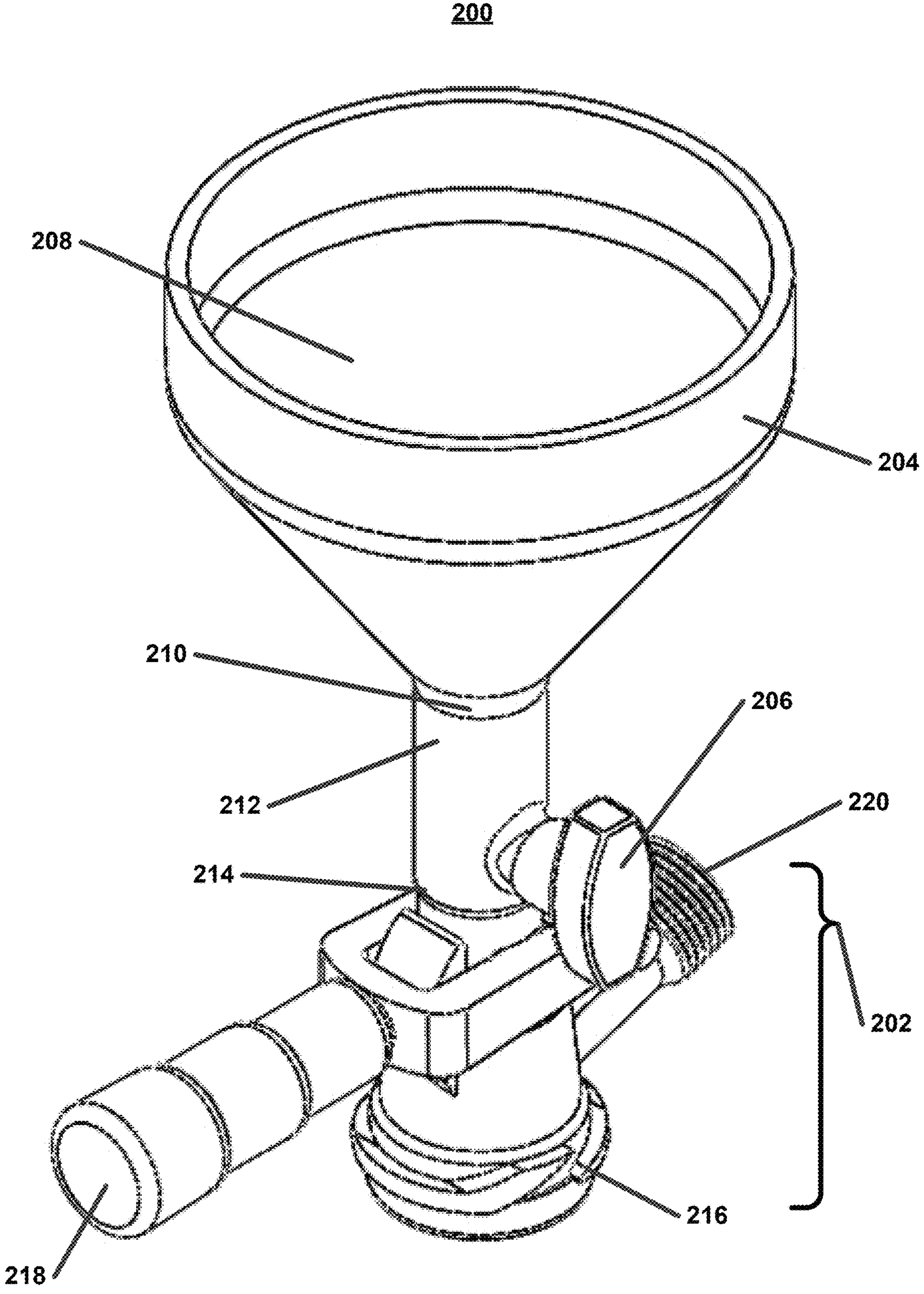
FIG. 2A illustrates a top perspective view of a filling apparatus, according to an embodiment.
Figure 2B:
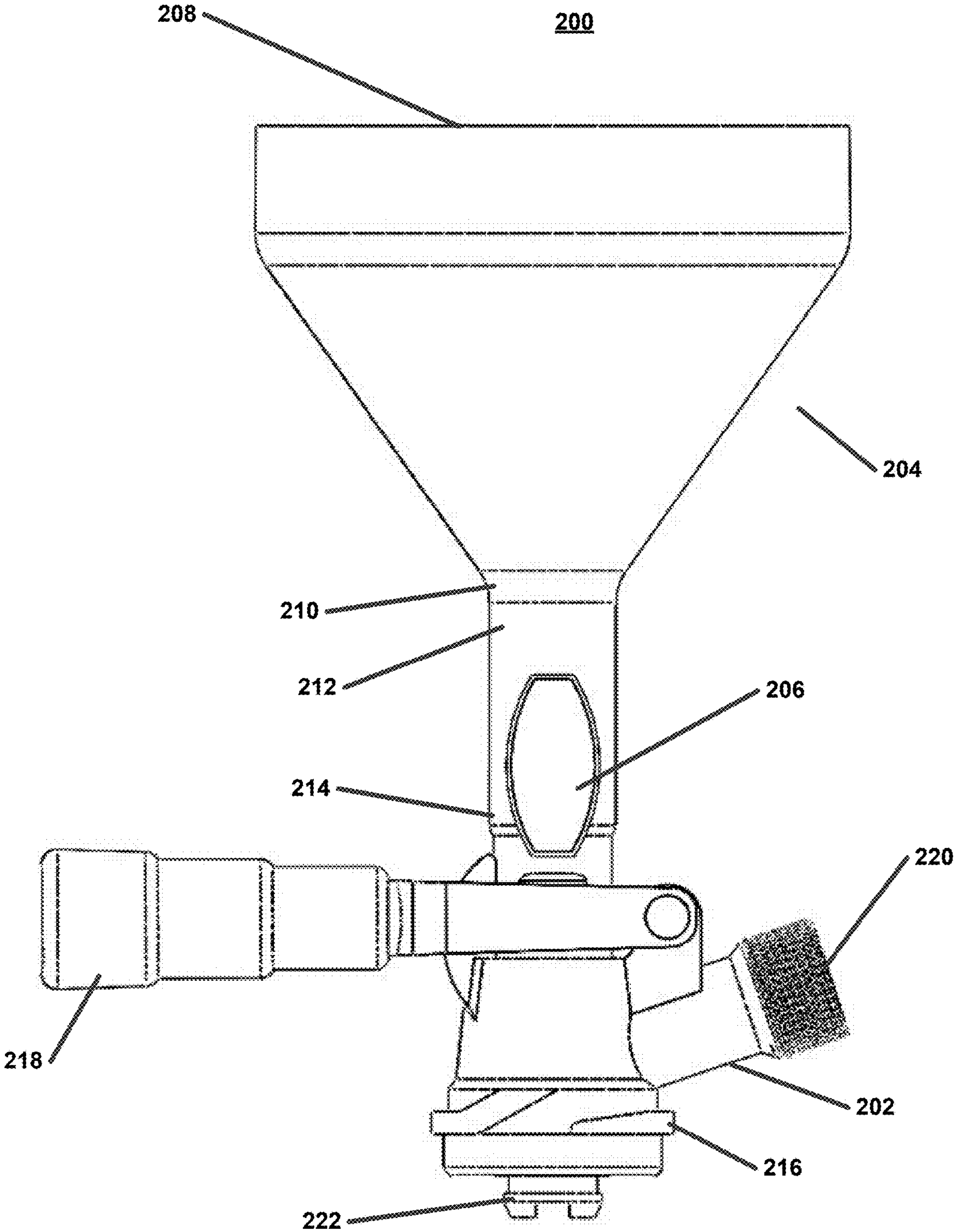
FIG. 2B illustrates a side view of the filling apparatus, according to an embodiment.
Figure 2C:
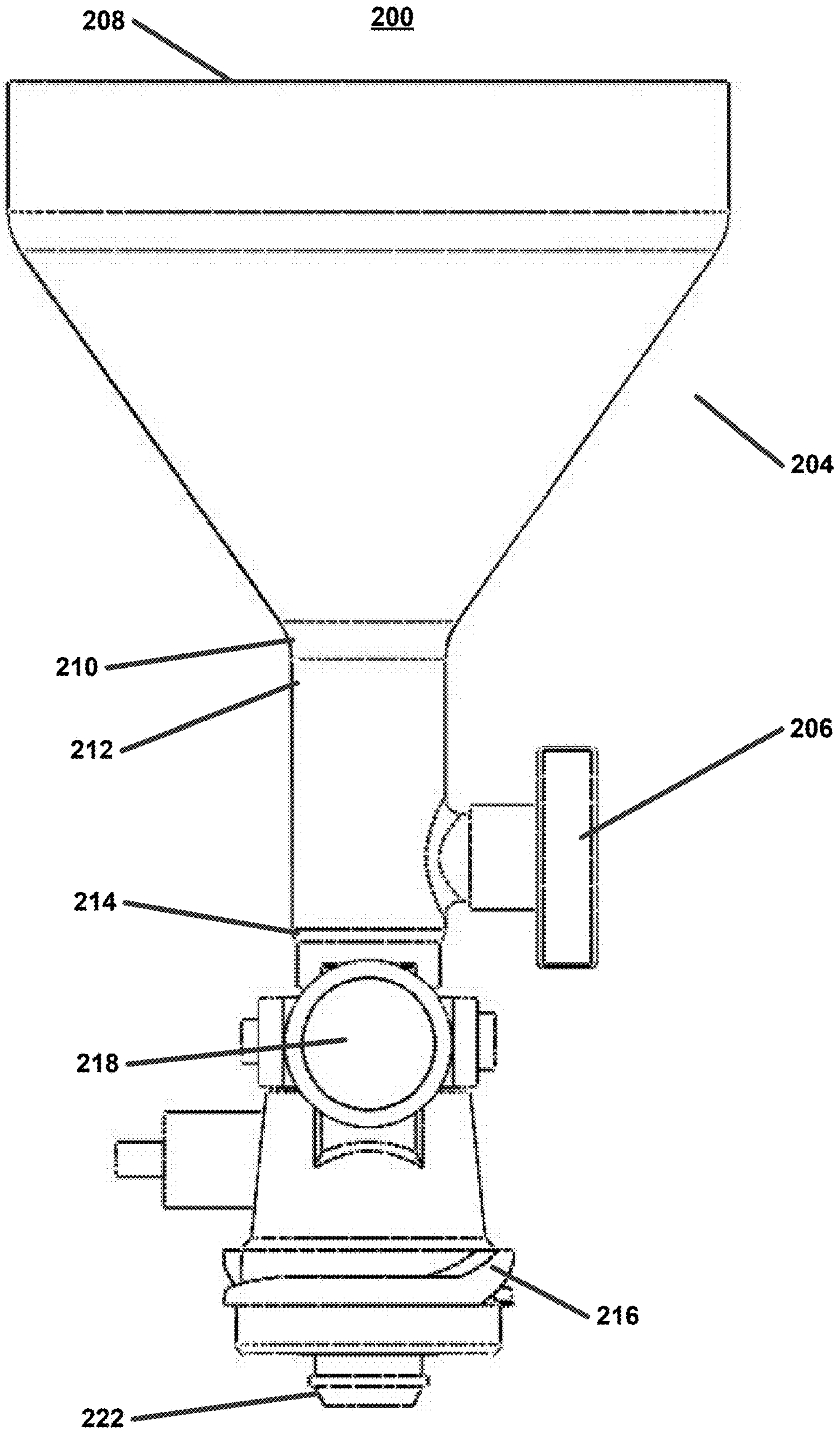
FIG. 2C illustrates a second side view of the filling apparatus, according to an embodiment.
Figure 2D:
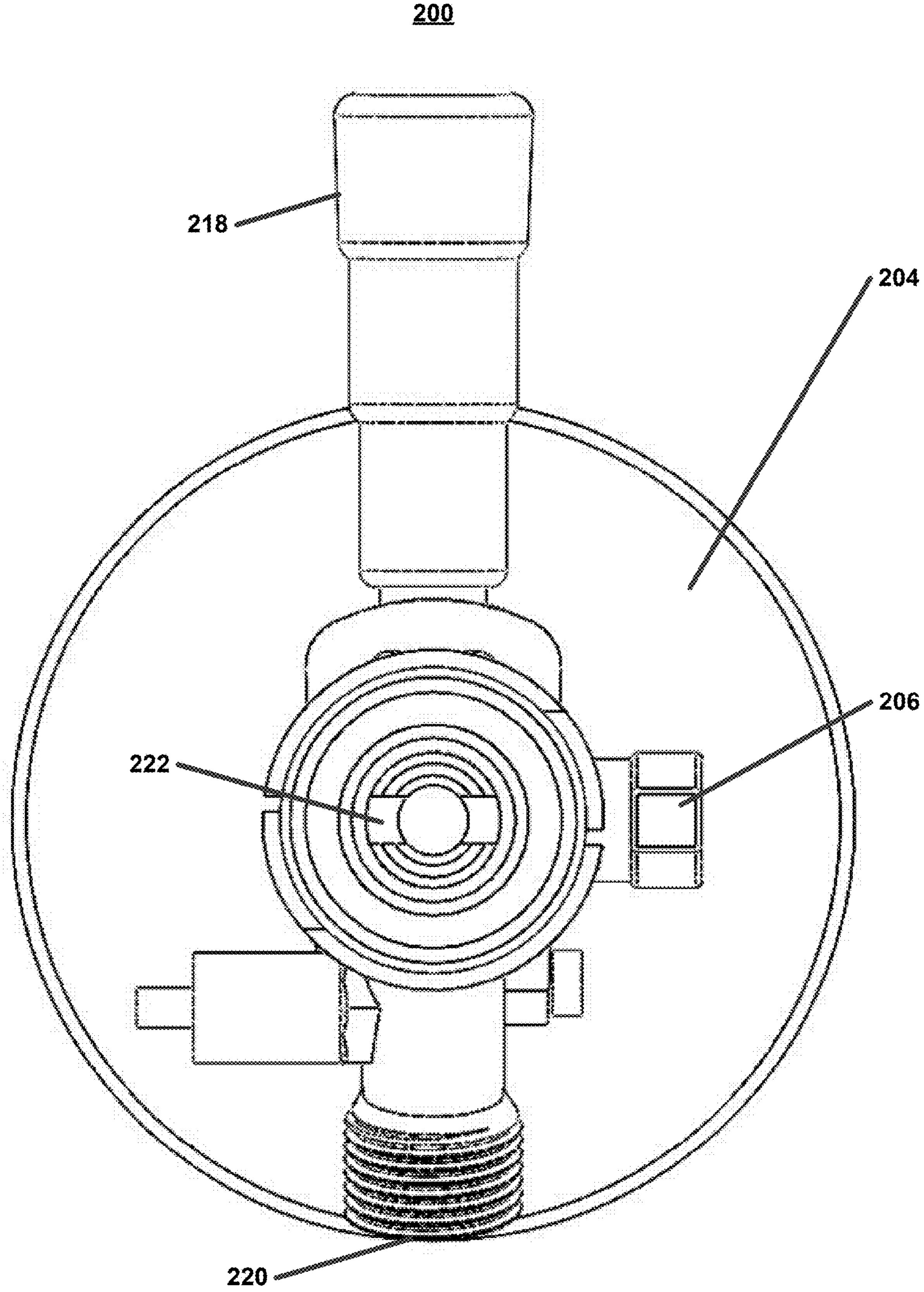
FIG. 2D illustrates a bottom view of the filling apparatus, according to an embodiment.
Figure 2E:
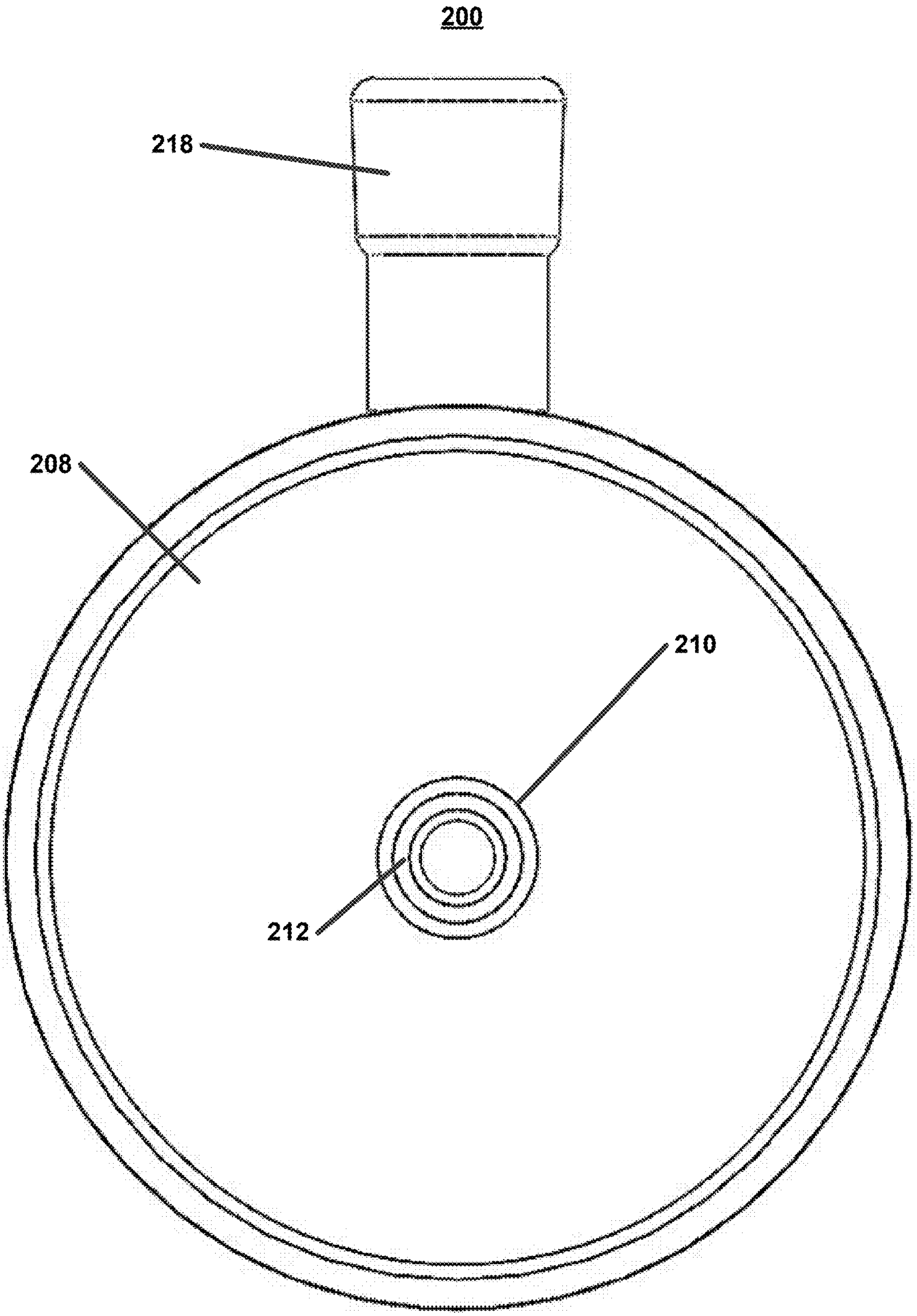
FIG. 2E illustrates a top view of the filling apparatus, according to an embodiment.

In FIGS. 2A, 2B, and 2C, for example, the handle 218 of the Sankey-D coupler 202 is in the down or engaged position. In this position, the probe 222 is in a lowered position to actuate the valve on the keg (see, e.g., FIG. 2B). One of ordinary skill in the art would understand how the Sankey-D coupler mates with and interacts with the valve assembly on a keg.

The vent opening 220 is left uncovered to allow a path for escape of gas from the Sankey-D coupler during filling operations. The vent opening 220 also allows for escape of gas during keg degassing prior to filling the keg. When the device 200 is engaged with the keg, the valve assembly 206 may be in the closed position. This closes off the liquid path through the device to prevent liquid flow upward from the keg but the vent passageway through the Sankey-D coupler is open and gas can exit the keg through the ring valve and up through the vent passage and out through the vent opening 220. This may be important because the keg is pressurized and contains liquid (e.g., the liquid pre-mix). For example, the keg spear, extending downward from the keg valve, and the keg valve, may be full of liquid that is pressurized by gas in the keg, which is above the surface of the liquid in the keg. Once the keg ball valve is depressed, a pathway for exit of that pressurized liquid is created. By keeping the liquid pathway through the device closed initially following engagement (i.e., keeping the valve assembly on the device in the closed position), liquid is prevented from escaping from the keg through the keg ball valve pathway that is opened by the device. Once the degassing is complete, the pressure on the liquid in the keg is relieved and the valve assembly may be opened to allow for liquid to be put into the keg through the device.

FIGS. 3A, 3B, 3C, 3D, and 3E (collectively referred to as FIG. 3) show a second device according to exemplary embodiments. The device 300 may have a lower portion 302 and an upper portion 304. The lower portion 302 may include a valve assembly 306, vent ports 308 and 310, a coupling ring 312, and a probe assembly 314. The upper portion 304 may have a funnel assembly 316 having an opening 318 and an outlet 320.

The valve assembly 306 may be housed in a cylindrical portion 322. The valve assembly may be constructed of metal, plastic, polymer, or any other semi-rigid or rigid material which is machinable, moldable, castable or formable with physical properties such that it is rigid and able to maintain its shape and be of sufficient strength and stiffness so as to allow it to functionally perform in the manner described herein.

Figure 3A:
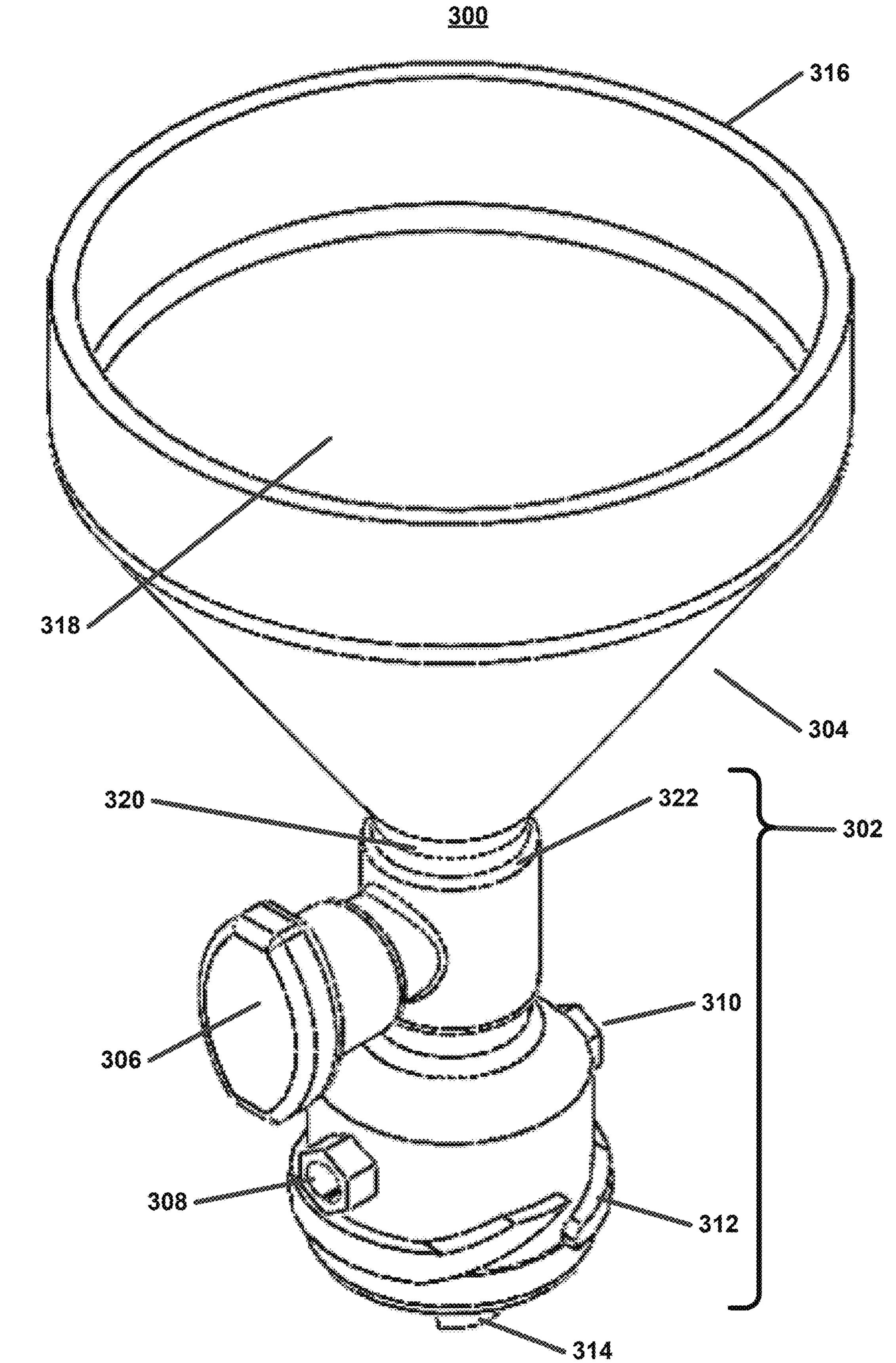
FIG. 3A illustrates a top perspective view of a filling apparatus, according to a second embodiment.
Figure 3B:
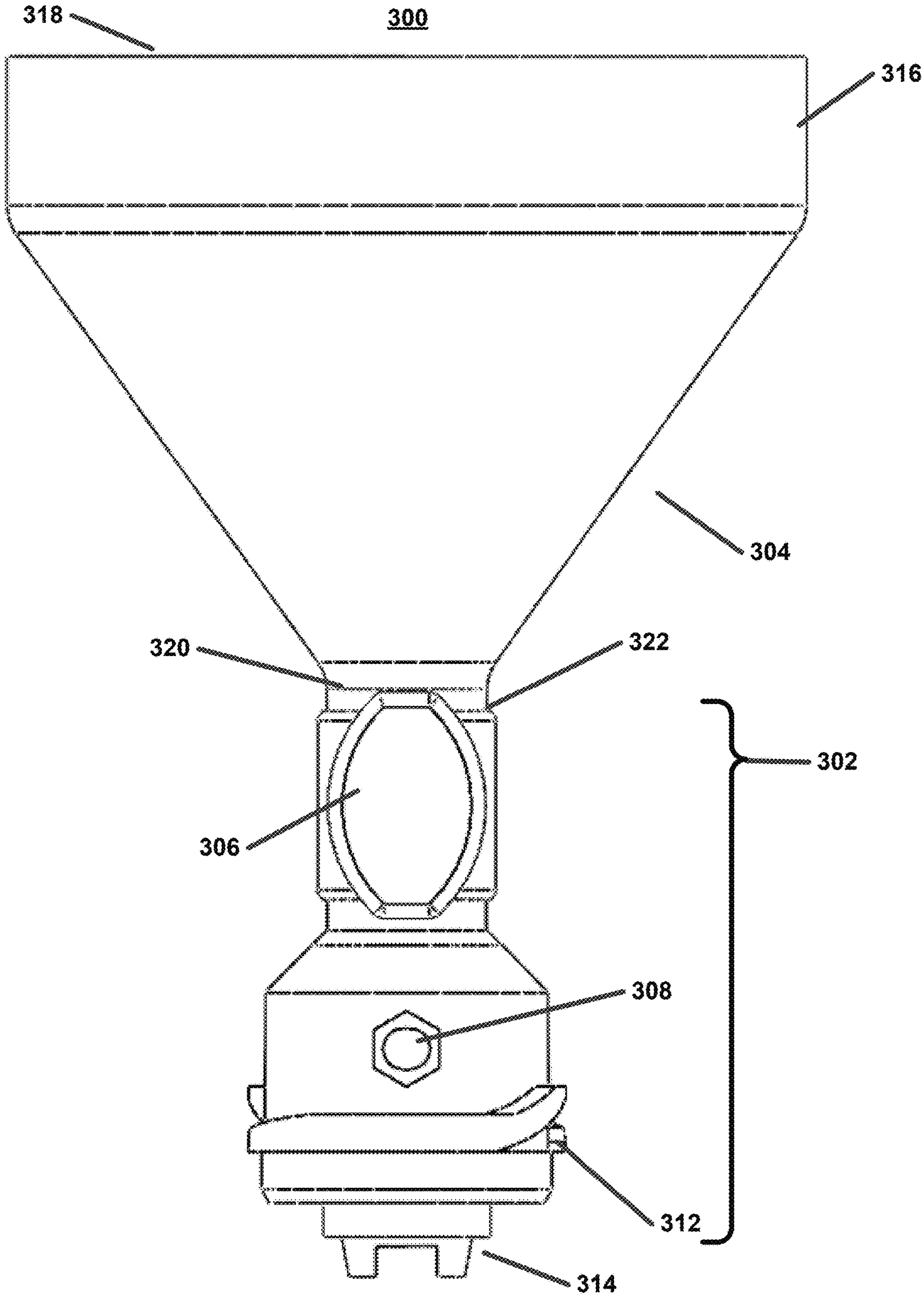
FIG. 3B illustrates a side view of the filling apparatus, according to a second embodiment.
Figure 3C:
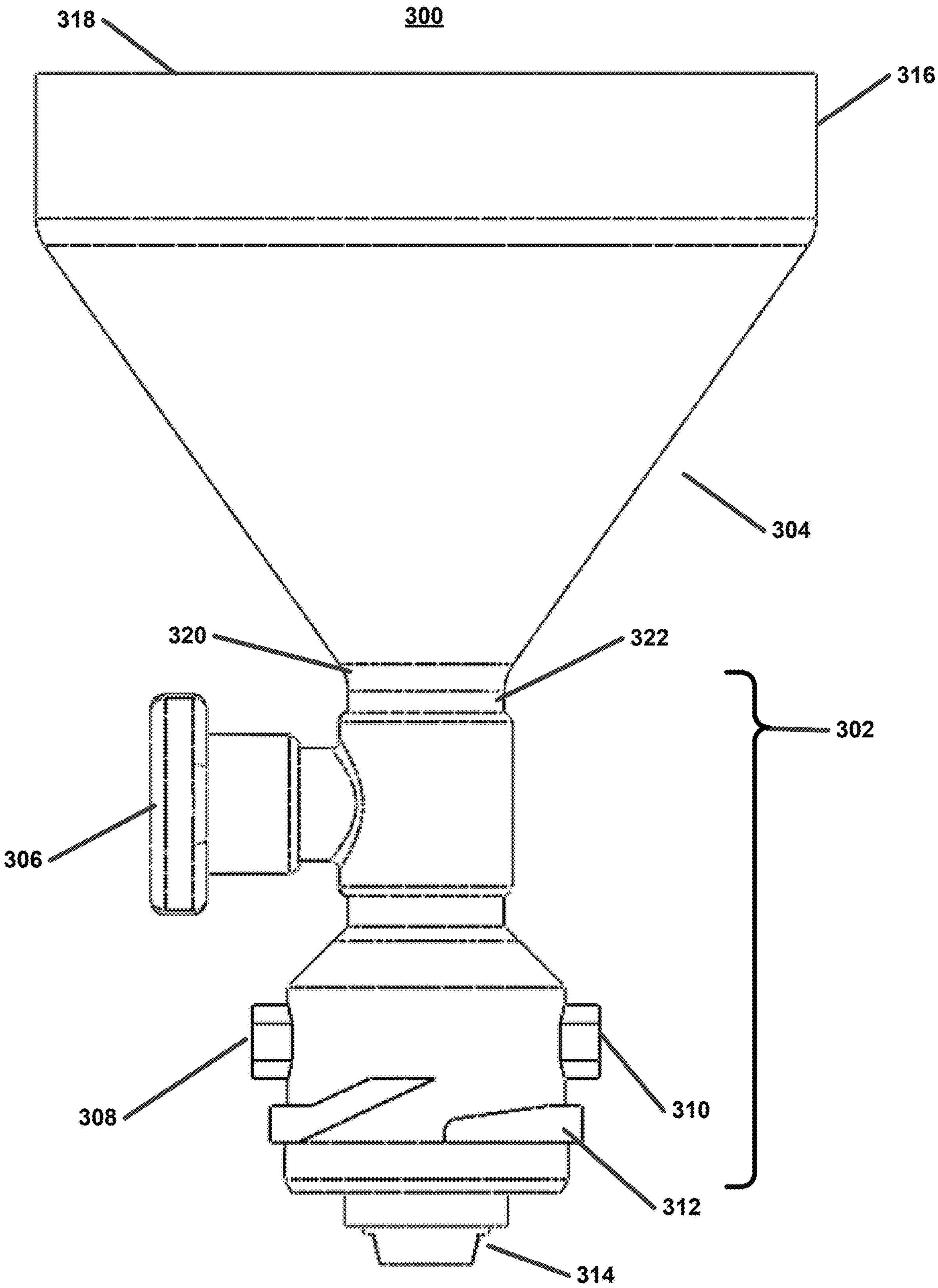
FIG. 3C illustrates a second side view of the filling apparatus, according to a second embodiment.
Figure 3D:
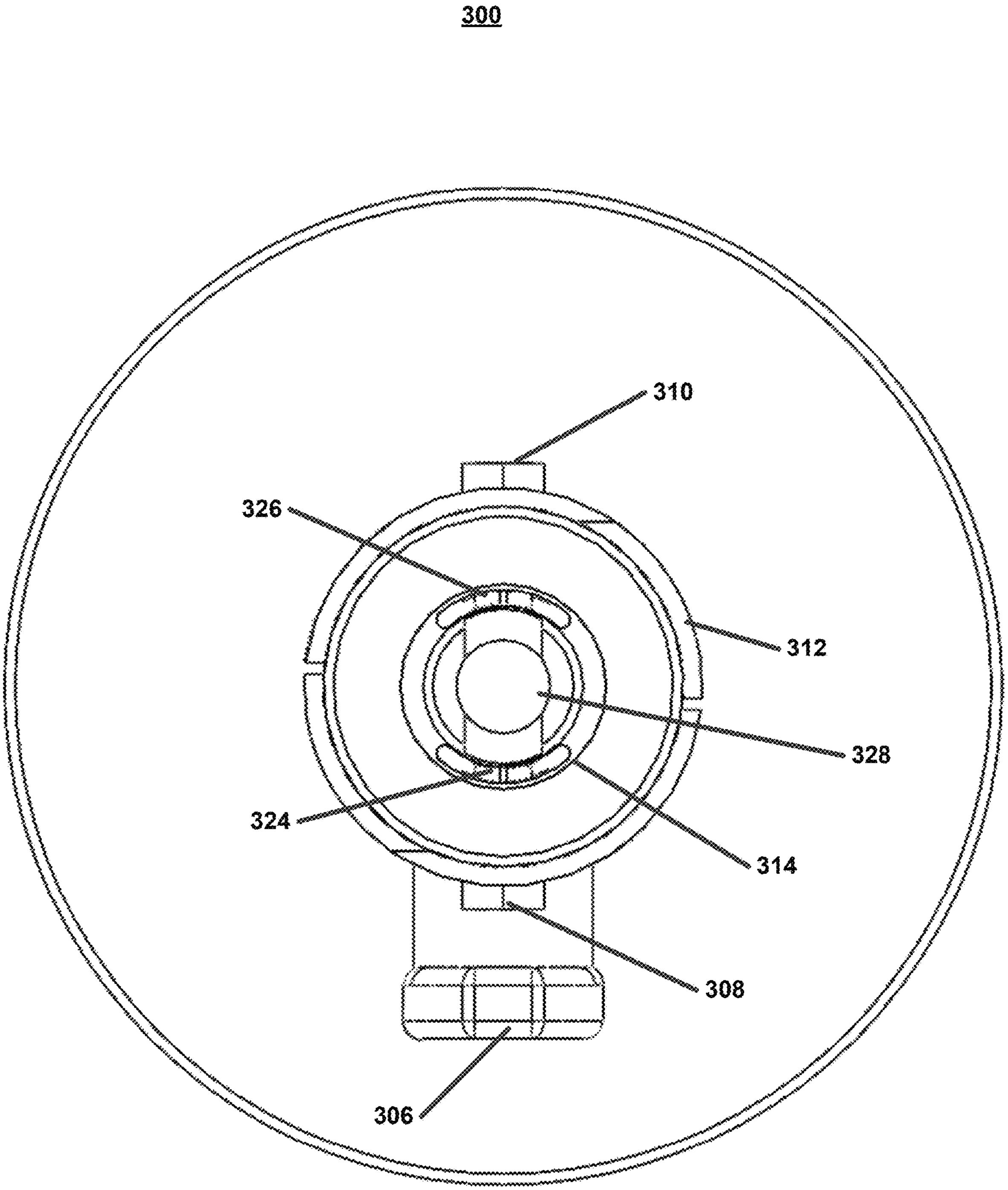
FIG. 3D illustrates a bottom view of the filling apparatus, according to a second embodiment.
Figure 3E:
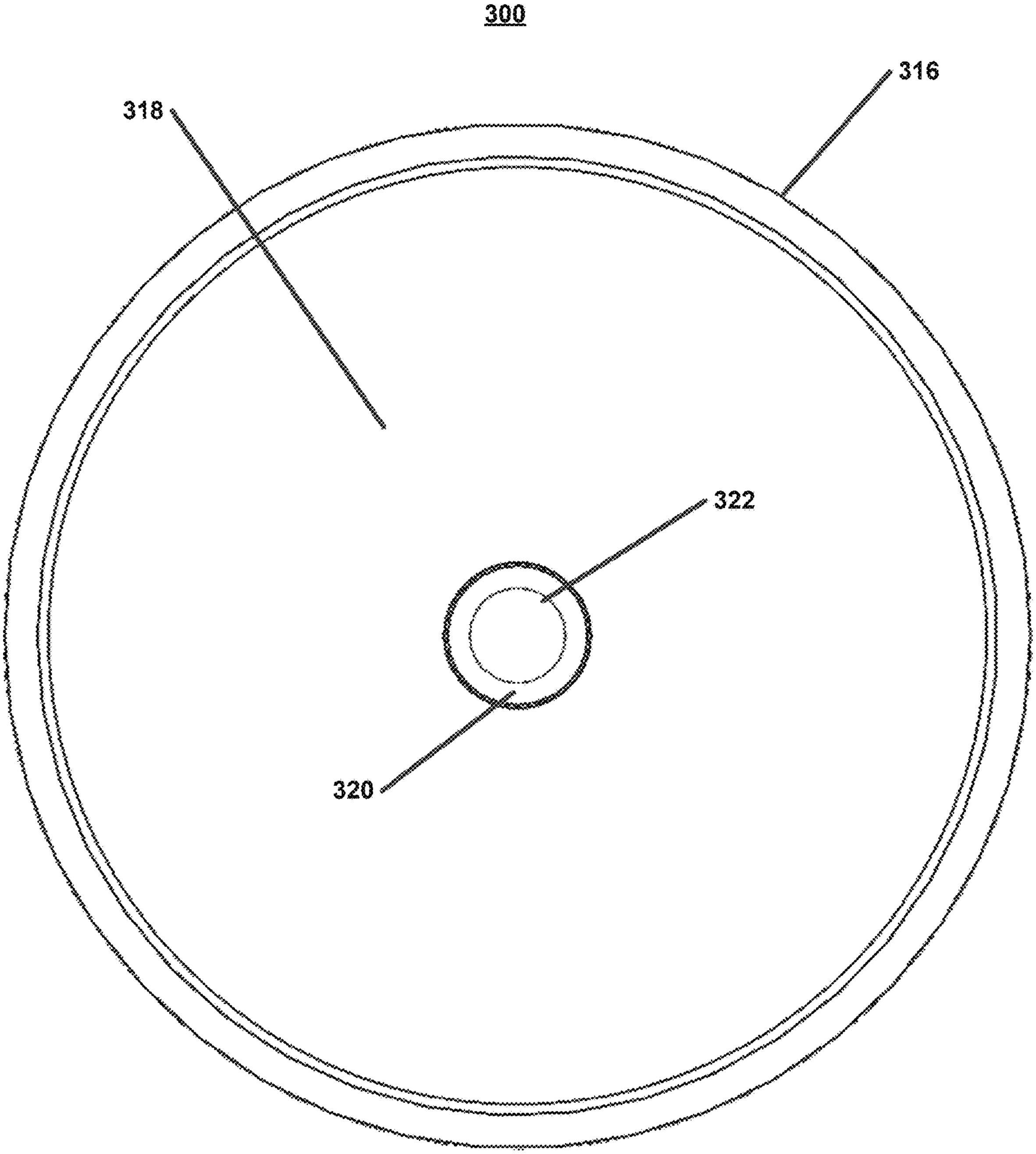
FIG. 3E illustrates a top view of the filling apparatus, according to a second embodiment.

The valve assembly 306 may have two positions: open and closed. In FIGS. 3A-3B, the valve assembly 306 is in an open position. This position allows for a fluid path from the outlet 320 through the valve into the lower portion 302. The second position closes off that fluid path. The valve assembly 306 may rotate through 90 degrees between the open and closed positions. The valve assembly 306 may be a ball valve. Other types of valves may be used such as a butterfly valve.

The opening 318 may be larger than the outlet 320. The opening 318 may be circular as shown. In various embodiments, the opening 318 may have other shapes, such as polygonal. The funnel assembly 304 may vertically taper down from the opening 318 to the outlet 320. The outlet 320 may be cylindrical and join with the valve assembly 306 at cylindrical portion 322. The valve assembly 306 be located above the vent ports and the coupling ring as shown in FIG. 3.

The funnel assembly 316 may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein. The funnel assembly may be of various sizes according to exemplary embodiments. For example, the funnel assembly may be sized to accommodate up one liter of fluid. In other embodiments, the funnel assembly may be of different sizes. For example, funnel assembly may be sufficiently large (e.g., about 5.5 inches wide by about 4.25 inches high) to accommodate a reasonable amount of fluid for flow into the keg to allow for filling of the keg in a minimum of time.

In exemplary embodiments, the funnel assembly 316 may be molded directly onto valve assembly 306. Others methods of joining may be used such as threading, welding, gluing, soldering, machining, carving, 3D printing, and so forth. According to exemplary embodiments, in normal usage, device 300 is designed to remain as one piece.

The probe assembly 314 may be configured to engage with the valve assembly in a keg. It may be configured to depress both the ball valve and the venting valve to allow for liquid flow into the keg and gas venting from the keg. The probe assembly 314 may have vent passages 324 and 326 that provide a gas pathway from upwards to the vent ports 308 and 310. The portion of the probe assembly with these vent passages may depress the ring valve or venting valve of the keg valve, while the center portion 328 may depress the ball valve or liquid valve portion of the keg valve.

These vent passages (324, 326) allow for gas to escape or vent from the keg in response to liquid being added to the keg. The vent passages also allow for gas escape during degassing of the keg, prior to filling with liquid. When the device 300 is engaged with the keg, the valve assembly 306 may be in the closed position. The reason for this is explained above with respect to FIG. 2 above. This closes off the liquid path through the device to prevent liquid venting because of the pressurization in the keg but the vent passageways are open (and the ring valve is depressed) and gas can exit the keg through the ring valve and up through the vent passages. Once the degassing is complete and the pressure in the keg on the liquid is relieved, the valve assembly may be opened to allow for liquid to be put into the keg through the device.

The coupling ring 312 may be configured to engage with complementary threads or teeth on the keg valve structure. The coupling ring 312 may be engaged by positioning it onto the keg valve locking threads or teeth, pushing down, and twisting until the coupling ring 312 fully engaged in order to lock the device 300 in place and create a seal with the keg valve.

FIGS. 4A, 4B, 4C, 4D, 4E, and 4F (collectively referred to as FIG. 4) show a third device according to exemplary embodiments. The device 400 may have a lower portion 402 and an upper portion 404. The lower portion 402 may include a valve assembly 406, a coupling ring 408, and a probe assembly 410. The upper portion 404 may have a funnel assembly 412 having an opening 414 and an outlet 416.

The valve assembly 406 may be housed in a cylindrical section 418. The valve assembly may be constructed of metal, plastic, polymer, or any other semi-rigid or rigid material which is machinable, moldable, castable or formable with physical properties such that it is rigid and able to maintain its shape and be of sufficient strength and stiffness so as to allow it to functionally perform in the manner described herein.

Figure 4A:
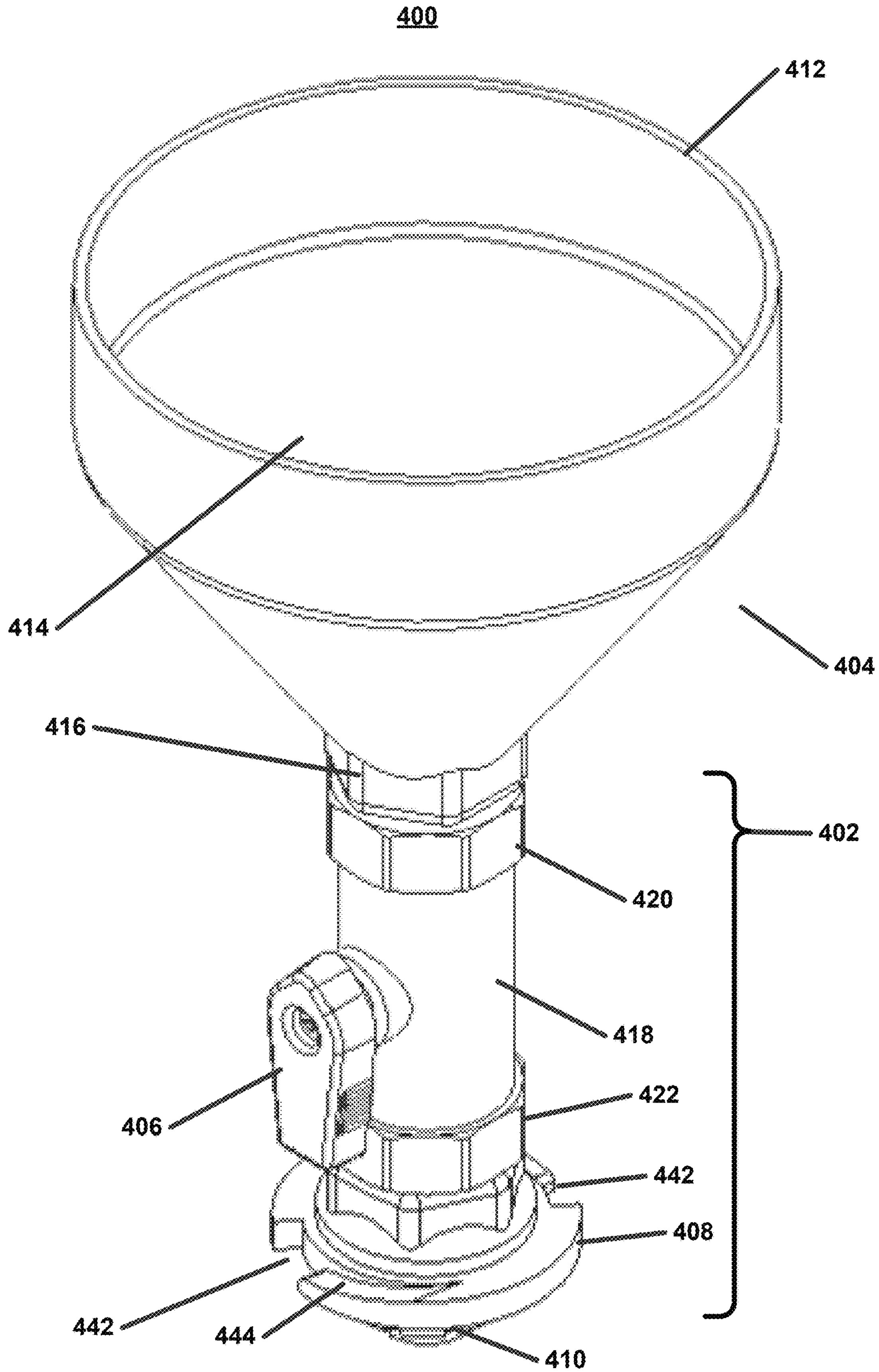
FIG. 4A illustrates a top perspective view of a filling apparatus, according to a third embodiment.
Figure 4B:
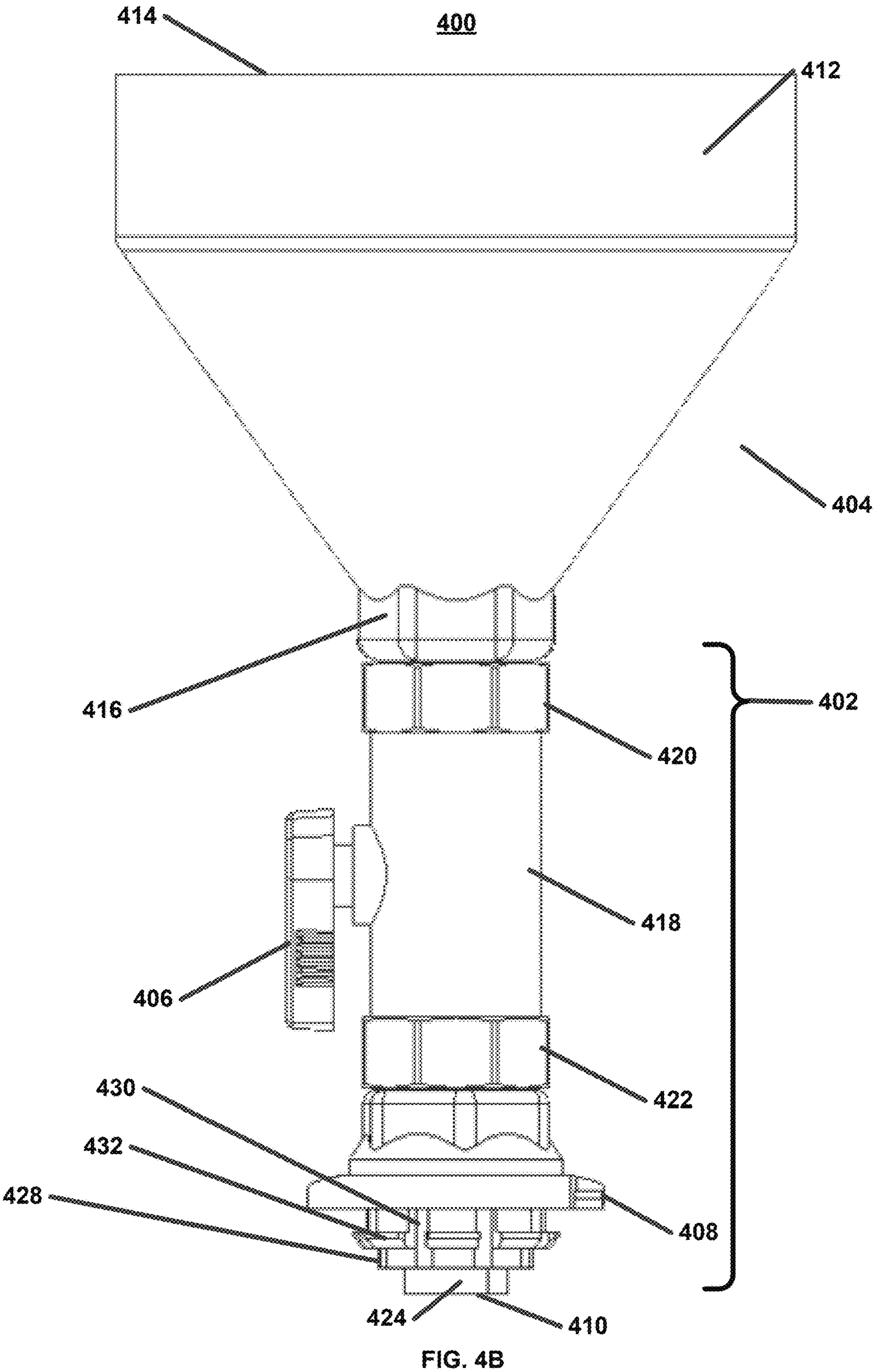
FIG. 4B illustrates a side view of the filling apparatus, according to a third embodiment.
Figure 4C:
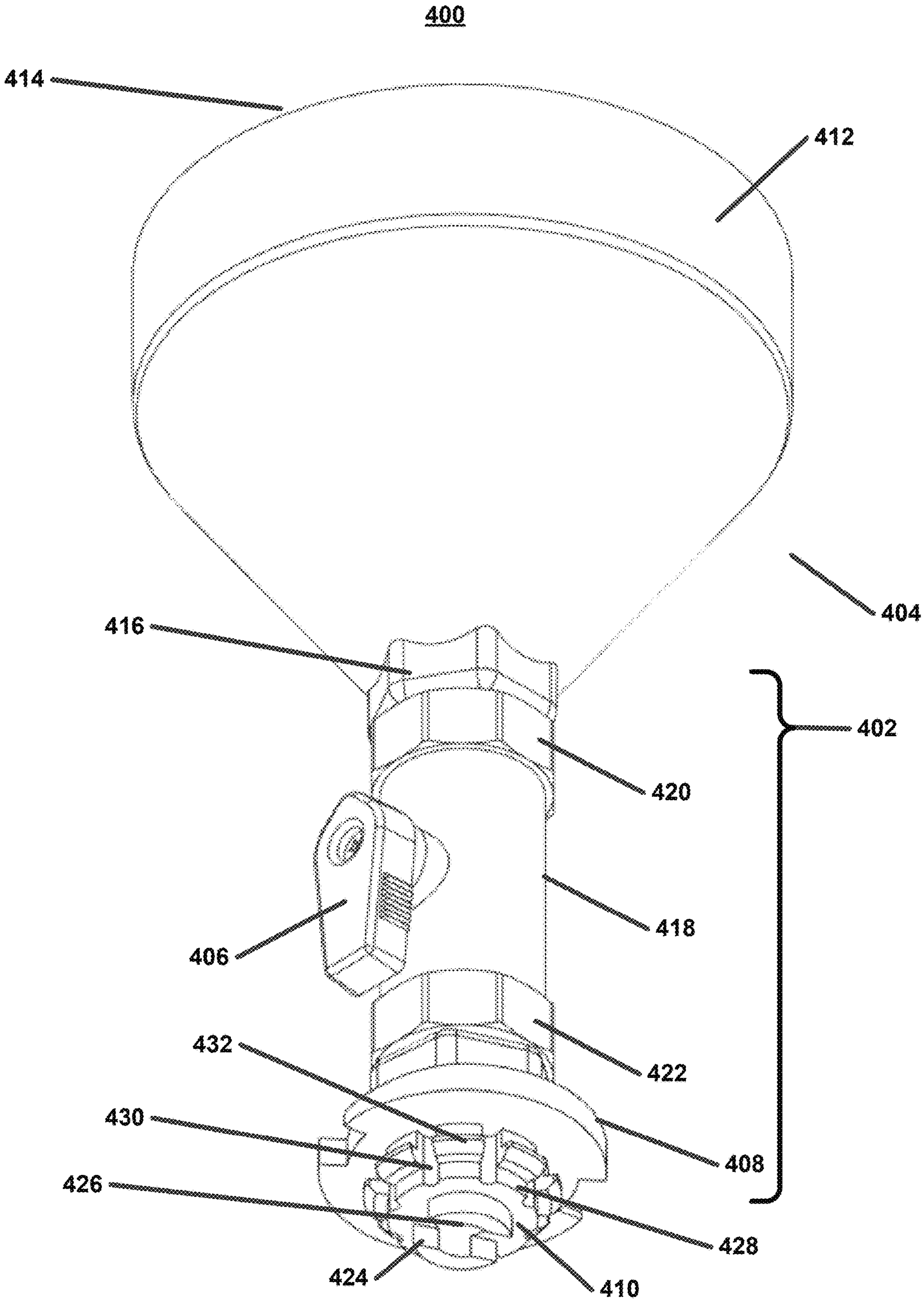
FIG. 4C illustrates a bottom perspective view of the filling apparatus, according to a third embodiment.

The valve assembly 406 may have two positions: open and closed. In FIGS. 4A-4C, the valve assembly 406 is in an open position. This position allows for a fluid path from the outlet 416 through the valve into the lower portion 402. The second position closes off that fluid path. The valve assembly 406 may rotate through 90 degrees between the open and closed positions. The valve assembly 406 may be a ball valve. Other types of valves may be used such as a butterfly valve.

The opening 414 may be larger than the outlet 420. The opening 414 may be circular as shown. In various embodiments, the opening 414 may have other shapes, such as polygonal. The funnel assembly 404 may vertically taper down from the opening 414 to the outlet 416. The outlet 416 may be cylindrical and join with the valve assembly 406 at an upper portion 420 cylindrical portion 418.

Figure 4D:
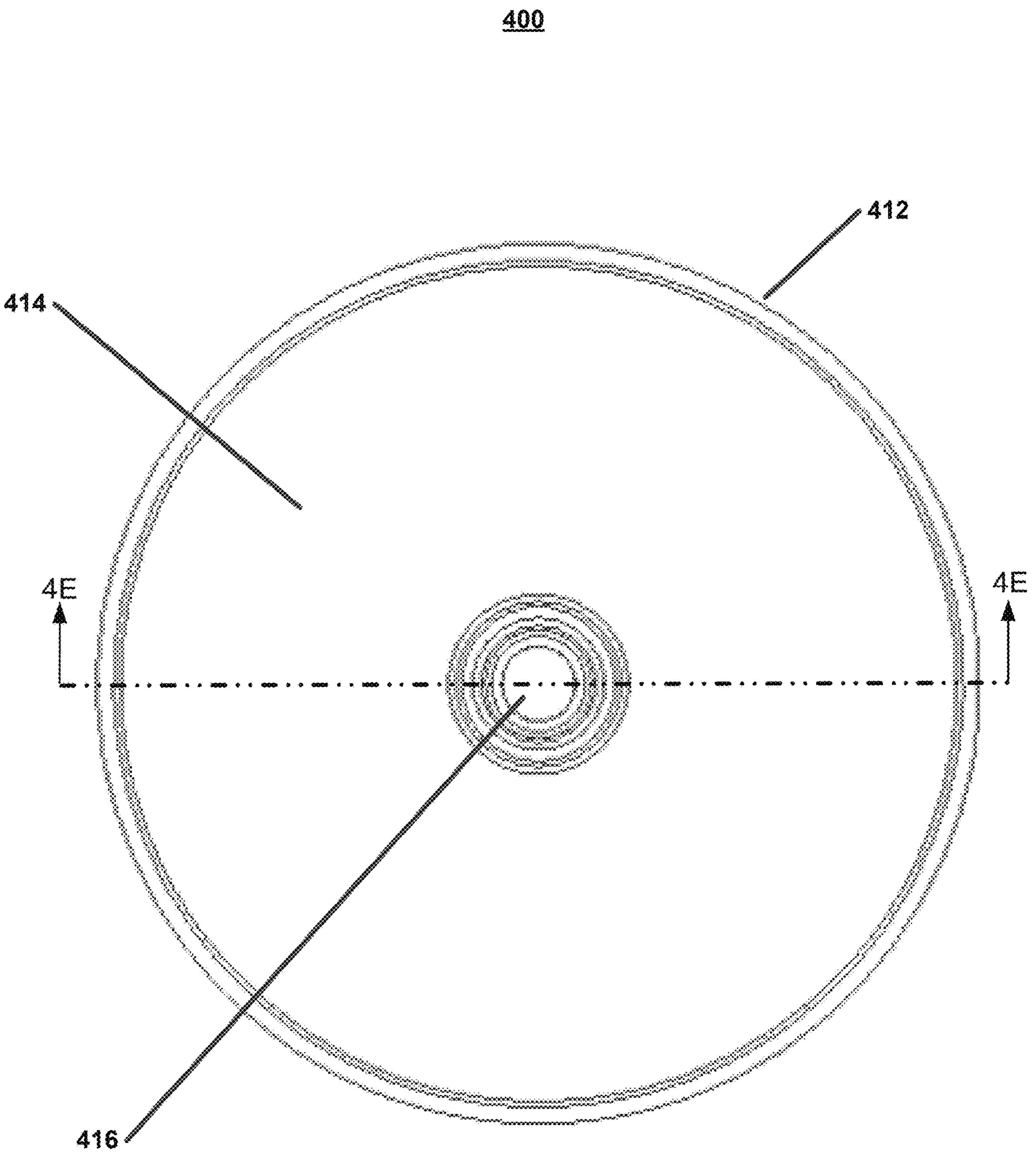
FIG. 4D illustrates a top view of the filling apparatus, according to a third embodiment.

The funnel assembly 412 may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein. The funnel assembly 412 may have wall thickness 446 as shown in FIG. 4D. The funnel assembly may be of various sizes according to exemplary embodiments. For example, the funnel assembly may be sized to accommodate up one liter of fluid. In other embodiments, the funnel assembly may be of different sizes. For example, funnel assembly may be sufficiently large (e.g., about 5.5 inches wide by about 4.25 inches high) to accommodate a reasonable amount of fluid for flow into the keg to allow to filling of the keg in a minimum amount of time.

In exemplary embodiments, the funnel assembly 412 may be threaded onto valve assembly 406 at an upper portion of cylindrical section 418. Others methods of joining may be used such as molding, welding, gluing, soldering, machining, carving, 4D printing, and so forth. According to exemplary embodiments, in normal usage, device 400 is designed to remain as one piece.

The coupling ring 408 may be configured to engage with the keg valve structure. The coupling ring 408 may be engaged by positioning it onto the keg, pushed down, and twisting until the coupling ring 408 fully engaged in order to lock the device 400 in place and create a seal with the keg valve. The coupling ring 408 may have two cut-outs 442 that are configured to engage with two teeth located on the valve structure of the keg. This locks the device 400 into place. After the teeth are positioned into each cut-out 442, a ramped portion 444 may allow for locking engagement of the coupling ring 408 with the keg valve structure when twisted or turned into place.

The portion of lower assembly 402 containing the coupling ring 408 and probe 410 may be threaded onto the valve assembly 406 at a lower portion 422 of cylindrical section 418.

In FIG. 4C the detail of the probe 410 is illustrated. The probe 410 may include a portion 424 to engage with and depress the ball valve on the keg. The portion 424 may consist of two hemispherical structures as shown that surround liquid pathway 426. Ridged portion 428 may engage with and depress the ring valve on the keg. Passageways 430 may provide a pathway for gas venting from the keg during filling operations with the device 400. As can be seen, there may be multiple pathways 430, allowing for multiple gas venting pathways, to increase liquid flow into the keg. Teeth 432 may provide standoff for the device 400 when engaged with the keg to create a gap allowing for the gas to escape. FIG. 4D shows a view looking downward into the funnel portion 412 (i.e., through the opening 414). The funnel exit 416 portion can be seen at the center of the figure.

Figure 4E:
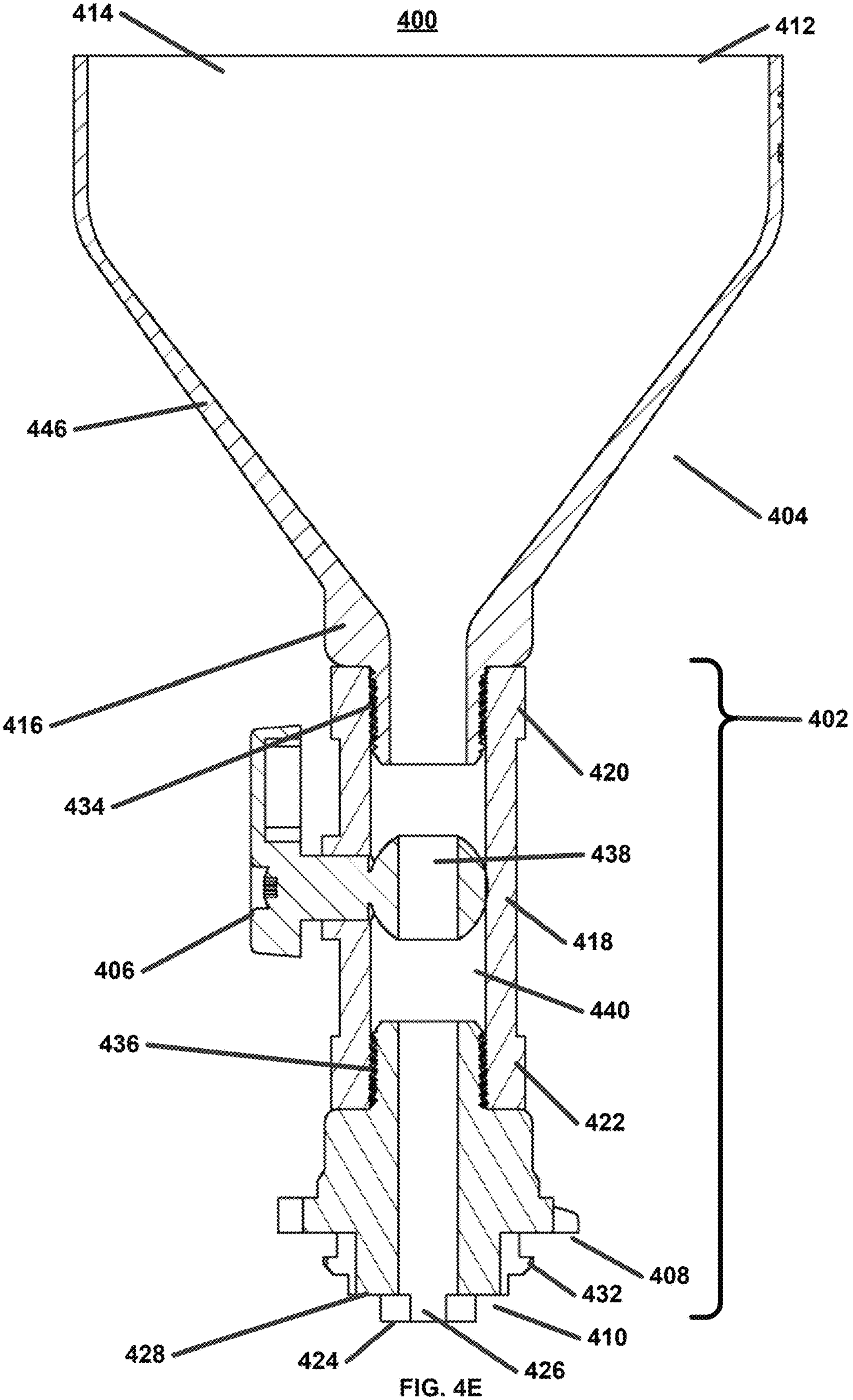
FIG. 4E illustrates a cross-sectional view of the filling apparatus, according to a third embodiment.
Figure 4F:
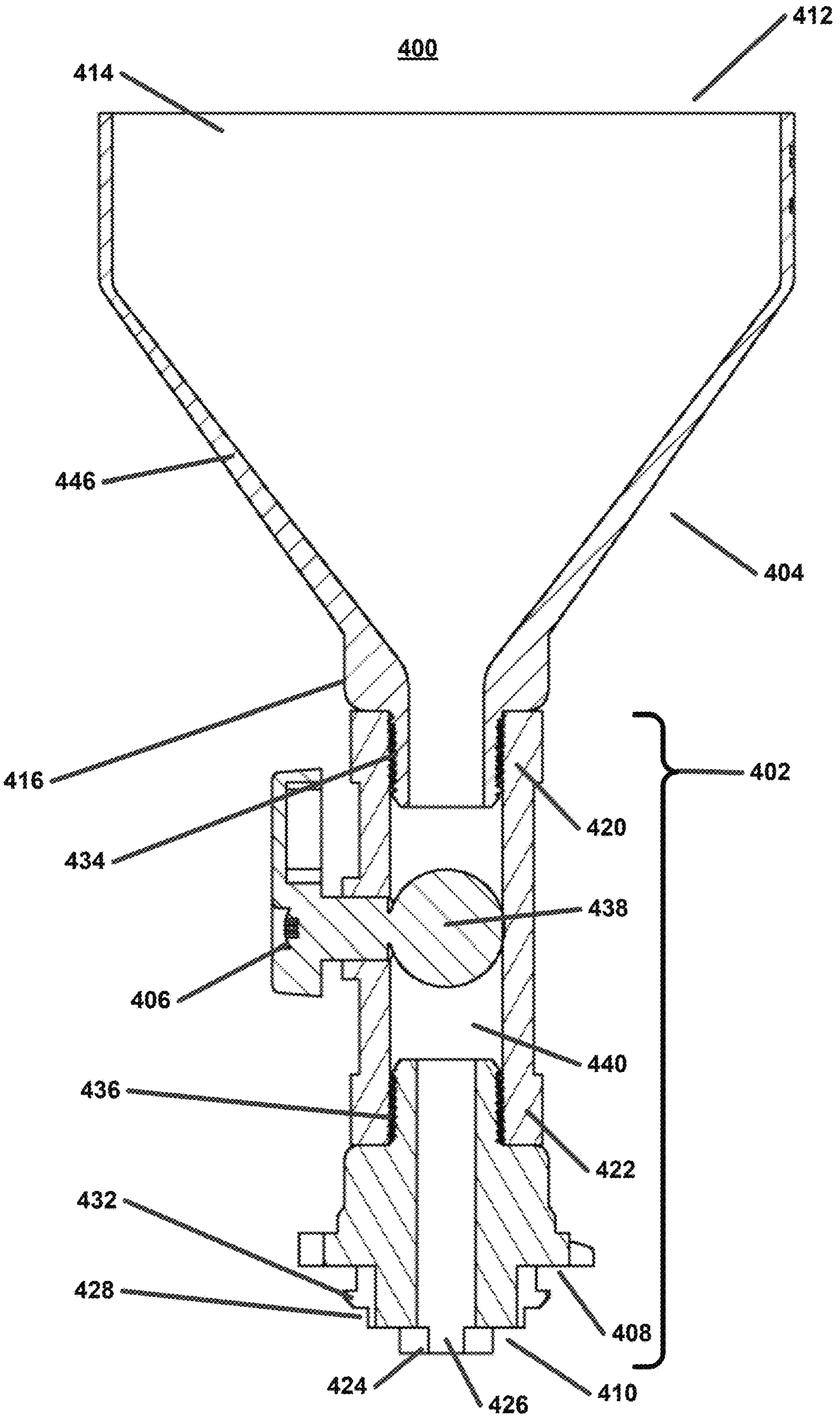
FIG. 4F illustrates a cross-sectional view of the filling apparatus, according to a third embodiment.

FIGS. 4E and 4F depict the internal structure of the device 400. In FIG. 4E, the valve assembly is depicted in an open position, creating a liquid pathway straight through the device. FIG. 4F, which is a cross-section taken along the same cut-line as FIG. 4E, depicts the valve assembly in a closed position, shutting the liquid pathway from the upper portion through the lower portion. The threaded connections 434 and 436 between 416 and 420 and 408 and 422 can be seen. The internal structure of the valve assembly 406, in this embodiment, a ball valve 438 is in the open position. A liquid pathway 440 exists between the lower portion 416 of the funnel portion 412, the valve 438 (in the open position), and the probe assembly 410. The liquid pathway 440 may increase in size after threaded section 434 through the valve section 438 and then taper down to threaded portion 436. Thus, when the valve assembly 406 in the open position, liquid may enter the funnel assembly 412 at its upper opening 414 and flow downward through the device 400, including passing through the valve 438, eventually existing the probe assembly 410 between the portion 424 (at liquid pathway 426). When the device 400 is engaged with a keg, the liquid may flow from the device into the ball valve portion of the keg valve and into the keg. FIG. 4F depicts the valve 438 in the closed position.

When the device 400 is engaged with the keg, according to exemplary embodiments, the valve assembly 406 may be in the closed position. This closes the liquid pathway through the device 400. The reason for this is explained above with respect to FIG. 2 above. This closes off the liquid path through the device to prevent liquid venting because of the pressurization in the keg, but the passageways for the gas in the keg are open and that gas can exit the keg through the ring valve and up through the passageways in the device as described above. Once the degassing is complete and the pressure in the keg on the liquid is relieved. Once that is complete, the valve assembly may be opened and liquid filling commenced.

FIGS. 5A, 5B, 5C, 5D, 5E, 5F, and 5G (collectively referred to as FIG. 5) show a fourth device according to exemplary embodiments. The device 500 may have a lower portion 502 and an upper portion 504. The lower portion 502 may include a probe assembly 506 and flange portion 508. The upper portion 504 may have a funnel assembly 510 having an opening 512 and a deflector structure 514. The opening 512, at the upper portion of the funnel assembly 510 may taper downwards towards the lower portion of the device 500.

Figure 5A:
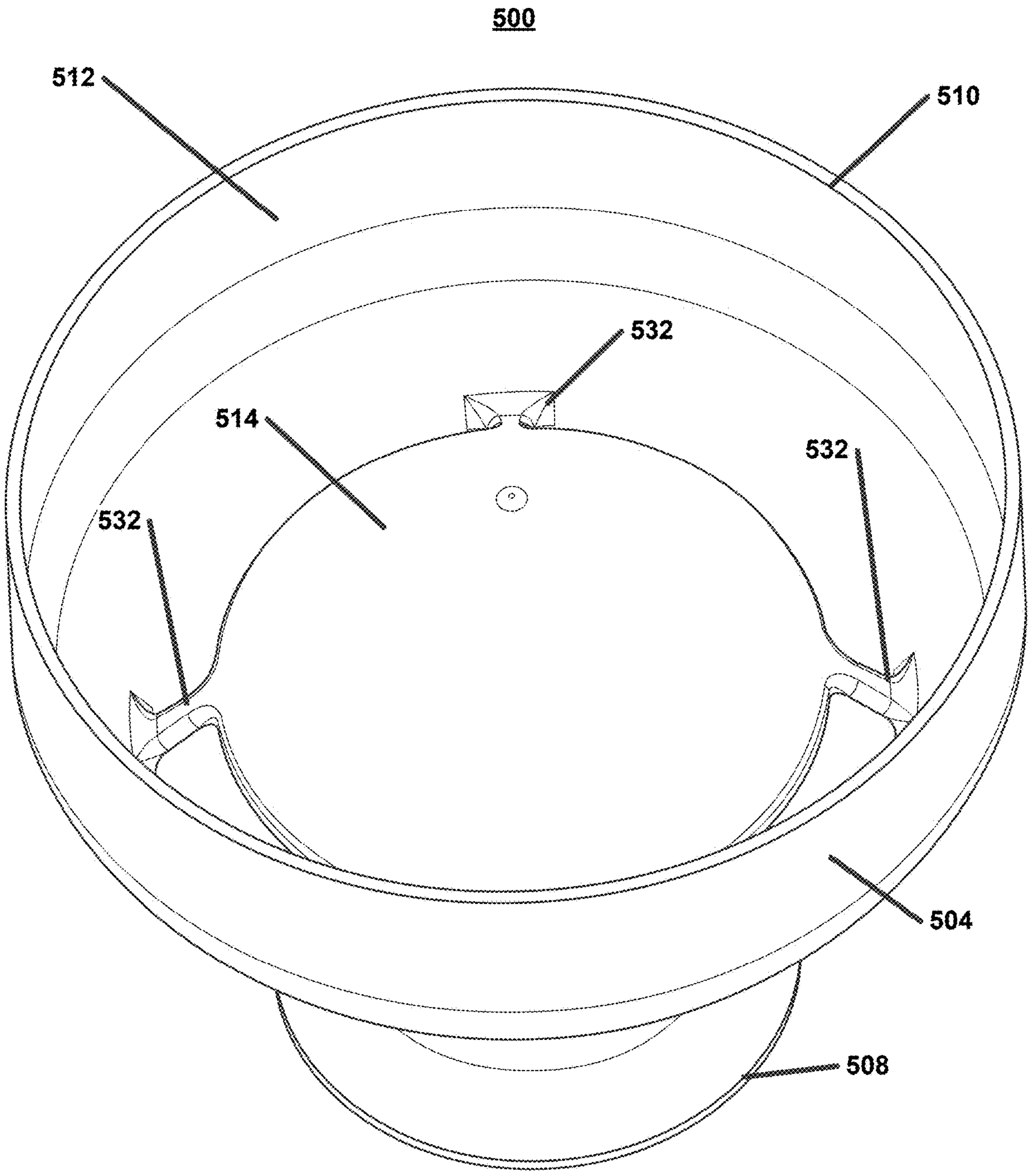
FIG. 5A illustrates a top perspective view of a filling apparatus, according to a fourth embodiment.
Figure 5B:
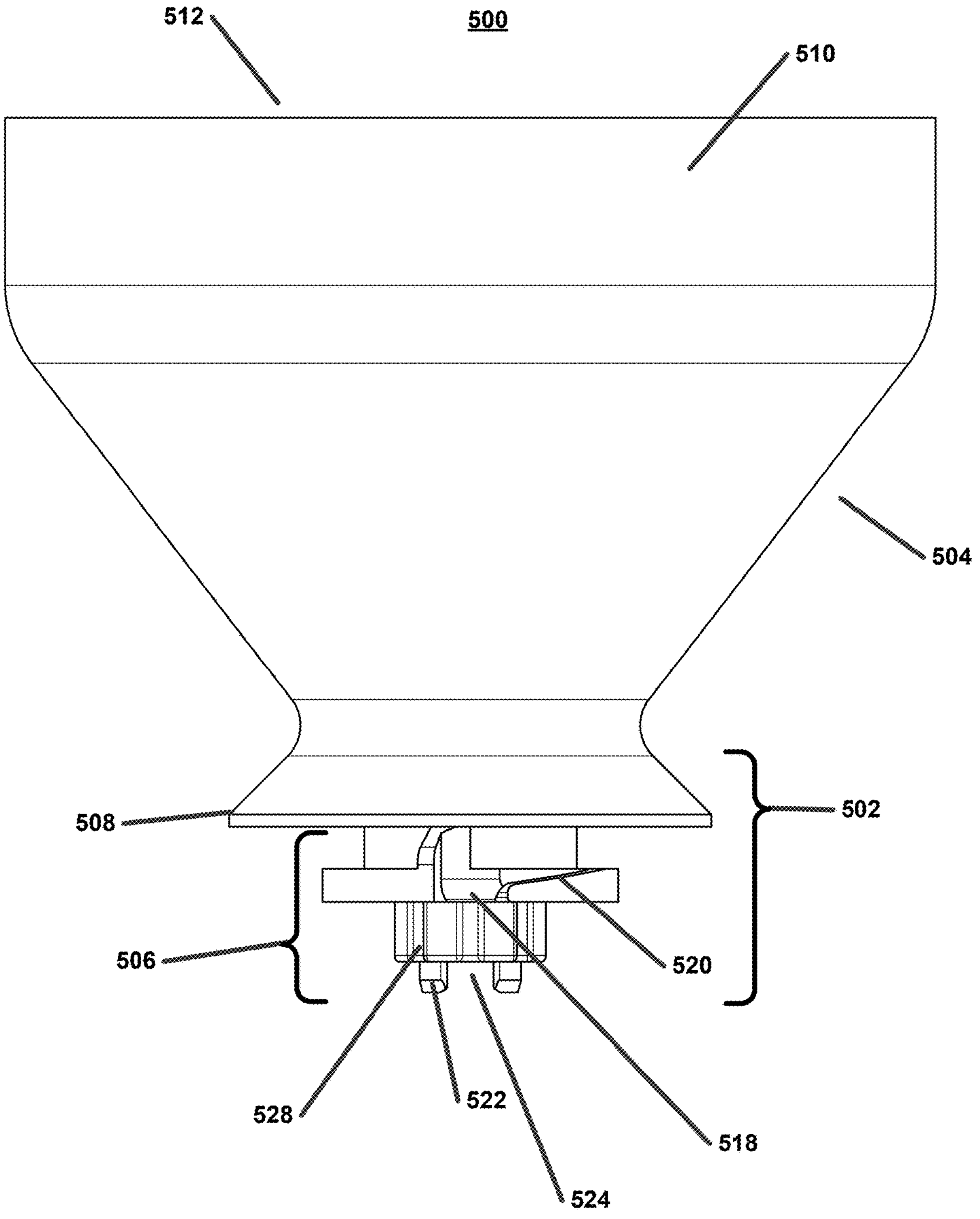
FIG. 5B illustrates a side view of the filling apparatus, according to a fourth embodiment.
Figure 5C:
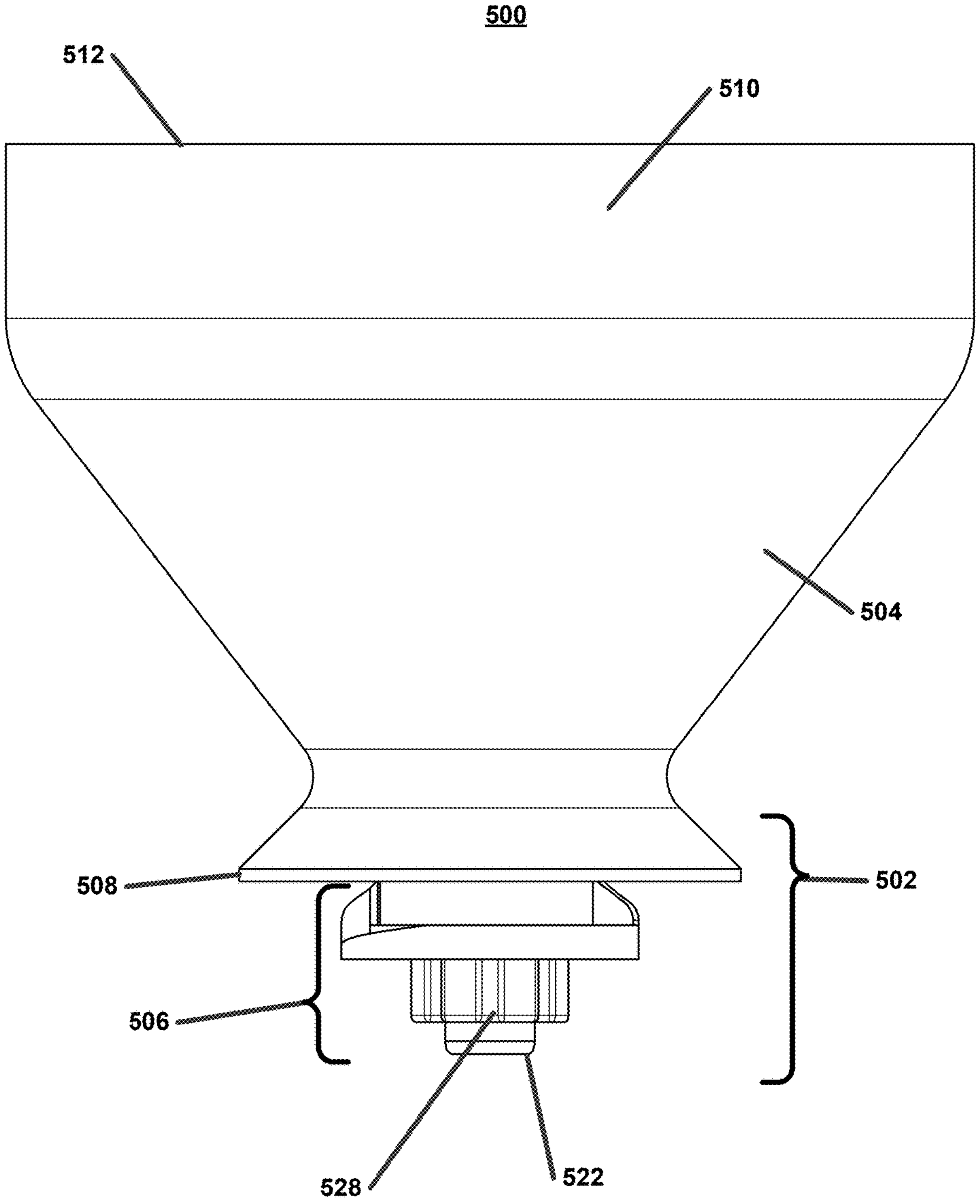
FIG. 5C illustrates a second side view of the filling apparatus, according to a fourth embodiment.
Figure 5D:
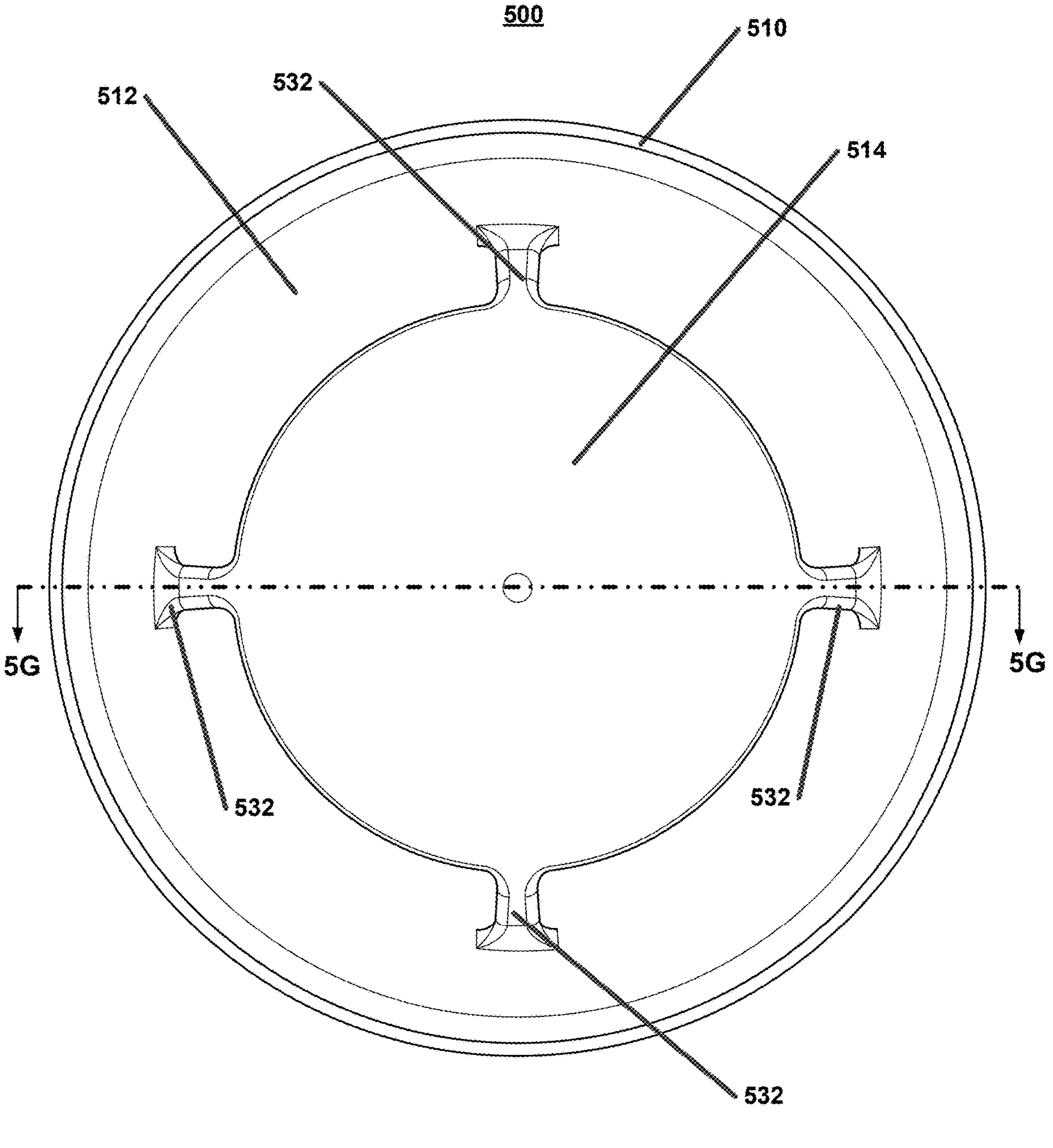
FIG. 5D illustrates a top view of the filling apparatus, according to a fourth embodiment.

The device 500, including the lower and upper portions 502 and 504 may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein. The funnel assembly 510 may have wall thickness, as shown in FIGS. 5D and 5G. The funnel assembly may be of various sizes according to exemplary embodiments. For example, the funnel assembly may be sized to accommodate up one liter of fluid. In other embodiments, the funnel assembly may be of different sizes. For example, funnel assembly may be sufficiently large (e.g., about 5.5 inches wide by about 4.25 inches high) to accommodate a reasonable amount of fluid for flow into the keg to allow to filling of the keg in a minimum amount of time.

The lower portion 502 may have a probe assembly 506. The probe assembly may include a coupling ring 516 that may be configured to engage with the keg valve structure. The coupling ring 516 may be engaged by positioning it onto the keg, pushed down, and twisting until the coupling ring 516 fully engaged in order to lock the device 500 in place and create a seal with the keg valve. The flange 508 may provide a cover for the engagement portion with the keg valve. The coupling ring 516 may have two cut-outs 518 that are configured to engage with two teeth located on the valve structure of the keg. This locks the device 500 into place. After the teeth are positioned into each cut-out 518, a ramped portion 520 may allow for locking engagement of the coupling ring 516 with the keg valve structure when twisted or turned into place.

Figure 5E:
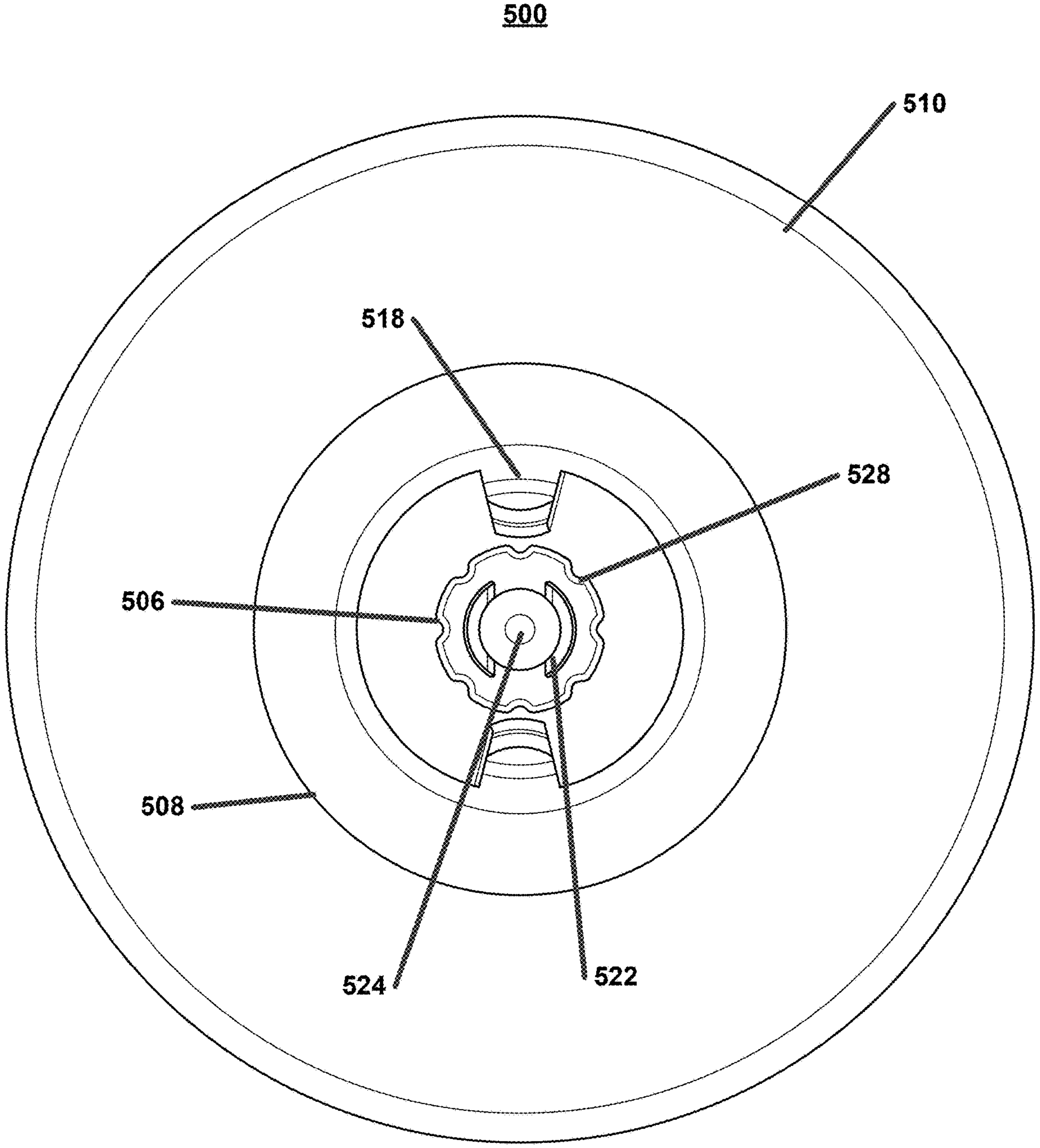
FIG. 5E illustrates a bottom view of the filling apparatus, according to a fourth embodiment.
Figure 5F:
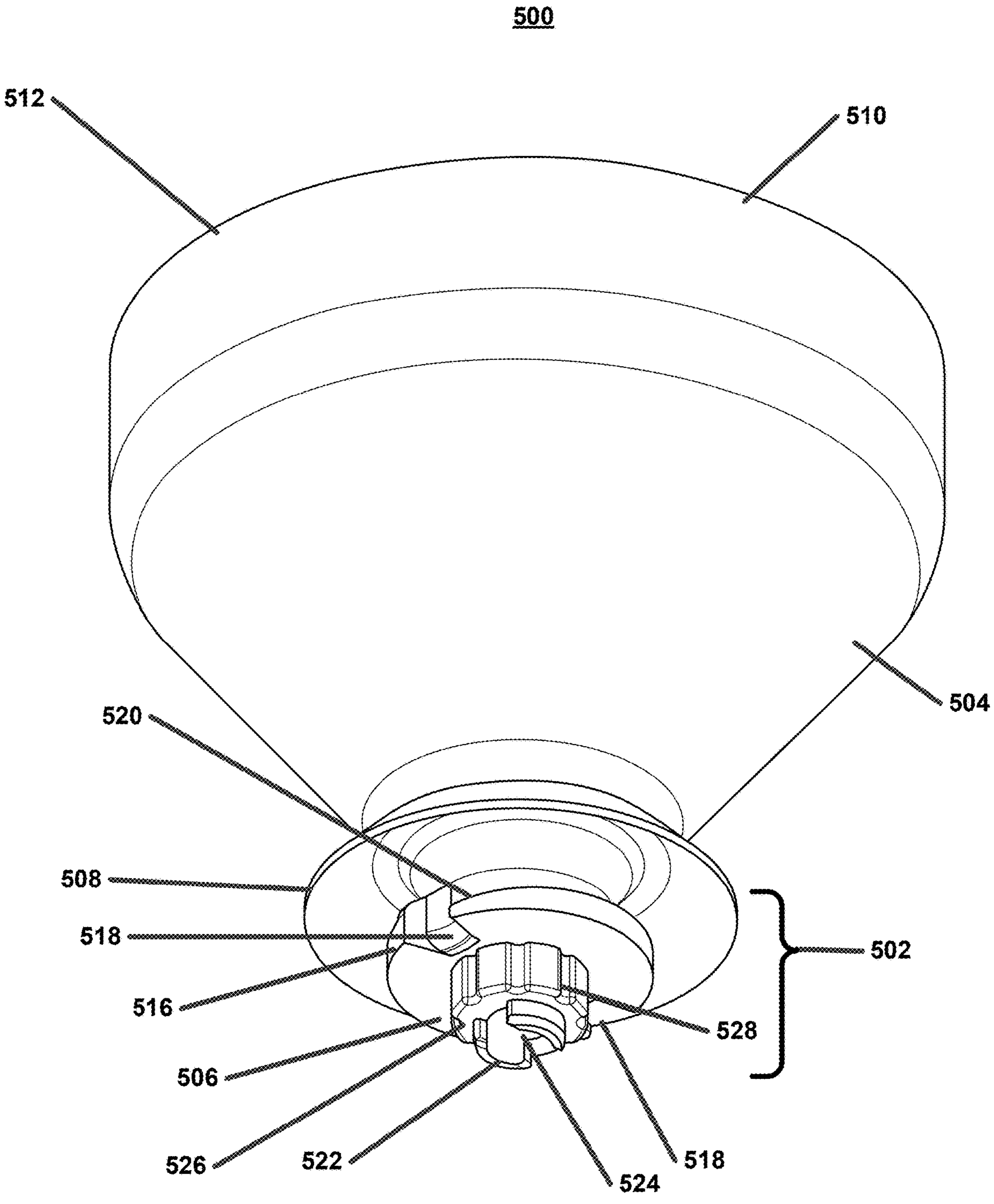
FIG. 5F illustrates a bottom perspective view of the filling apparatus, according to a fourth embodiment.
Figure 5G:
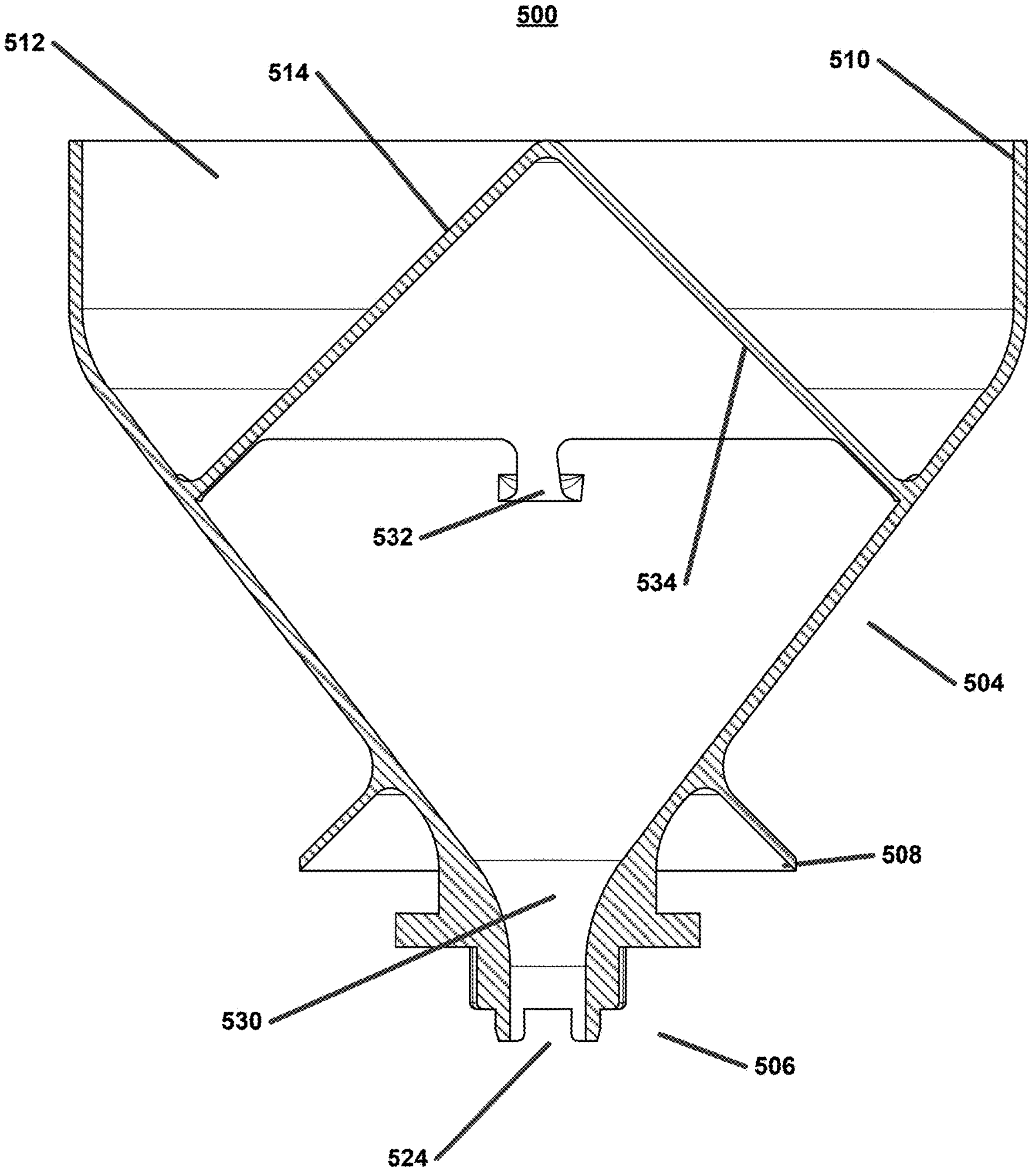
FIG. 5G illustrates a cross-sectional view of the filling apparatus, according to a fourth embodiment.

In FIGS. 5E and 5F, the detail of the probe 506 is illustrated. The probe 506 may include a portion 522 to engage with and depress the ball valve on the keg. The portion 522 may consist of two hemispherical structures as shown that surround liquid outlet 524. The liquid outlet 524 may by the terminus of a liquid pathway that extends upward from to the bottom portion of the funnel, creating a flow path from the funnel to the bottom of the device 500. Ridged portion 526 may engage with and depress the ring valve on the keg. Passageways 528 may provide a pathway for gas venting from the keg during filling operations with the device 500. As can be seen, there may be multiple pathways 528, allowing for multiple gas venting pathways, to increase liquid flow into the keg. This may be similar in structure to the probe described with respect to the embodiment of FIG. 4. The flange portion 508 may direct any gas venting downward onto the upper surface of the keg, away from any user of the device. Further, as the device is engaged onto the keg valve, the ball valve may be engaged first (i.e., prior to the engagement of the ring valve). In doing so, liquid may exit the keg valve as it is opened (since the liquid in the keg may be under pressure as described above). This liquid may spray or stream out at the keg valve area around the probe 506 prior to the device being fully engaged with the keg valve such that the ball valve is fully open and the liquid outlet 524 and the liquid pathway 530 is engaged and available to the liquid for flow. The flange portion 508 may prevent this liquid from spraying upward and/or outward and impacting a user of the device. Instead, any liquid spray may be directed downward by the flange onto the keg upper surface, from which it may run-off or be soaked up by an appropriate absorbent material by a user. In addition, there may be liquid mixed with the gas in the gas venting pathways and this flange may perform the same function in directing such liquid downward onto the keg.

FIG. 5G depicts the internal structure of the device 500. The deflector 514 may be mounted to the upper portion 504 at multiple points (e.g., four points) 532 (the attachment points 532 can also be seen in FIG. 5A). The deflector may be molded as part of the device 500 or may be separately formed and then joined with the upper portion 504 (funnel assembly 510) of the device 500 through glue, welding, or other attachment methods. The deflector 514 may be made of the same or different material than upper and lower portions of the device 500.

As described above, a liquid pathway 530 exists between a lower portion of the funnel portion 510 and the probe assembly 506 at 524. Thus, liquid may enter the funnel assembly 510 at its upper opening 512 and flow downward through the liquid pathway, eventually existing the probe assembly 506 between the structures 522 at portion 524. When the device 500 is engaged with a keg, the liquid may then flow from the device into the ball valve portion of the keg valve and into the keg.

When the device 500 is engaged with the keg, according to exemplary embodiments, the probe assembly 506 may engage with the keg valve structure, as described herein. The probe assembly may depress the ball valve and the ring valve of the keg valve, creating both a liquid pathway into and out of the keg and gas venting pathway. Because the keg contents are liquid and may be under pressure, the liquid may vent through the ball valve portion and up into the device 500 through the liquid outlet 524. This venting liquid may move upward through the liquid pathway 530 and into the funnel portion of the device. The liquid stream may then impinge upon the lower surface, or underside, 534 of the deflector 514. The sloped shape of the deflector 514 (as depicted in FIG. 5G, for example) may deflect the liquid downward. This deflected liquid may then flow back into the keg through the liquid pathway 500. Simultaneously to any liquid venting, gas in the keg may vent through the keg ring valve and through the probe assembly 506 structure (i.e., pathways 528), lowering the pressure in the keg. This is referred to as degassing. The degassing allows for liquid flow into the keg since the gas has a pathway to exit as the liquid volume is increased in the keg volume.

Once the degassing is complete and the pressure in the keg on the liquid is relieved, liquid filling may be commenced.

Figure 6:
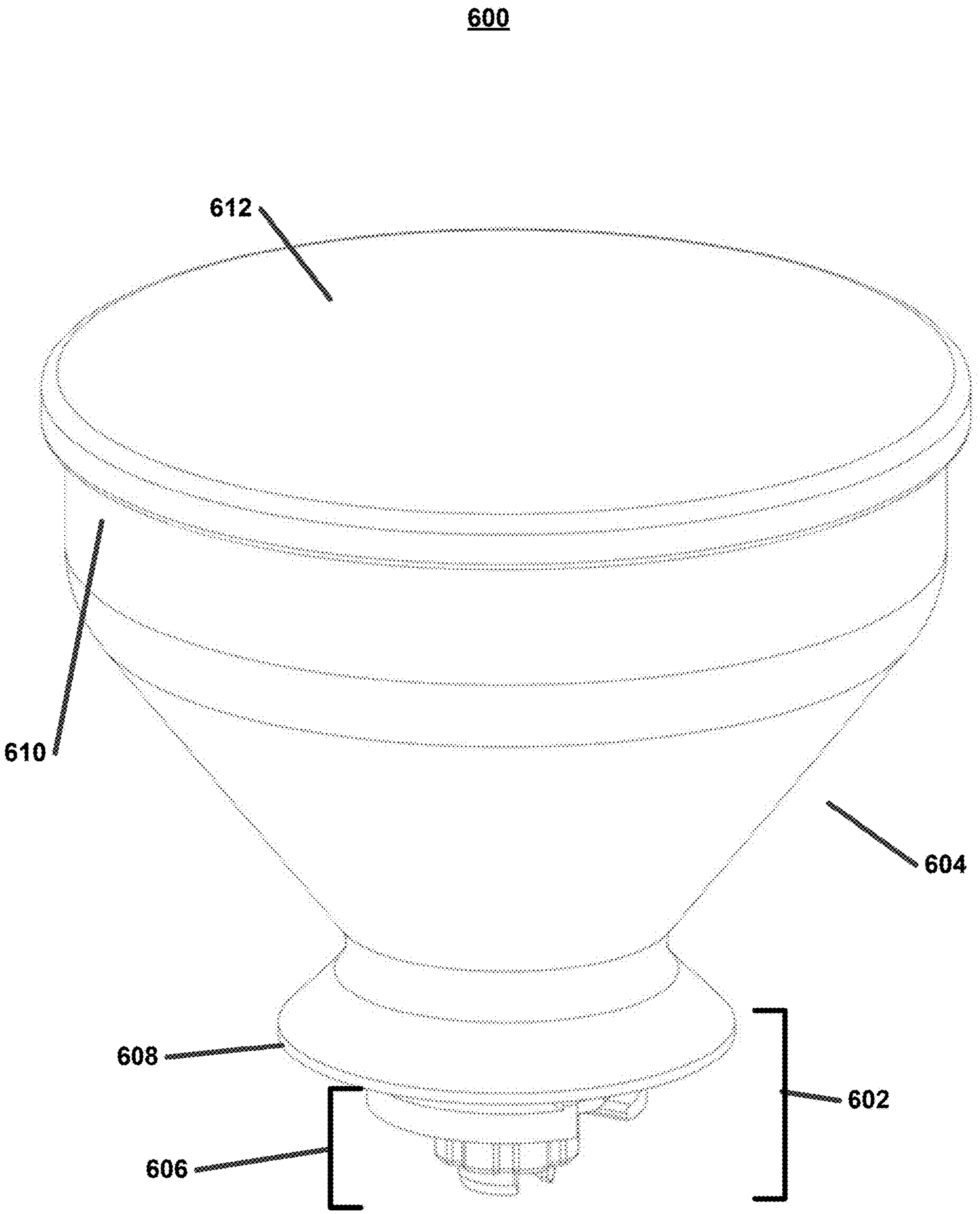
FIG. 6 illustrates a top perspective view of a filling apparatus, according to a fifth embodiment.

FIG. 6 show a fifth device according to exemplary embodiments. The device 600 may have a lower portion 602 and an upper portion 604. The lower portion 602 may include a probe assembly 606 and flange portion 608. The upper portion 604 may have a funnel assembly 610 having a cap 612. The device 600 may have the same basic structure as the embodiment depicted in FIG. 5 with the addition of the cap 612. The device 600 may also lack the deflector structure of the device 500. Otherwise, the description of the device 500 is applicable to the device 600 with respect to construction, operation, and structure.

A modification from the device 500 is that the cap 612 may be used to contain liquid that may escape during degassing of a keg. The cap 612 may take the place of the deflector structure decribed with respect to FIG. 5. Following degassing, the cap 612 may be removed to allow for liquid (such as alcoholic spirits) to be added to through the device 600 into the keg to which it is coupled.

The cap 612 may be removably coupled to the upper portion of the funnel assembly 610. The funnel assembly 610 may have a lip around its upper extremity to allow for a snap fit of the cap 612. Other securement of the cap 612 may be used such as an interference fit. The securement of the cap 612 should be of sufficient strength to resist the impact of a liquid stream from a keg during degassing operations and not be dislodged. In some embodiments, the device 600 may have the deflector structure of the device 500 in addition to the cap 612 to provide added protection to a user from escape of liquid during degassing of a keg. The cap 612 may be constructed of the same or different material of the device 600.

It should be appreciated that the cap depicted in FIG. 6 may be used with the other embodiments shown and described herein, such as those depicted in FIGS. 2, 3, 4, and 5. The cap may be used as a way to keep the interior of the funnel clean and/or free of debris prior to use. The cap may be used as a back-up to the mechanisms on each embodiment to prevent liquid streams out of the keg during degassing. The cap may be removed prior to use of the device to add liquid to the keg. The cap may be replaced following addition of liquid to the keg.

The filling apparatus according to exemplary embodiments disclosed herein can be used to dispense one or more liquids into a keg. According to exemplary embodiments, the keg may be filled with a liquid pre-mix. The liquid pre-mix may be non-alcoholic. The liquids dispensed into the keg, according to exemplary embodiments, include alcoholic spirits. However, non-alcoholic liquids may be dispensed.

FIGS. 7A, 7B, 7C, 7D, 7E, 7F, 7G, 7H, 7I, and 7J (collectively referred to as FIG. 7) show a sixth device according to exemplary embodiments. The device 700 may have a lower portion 702 and an upper portion 704. The lower portion 702 may include a probe assembly 706. The upper portion 704 may have a funnel assembly 708 having an opening 710. The opening 710, at the upper portion of the funnel assembly 708 may taper downwards towards the lower portion 702. The device 700 may further include a movable or sliding piston 712 that is centrally located in the upper portion 704 and extends downward thought the lower portion 702. The piston 712 is described in more detail below.

The device 700, including the lower and upper portions 702 and 704 and the piston 712, may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein. The funnel assembly may be of various sizes according to exemplary embodiments. For example, the funnel assembly may be sized to accommodate up one liter of fluid. In other embodiments, the funnel assembly may be of different sizes. For example, funnel assembly may be sufficiently large (e.g., about 5.5 inches wide by about 4.25 inches high) to accommodate a reasonable amount of fluid for flow into the keg to allow to filling of the keg in a minimum amount of time.

The lower portion 702 may have a probe assembly 706. The probe assembly may include a coupling ring 714 that may be configured to engage with the keg valve structure. The coupling ring 714 may be engaged by positioning it onto the keg, pushed down, and twisting until the coupling ring 714 fully engaged in order to lock the device 700 in place and create a seal with the keg valve. The coupling ring 714 may have two cut-outs 716 that are configured to engage with two teeth located on the valve structure of the keg. This locks the device 700 into place. After the teeth are positioned into each cut-out 716, a ramped portion 718, including stop tabs 724, may allow for locking engagement of the coupling ring 714 with the keg valve structure when twisted or turned into place.

The probe assembly 706 may include a ridged portion 720 extending downward and surrounding an opening 722 in which the lower end 726 of the piston 712 is movably contained. The ridged portion 720 may be configured to engage with and depress the ring valve on the keg. The ridged portion may be sized such that is slightly smaller than the width of the ring valve structure. This ridged portion may be a circular structure surrounding the opening 722. This may allow for a gas venting path out of the keg through the ring valve, when depressed, around the ridged portion and to the atmosphere. It is expected that there may be liquid mixed with the gas that is vented, and some liquid spray may occur during initial degassing of the keg upon engagement of the device 700.

Figure 7A:
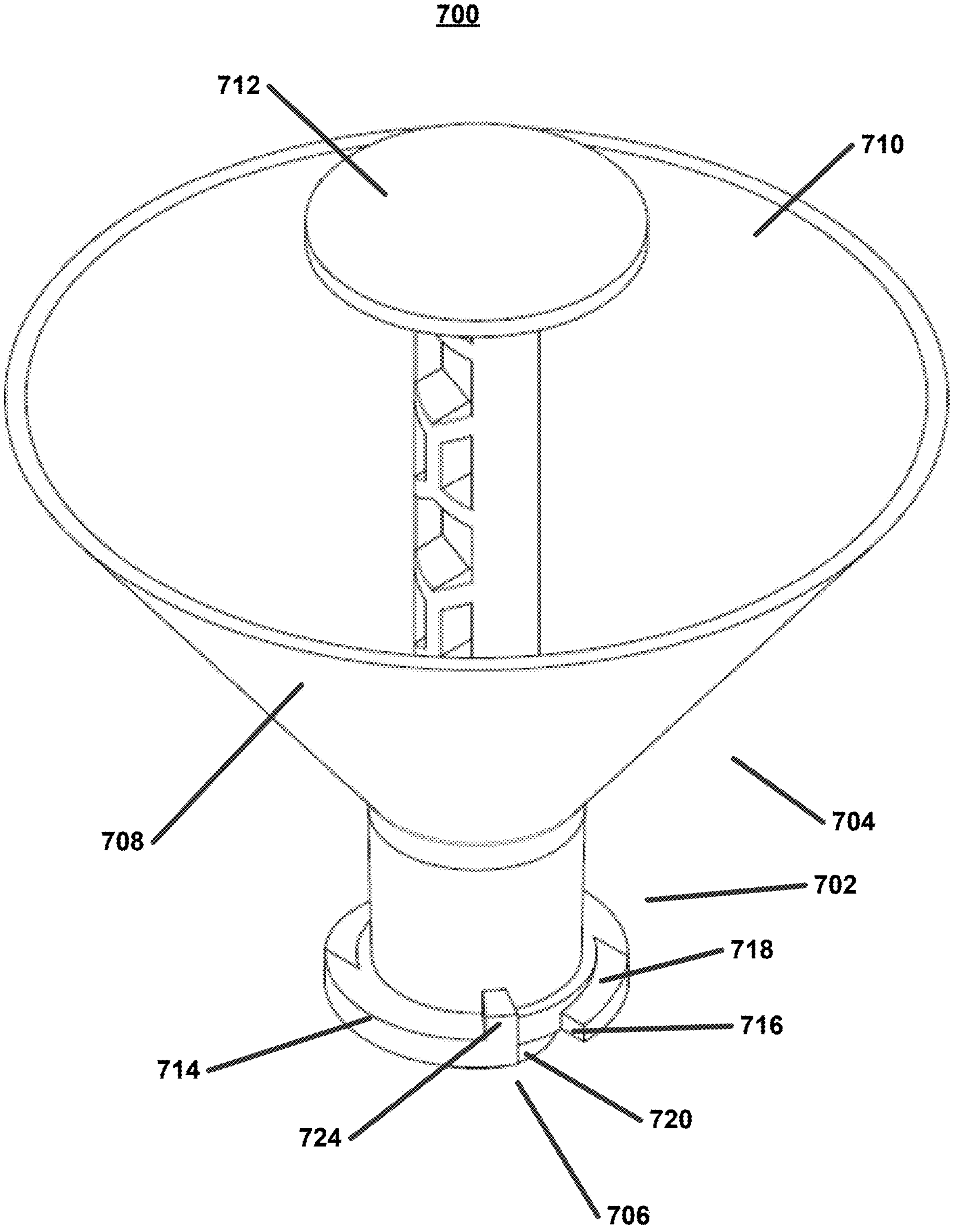
FIG. 7A illustrates a top perspective view of a filling apparatus, according to a sixth embodiment.
Figure 7B:
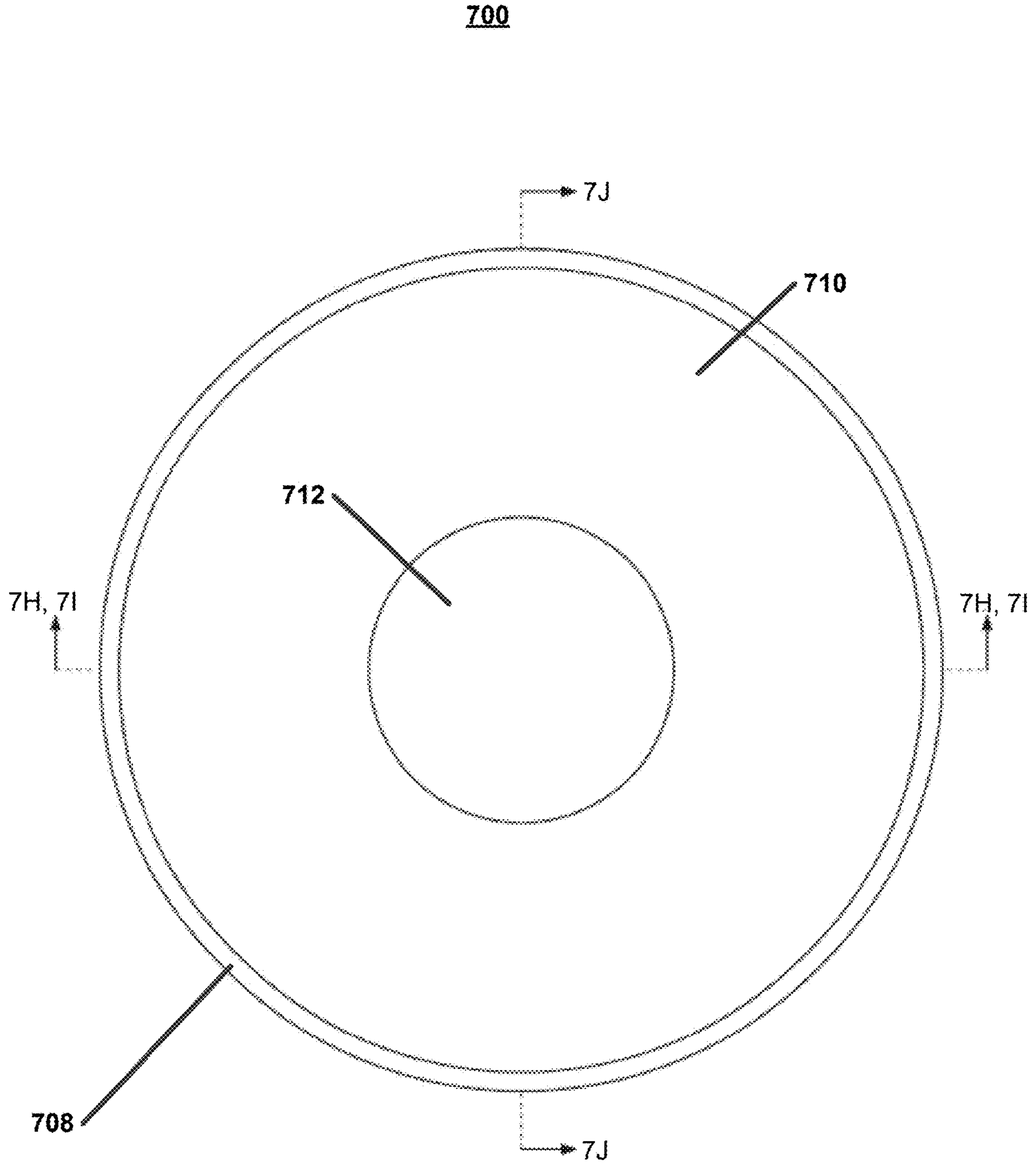
FIG. 7B illustrates a top view of the filling apparatus, according to a sixth embodiment.
Figure 7C:
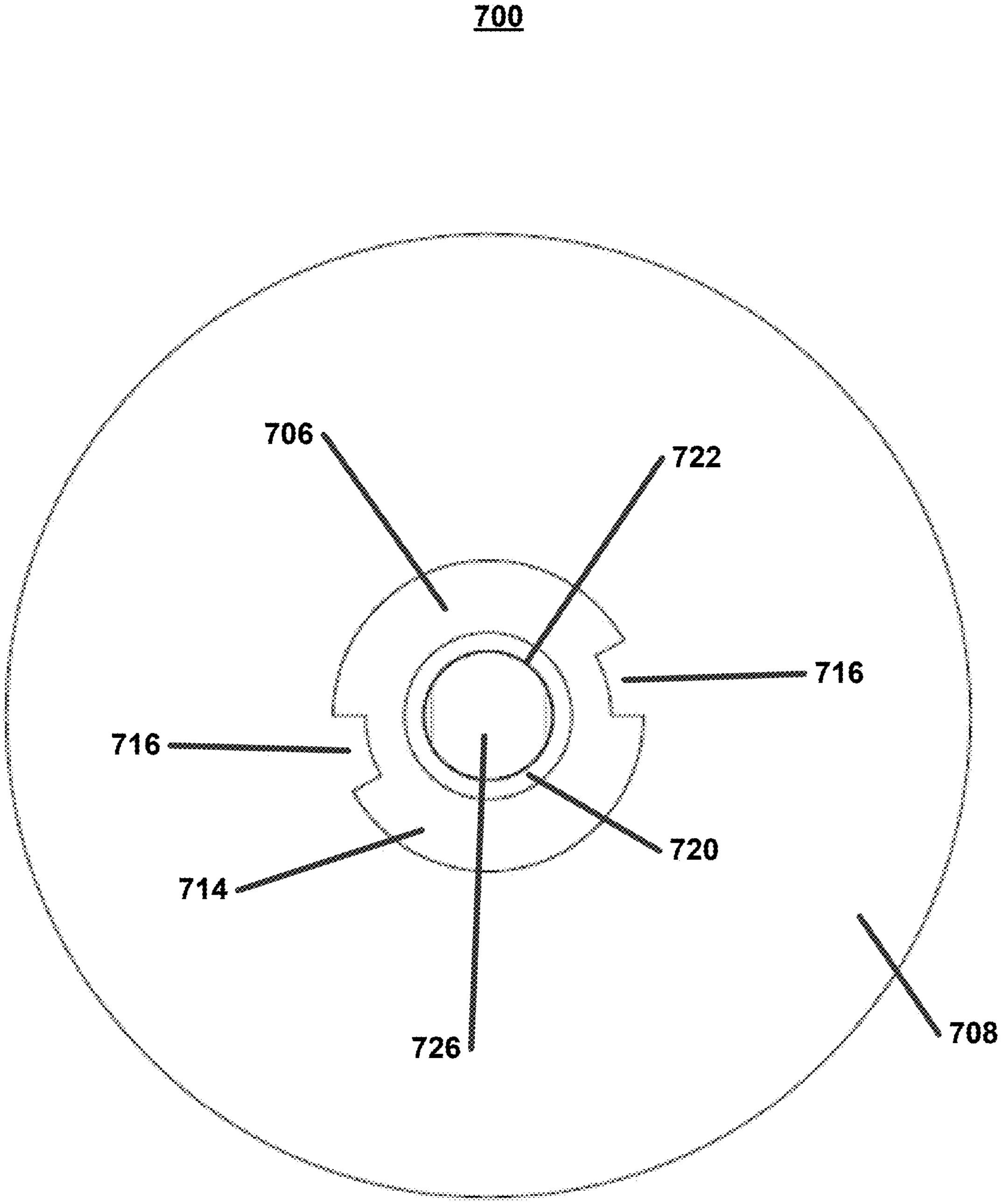
FIG. 7C illustrates a bottom view of the filling apparatus, according to a sixth embodiment.
Figure 7D:
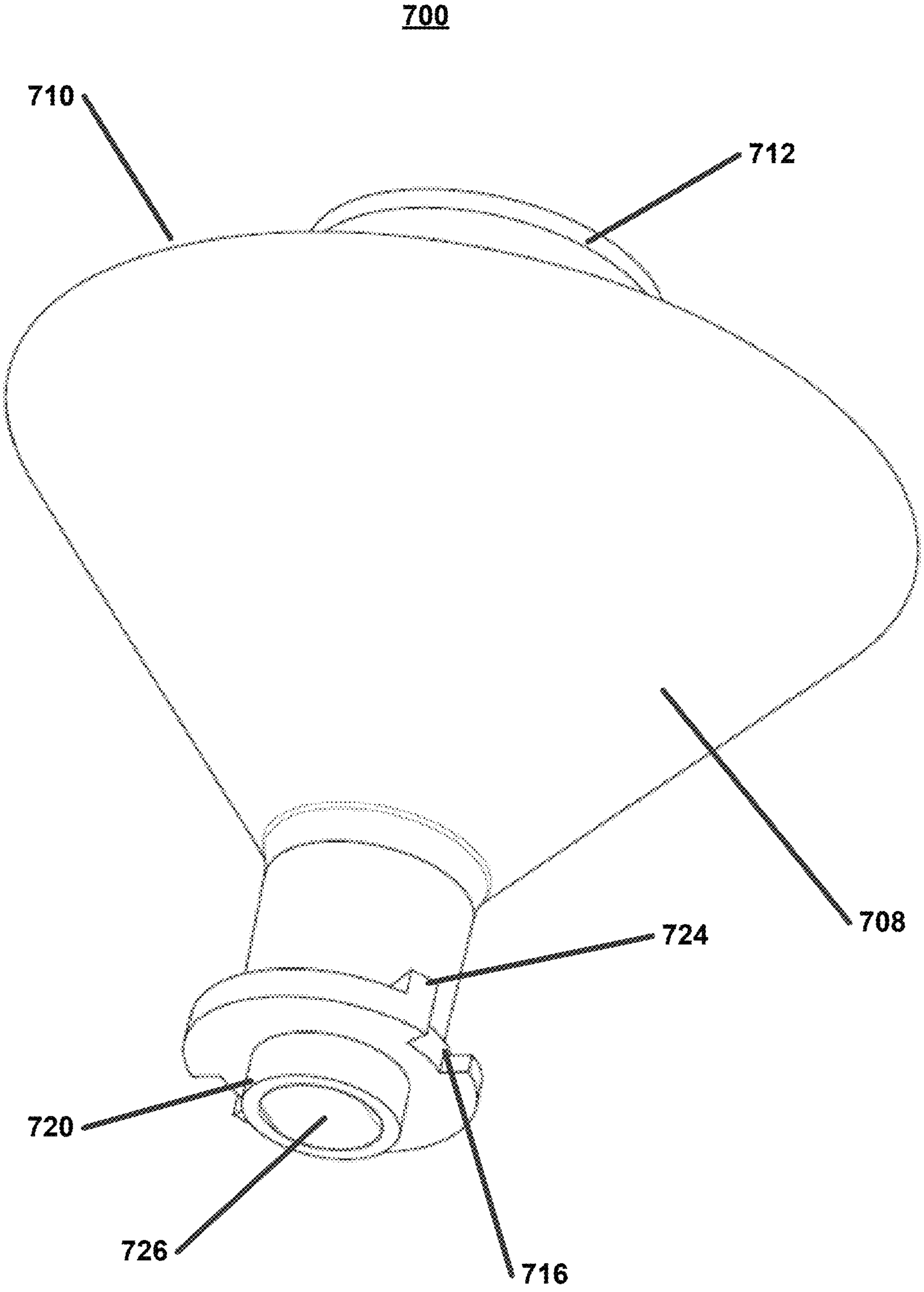
FIG. 7D illustrates a bottom perspective view of the filling apparatus with a piston in the up position, according to a sixth embodiment.
Figure 7E:
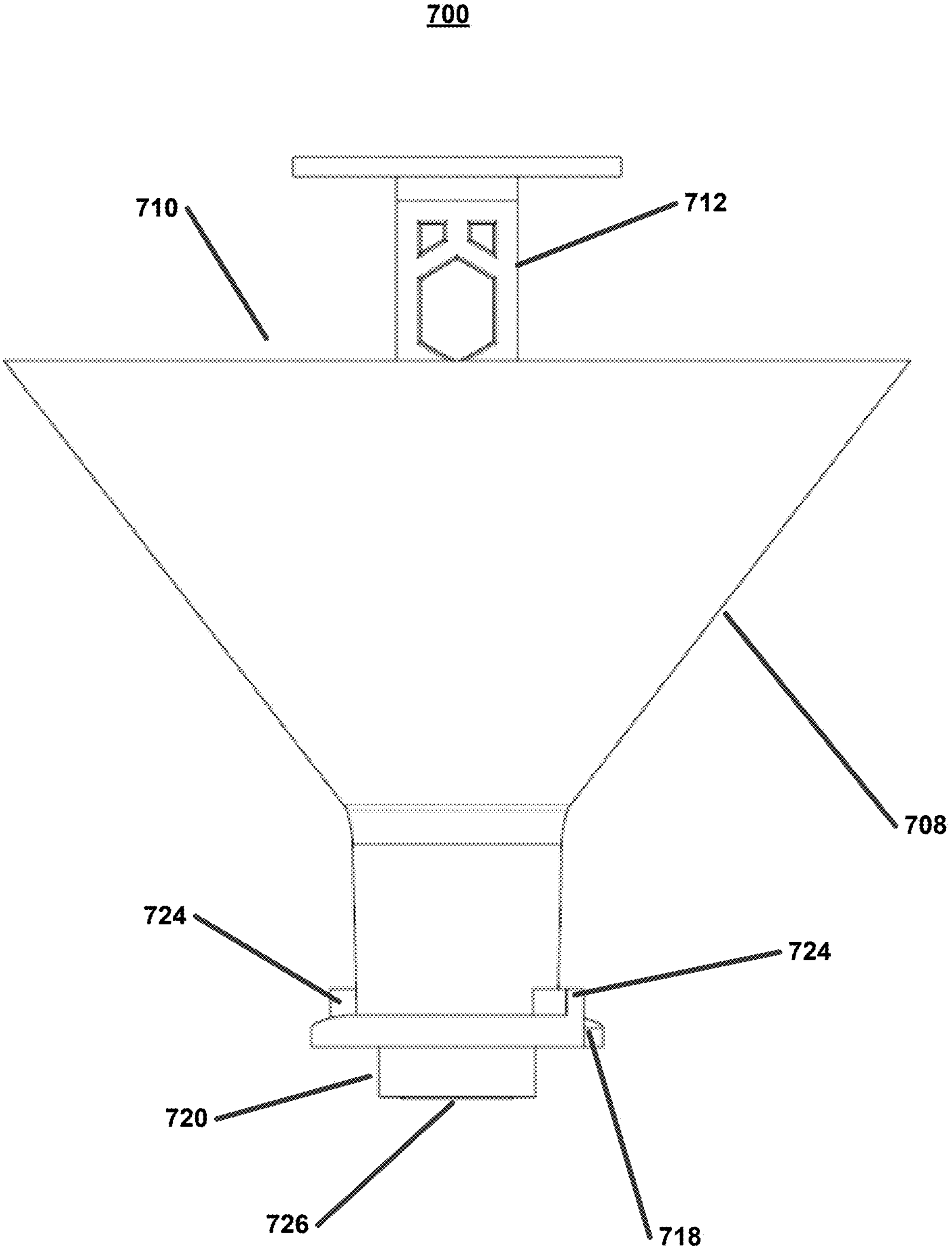
FIG. 7E illustrates a side view of the filling apparatus with the piston in the up position, according to a sixth embodiment.
Figure 7F:
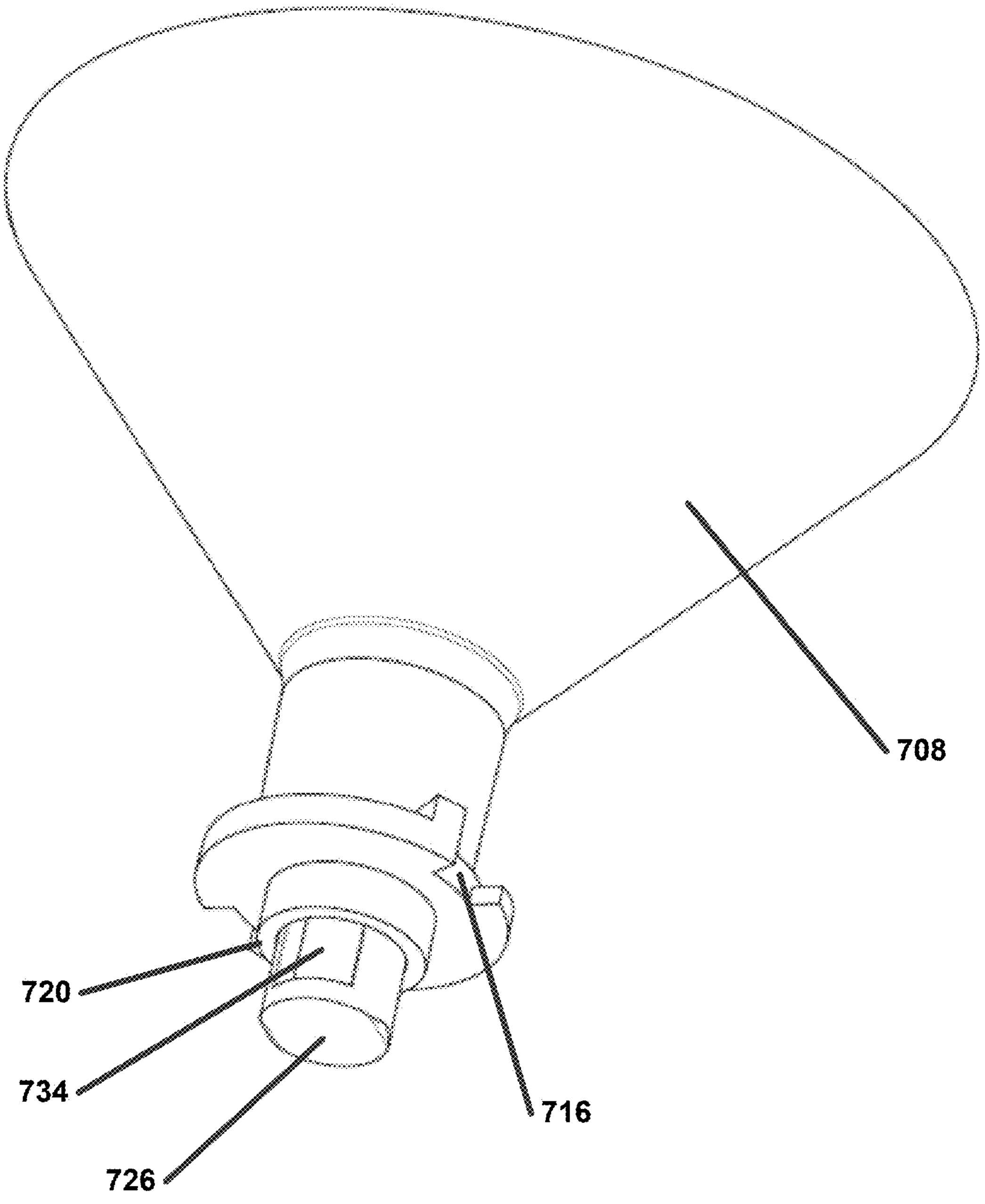
FIG. 7F illustrates a bottom perspective view of the filling apparatus with the piston in the down position, according to a sixth embodiment.
Figure 7G:
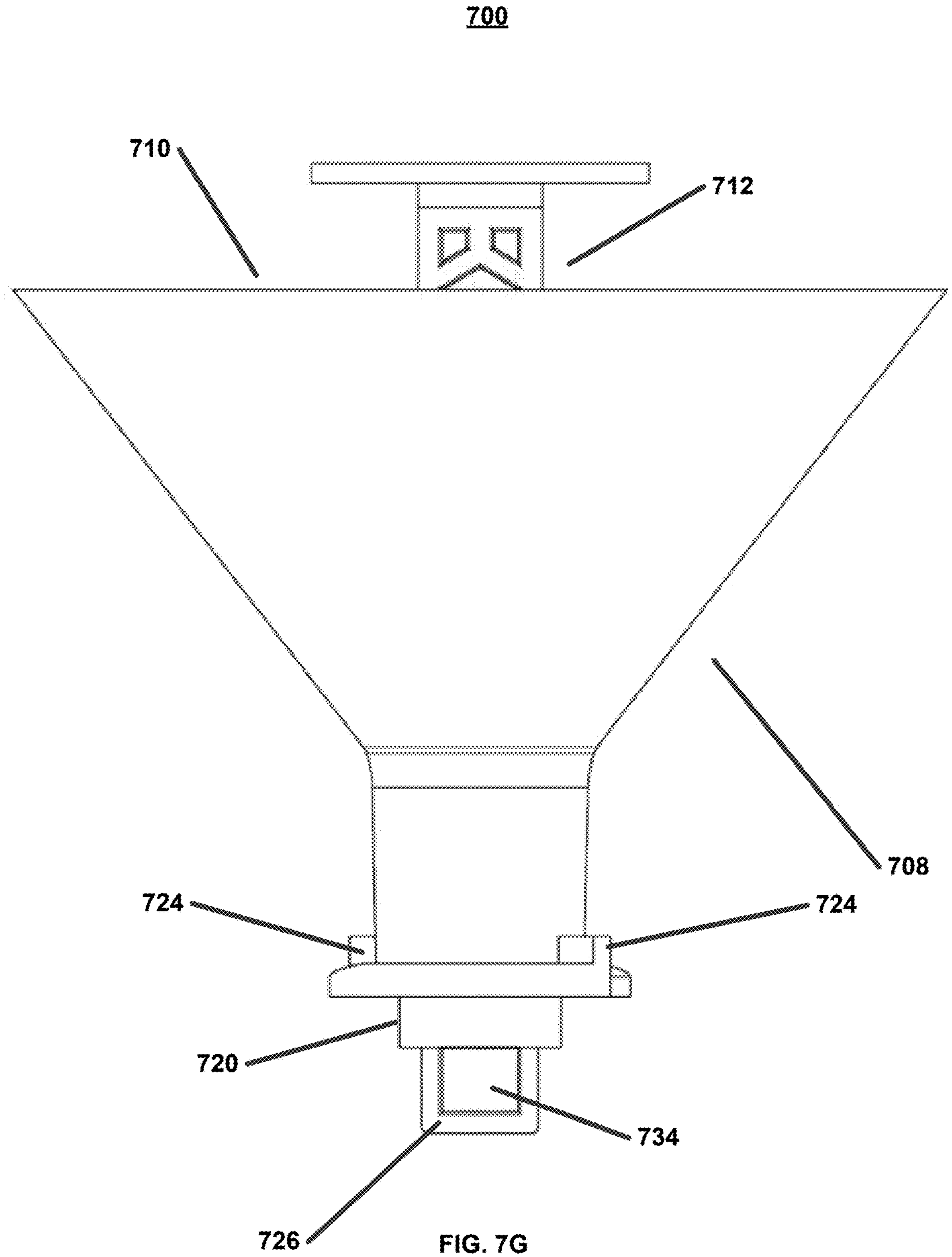
FIG. 7G illustrates a side view of the filling apparatus with the piston in the down position, according to a sixth embodiment.
Figure 7H:
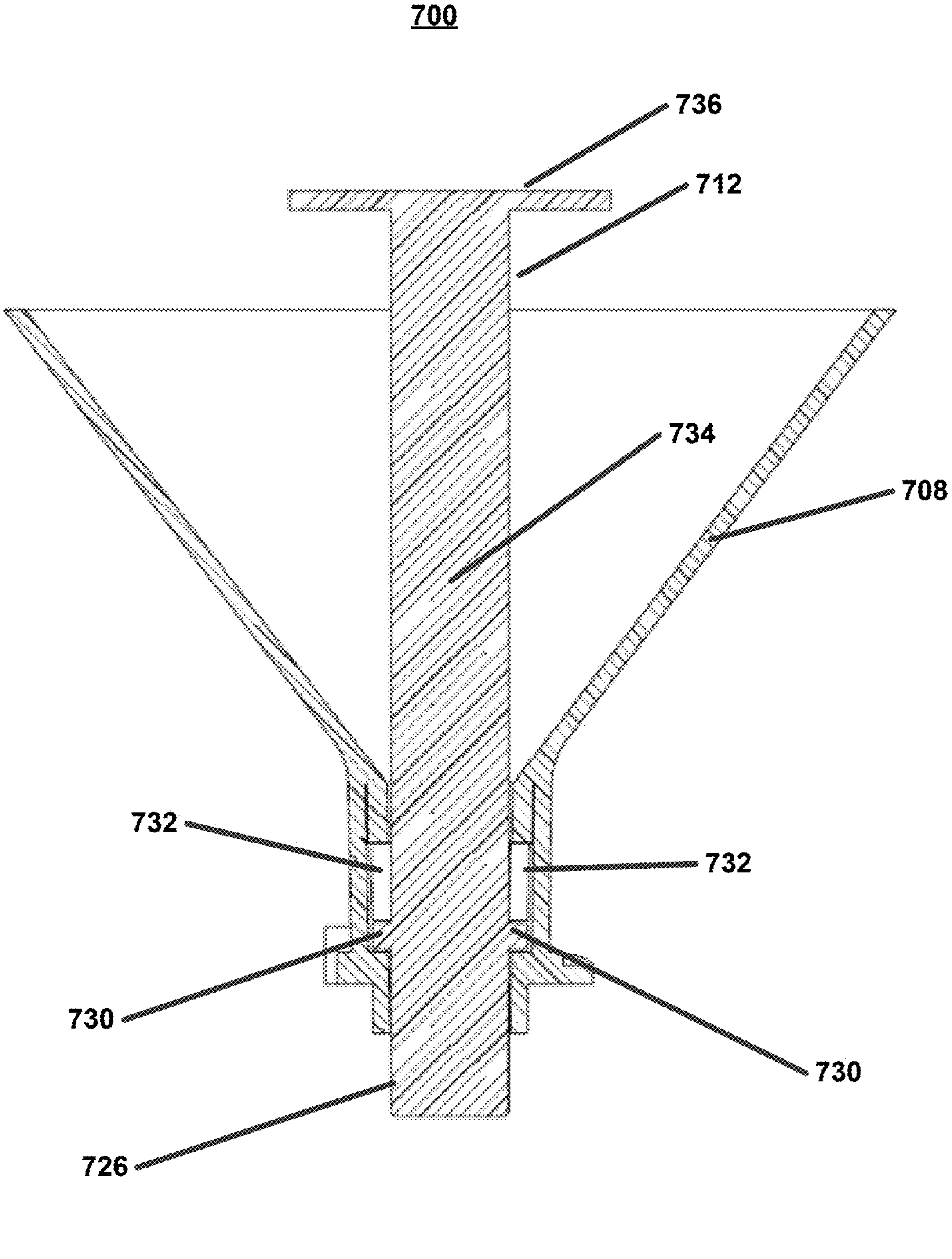
FIG. 7H illustrates a cross-sectional view of the filling apparatus with the piston in the down position, according to a sixth embodiment.
Figure 7I:
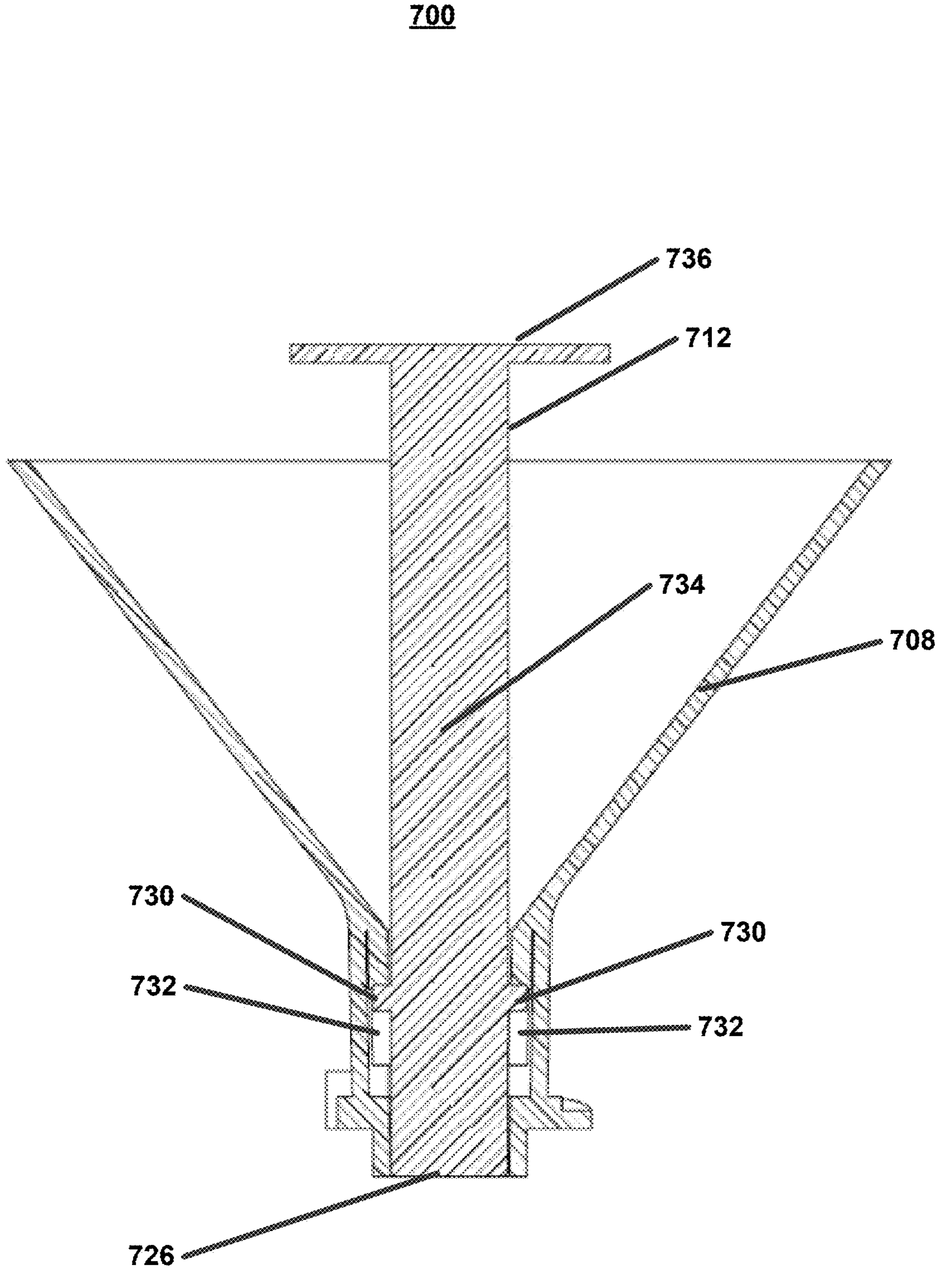
FIG. 7I illustrates a cross-sectional view of the filling apparatus with the piston in the up position, according to a sixth embodiment.
Figure 7J:
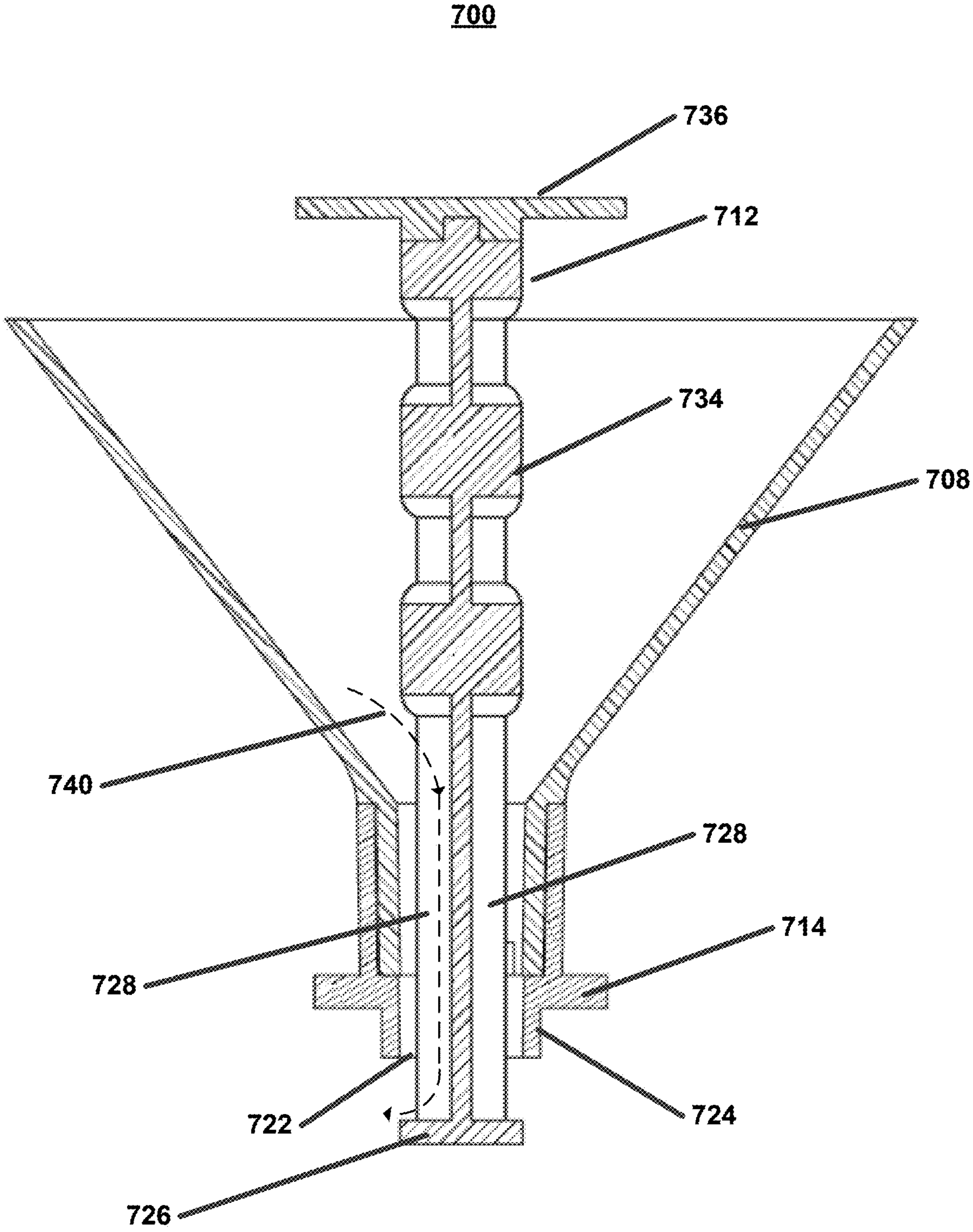
FIG. 7J illustrates a cross-sectional view of the filling apparatus with the piston in the up position, according to a sixth embodiment.
Figure 7K:
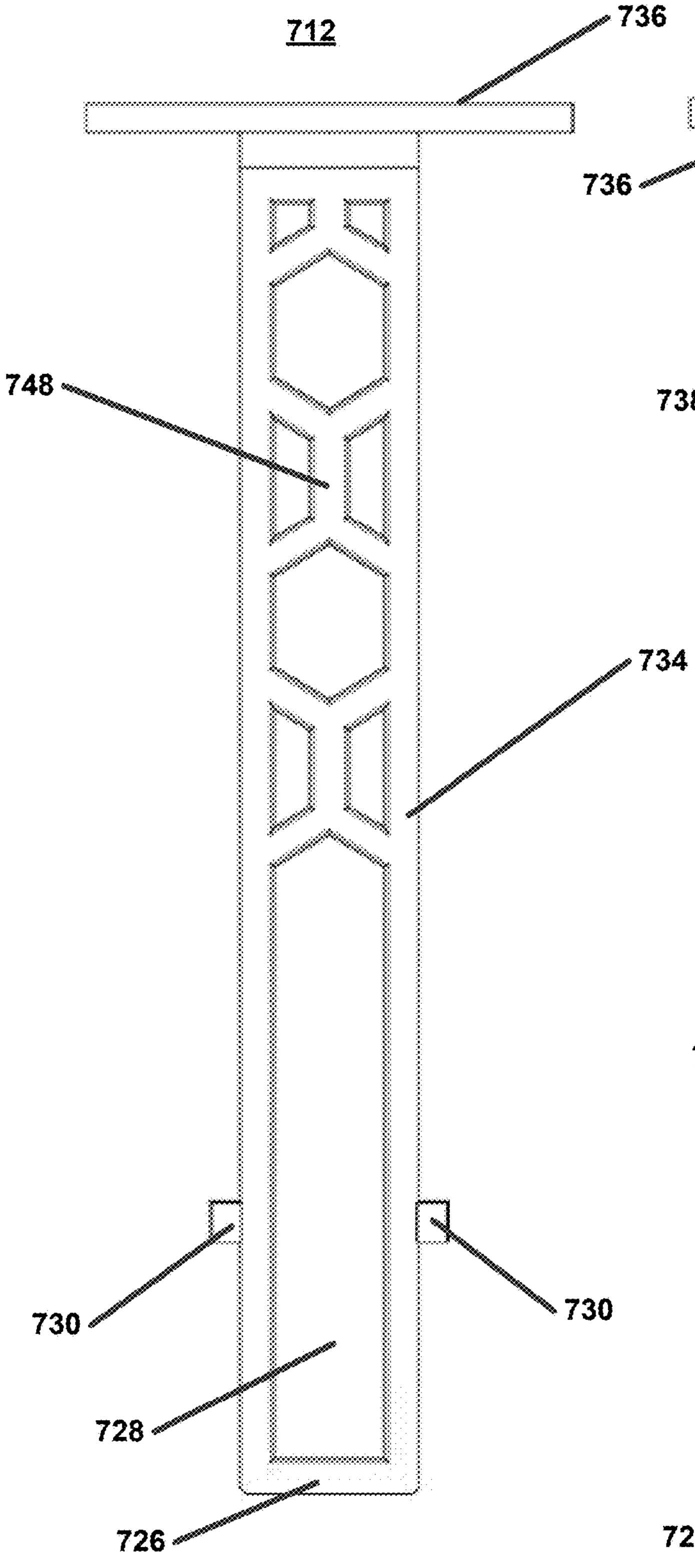
FIG. 7K illustrates a side view of the piston for the filling apparatus according to exemplary embodiments.
Figure 7L:
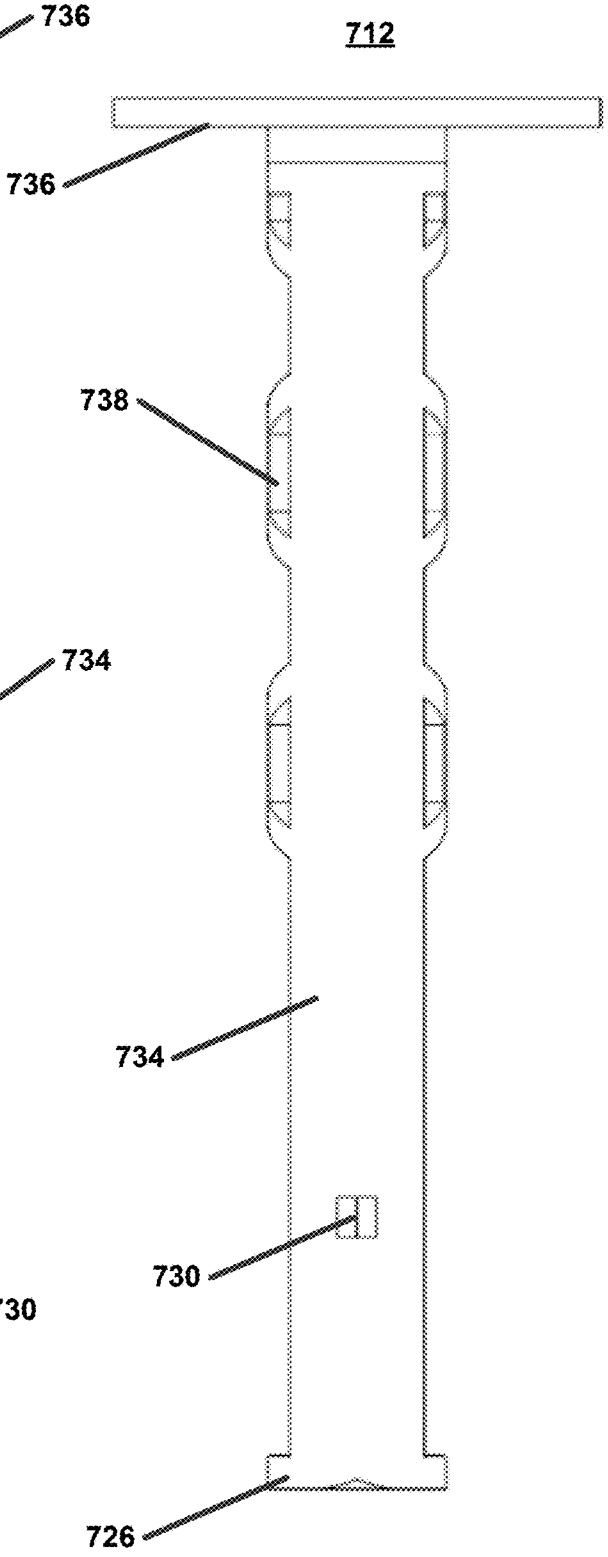
FIG. 7L illustrates a second side view of the piston for the filling apparatus according to exemplary embodiments.
Figure 7M:
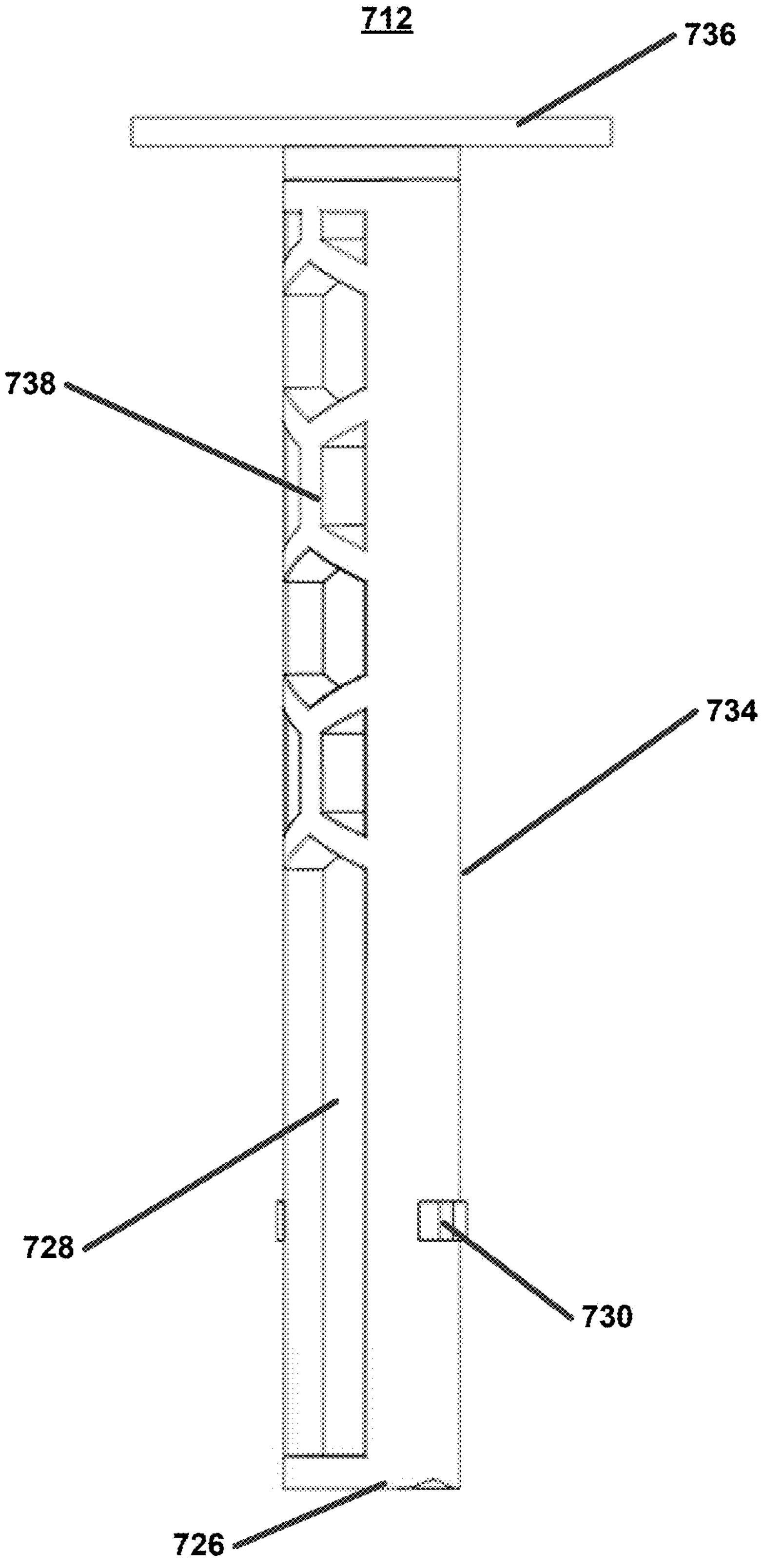
FIG. 7M illustrates a third side view of the piston for the filling apparatus according to exemplary embodiments.

FIGS. 7K, 7L, and 7M depict the piston 712 according to exemplary embodiments. The piston 712 may have a shaft 734 and a handle 736. It should be appreciated that the piston 712 is configured and dimensioned to fit into the device 700 and move between its upper and lower positions. To facilitate movement of the piston up and down as described herein, a slight tolerance or spacing between the piston and the internal walls of the lower portion 702 is necessary. Also, as can be seen in FIG. 7, the handle 736 may protrude above the upper rim of the upper portion 704, that is, the upper rim of the funnel assembly 708. The handle may protrude in both positions. The handle may assist a user in moving the piston. The cross-hatching design 738 on the shaft 734 of the piston 712 may be decorative in nature and is meant to be exemplary.

The piston 712 may be movable between a lower and an upper position. In the lower position, the piston 712 may have its lower extremity 726 extending out past the opening 722. The piston 712 may have one or more channels 728 located thereon. When the piston 712 is in the lower or extended position, a liquid pathway may be created from the funnel portion 708 through the lower portion 702 and out of the device 700 through the channels 728. When the device 700 is engaged onto a keg as described herein, in the lower position, the piston 712 may actuated and depress the ball valve portion of the keg. Thus, liquid may flow through the device 700 and into the keg. The liquid may flow out of the device 700 using channels 728 located on the shaft 734 of the piston 712. Specifically, the channels 728 may be located near the lower extremity 726 and provide a channel for liquid to flow down past the piston and exit the device 700 when the piston is extended or lowered. FIG. 7J shows a cross-section in which the channel 728 and a fluid flow path 740 can be seen when the piston is extended or lowered. FIGS. 7K and 7M provide a view showing the channel 728 on the piston 712 removed from the device 700. It should be appreciated that the same cut-out 728 is located on the opposite side of the piston. The flow path 740 for the liquid extends from the funnel portion 708 through the lower portion 702 and exits at 722 through the lower extremity 726 of the piston. It should be appreciated that a similar path is present on the opposite of the piston (not labelled in FIG. 7J).

In the upper position, the lower extremity 726 may be retracted into the opening 722. In this position, when the device 700 is engaged on a keg, the ball valve of the keg is not actuated. In normal use, this is the position in which the device 700 may be engaged onto the keg. In doing so, liquid is prevented from venting through the ball valve during degassing of the keg prior to filling of the keg. Once the keg is degassed, the piston can be moved from the upper position to the lower position.

The piston 712 may have two tabs 730 that act as stops between the upper and lower positions. The tabs 730 may travel in channels 732 located in the sides of the lower portion 702 of the device 700. Cross-section views shown in FIGS. 7H and 7I (both taken along the line in FIG. 7B labeled as 7H) depict the tabs in the channels.

Figure 8:
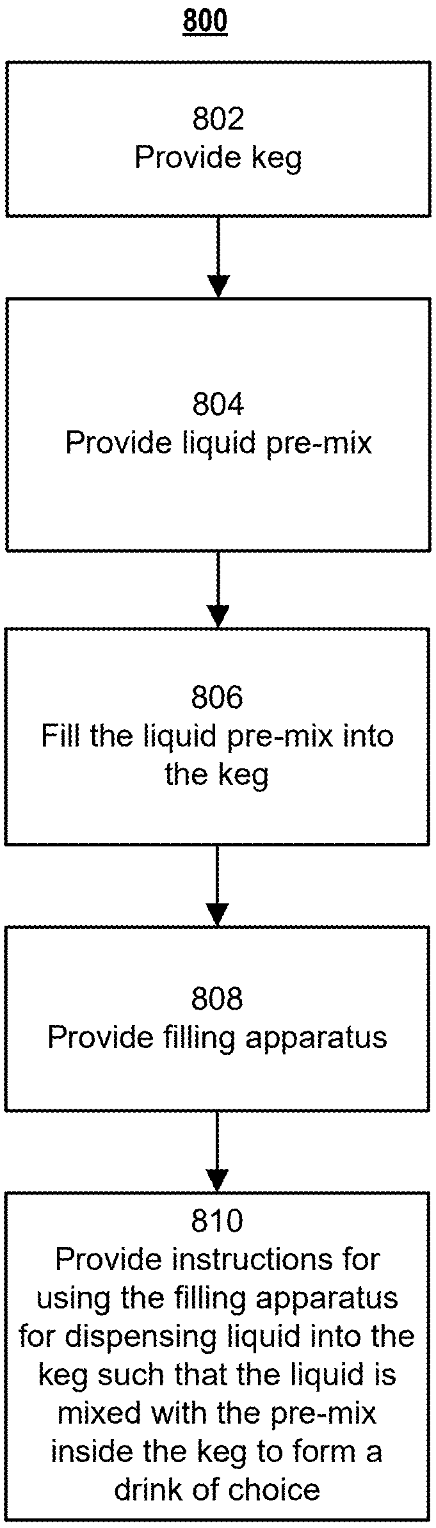
FIG. 8 is a flow chart for an example process of providing a keg partially filled with a non-alcoholic, liquid premix, according to an embodiment.

FIG. 8 illustrates a flow chart for an example process 800 for providing a keg partially filled with a non-alcoholic, liquid premix, according to one embodiment of the invention. The process 800 may be performed, for example, by a user such as a provider or manufacturer of non-alcoholic, liquid pre-mixes for making mixed drinks. The process 800 may include the following steps.

In step 802, a keg is provided. The keg may be any suitable keg, such as a keg with a standard valve that connects to a standard coupler, such as the Sankey A, D, G, M, S, or U type systems. The keg may be a one-time use keg. In a preferred embodiment, the keg includes a Sankey-D valve which is compatible with the Sankey-D coupler that is widely used in bars, restaurants, and other establishment and venues for serving beer on draft. The keg may include a keg bung in a top portion of the keg. The keg bung may be provided with a ball-valve inside the keg bung for, for example, allowing liquid to flow out of the keg but not into the keg. The keg bung may further include other valves, for example, a venting valve (e.g., gas or CO2 valve) that allows flowing gas into to the keg to pressurize liquid out of the keg when the keg is in regular use. The venting valve may be a ring valve that surrounds the ball valve structure. For example, in normal use of the keg, when being dispensed, the venting valve (e.g., CO2 valve) is opened to add pressure to the top of the liquid in the keg, so when the tap is opened at the bar, liquid can flow through the ball valve (also known as a beer valve or liquid valve) out of the keg. The venting valve can also be used to release gas from the keg when adding liquid to the keg, such as, for example, in exemplary embodiments. The Sankey-D coupler, once attached to the keg, can serve two functions: 1) it opens both the venting valve and the ball or beer valve simultaneously so that pressure can be added to the top of inside of the keg, and 2) the liquid can be released from the keg through the ball valve once the tap is opened on the bar, in a restaurant, and/or at other event venues.

In step 804, a liquid pre-mix is provided. The liquid pre-mix may be any desired non-alcoholic pre-mix, including but not limited to, a liquid premix for margaritas, mojitos, mules, Paloma, Tonic, Lemonade, Cola, Seltzer, and/or Sodas. The liquid pre-mix may also comprise a single product such as Coca Cola for a rum and Coke mixed drink, or tonic water for a gin and tonic drink.

In step 806, the liquid pre-mix is filled into the keg to a first desired portion of a capacity of the keg. The liquid pre-mix may be filled into the keg in any manner using any suitable devices or systems as known in the art. The first desired portion of the capacity may be about two thirds of the capacity of the keg according to one embodiment. For example, if the capacity of the keg is about 30 liters, the first desired portion of the capacity may be about 21 liters. Other mix ratios are possible. For example, there are 12.5 liter, 19 liter, and 10 liter kegs. The mix ratio would change therefore based on the keg capacity.

In step 808, the filling apparatus is provided to engage the keg. In various embodiments, the filling apparatus may be provided to an end user. The filling apparatus may be provided with the keg that is filled with the pre-mix as described above. The filling apparatus may be referred to as a keg spiker. The filling apparatus may be that described herein according to exemplary embodiments. The filling apparatus may be engaged with the keg at a later time, such as at a location of an end user.

In step 810, instructions for using the filling apparatus for dispensing the liquid (e.g., alcohol) into the keg is provided to an end user. The instructions may describe how the alcoholic liquid is mixed with the non-alcoholic pre-mix inside the keg to form a mixed drink of choice. This step may be optional.

Figure 9:
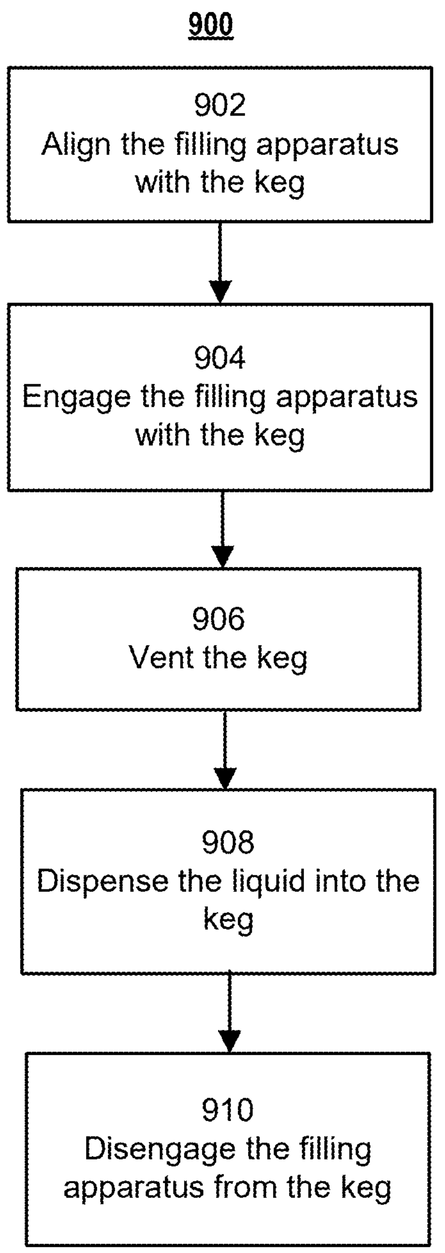
FIG. 9 is a flow chart for an example process of using a filling apparatus for dispensing a liquid into a keg, according to exemplary embodiments.

FIG. 9 illustrates an example of a method of using the filling apparatus to dispense the liquid into a keg. The method 900 may include the following steps.

In step 902, the filling apparatus is aligned with the keg bung disposed in the top portion of the keg. For example, by grasping and manipulating the filling apparatus, the bottom terminal of the filling apparatus is in a position ready for fitting into the keg bung.

In step 904, the filling apparatus is engaged with the keg bung by twisting the filling apparatus clockwise, according to one embodiment, so as to be able to simultaneously depress and open at least a portion of the keg bung valve (e.g., the ball valve and/or the venting valve) received in the keg bung and lock the filling apparatus into place to the keg bung. Securing the filling apparatus onto the keg bung can be achieved with the locking ring or coupling ring and the keg locking slots or teeth that engage with the ring on the device. Locking securely is required to create a tight non-leaking seal to the keg. According to exemplary embodiments, one embodiment may require depression of the lever on the Sankey-D coupler to extend the probe section to displace the ball valve structure of the keg. Other embodiments, may only require securing as described above to secure the filling device and actuate the valve structure of the keg, as described above. During the engagement and following the engagement, in certain embodiments, the filling apparatus valve on the filling device may remain closed. In some embodiments, the sliding piston may remain in the upper or closed position and only the ring valve on the keg is actuated (the ball valve remaining closed or unactuated). In other embodiments, that lack a valve, the gas may vent once the filling device is engaged and the venting valve is opened. In various embodiments, a deflector or a cap may prevent liquid from escaping the device and impacting a user. This may allow for degassing of the keg to relieve pressure on the liquid (e.g., pre-mix in the keg) and prevent the liquid from exiting out of the keg and through the filling device. The gas vented may be a nitrogen gas, a carbon dioxide gas, an air gas, or combinations thereof.

In step 906, the keg is degassed or vented. This occurs because the gas in the keg now has an exhaust path through the filling apparatus. With the filling apparatus valve closed or sliding piston in the closed position or once the filling device is engaged, according to exemplary embodiments, the gas may vent through the vent opening(s) on the filling apparatus and to relieve pressure on the liquid in the keg. Otherwise, if the valve was opened on the filling apparatus, liquid may exit under pressure through the keg ball valve and out through the filling apparatus. In various embodiments, the liquid may exit the keg but impinge upon the deflector portion or cap portion of the filling device and flow back into or onto the keg. Once the keg is degassed and the pressure relieved in the keg, the valve may be opened to open the liquid pathway. In various embodiments, the cap may be removed to allow access to the funnel opening to add liquid or liquid may be added directly into the funnel without any additional actions by the user (e.g., in the embodiment with the deflector, liquid may be added directly to the funnel portion). In some embodiments, the sliding piston may be depressed to actuate the ball valve on the keg and create a liquid pathway though the filling apparatus.

In step 908, the liquid, e.g., alcoholic spirits, is dispensed into the keg to a second desired portion of the capacity of the keg. In order to dispense the liquid into the keg, the filling apparatus valve is opened creating a pathway from the funnel portion of the filling apparatus and into the keg through the ball valve. In various embodiments, the liquid pathway is open in the device as is (i.e., no valve is present). In some embodiments, the liquid pathway is only open when the sliding piston is in the lower or open position. While the liquid is dispensed into the keg, further gas may be released from inside of the keg through the venting valve and through venting opening on the filling device. The liquid is added (poured) into the upper funnel portion of the filling apparatus and then flows downward through the apparatus (the liquid pathway as described above for the various embodiments) from which it exits into the keg through the ball (or beer) valve (that has been depressed by the probe of the filling apparatus), and then flows down the tube (or spear) which extends from the ball valve into the keg (as described above with respect to the keg structure).

The liquid may be added in volume to a desired portion of the keg capacity. This can be all or a portion of the remaining keg capacity (i.e., capacity not filled with the pre-mix). For example, if the keg has been filed ⅔ full of the non-alcoholic, liquid cocktail mix, the remaining portion, used to pour in the alcohol, can be up to the remaining ⅓ of the keg capacity. Thus, if the capacity of the keg is about 30 liters and the pre-mix volume is about 21 liters (the non-alcoholic, liquid pre-mix is filled up to about 21 liters), the remaining portion added with the filling apparatus may be up to 9 liters. Different amounts of the liquid dispensed into the keg may form different flavors or varieties of the mixed drink. It should be appreciated that various ratios of liquid pre-mix and additive liquid may be used as desired to achieve the desired drink mix and flavoring. It should also be appreciated that the volume of alcohol added to the keg depends on the keg capacity as there are other keg capacities (i.e., different than 30 liters described above). For example, there are 12.5 liter, 19 liter, and 10 liter kegs. The volume amount of pre-mix and alcohol thus may be adjusted accordingly based on the keg capacity.

The liquid dispensed into the keg using the apparatus can be any suitable liquid for forming the drink of choice by mixing the dispensed liquid with the pre-mix inside the keg. For example, the liquid dispensed into the keg using the apparatus can be alcoholic spirits of various amounts to form various mixed drinks. Different types of alcoholic spirits may be added to the keg to form a blend with the pre-mix. For example, different flavors of an alcoholic spirit may be added together to the keg or different types of alcohol may be added to the keg. The proportions and the type of alcohol (or other liquid) added to the pre-mix may change the flavor of the resulting drink in the keg.

In step 910, the filling apparatus is disengaged from the keg. After dispensing the liquid into the keg, the filling apparatus may be disengaged from the keg bung and removed. The filling apparatus may be removed by rotating it in a counter-clockwise direction to disengage it from the locking threads of the keg bung. That is, the reverse operation of step 904 may be performed. In exemplary embodiments, the lever on the Sankey-D coupler may be required to be raised to disengage the probe section from the valve. In some embodiments, the valve on the filling device may be closed prior to removal or the sliding piston may be raised to the upper position before disengagement.

In some embodiments, the method 900 may further include shaking the keg to significantly mix the non-alcoholic liquid pre-mix and the alcohol inside the keg to form the drink of choice. For example, the keg may be shook for 15 seconds to ensure that the fluid volume in the keg is sufficiently mixed to ensure a consistent output mixture.

In some embodiments, the method 900 may include engaging the keg spear or valve assembly with a standard dispensing apparatus to dispense the drink of choice. For example, in a bar, the keg may be set up with a standard Sankey coupler to dispense the mixed drink to customers, that is, to provide a mixed drink on draft through a standard Sankey coupler and tap, which are widely used for serving beer in bars, restaurants and other establishments.

In the methods described above the filling apparatus may have a cap in addition to having a valve or deflector. The cap may keep the filling apparatus clean and/or free of debris prior to use. The cap may be removed prior to using the filling apparatus to dispense alcohol into the keg. For example, in the method 800, at step 808, the filling apparatus may be provided with a cap over its upper opening. In the method 900, the cap, if provided, may be removed prior to step 908 and filling of the keg using the apparatus. The cap, if provided, may be kept in place during degassing of the keg (e.g., at step 906). In some embodiments, the cap may be removed before or after step 904 (engaging the filling apparatus with the keg). The cap, if provided, may be replaced before or after step 910 (disengaging the filling apparatus from the keg).

Figure 10A:
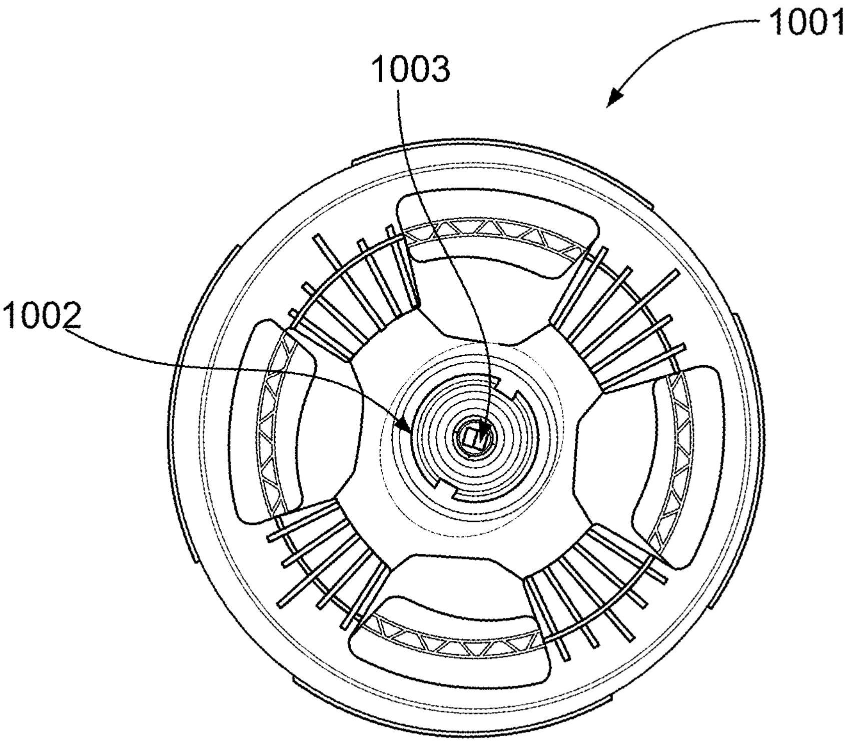
FIG. 10A illustrates a top view of a keg according to an exemplary embodiment.

FIG. 10A illustrates a top view of an example keg 1001, according to an embodiment of the invention. The keg 1001 shown in FIG. 10A may be a conventional steel keg or a one-time use plastic keg. In various embodiments, the key may be of any type and may be made of any material, such as a recyclable material, plastic, metal. The keg may be clear or opaque. As shown in FIG. 10A, a keg bung assembly 1002 is coupled to the top of the keg 1001. The keg bung assembly 1002 may be removably coupled to the keg 1001 or may be integrated to the keg 1001 (e.g., by molding, melding, or soldering). The keg bung assembly 1002 may comprise a keg valve 1003 (e.g., a ball valve and venting valve with a tube attached, i.e., a keg spear). In some embodiments, a tube may not be attached. When the filling apparatus disclosed herein is coupled to the keg 1001 via the bung assembly 1002, the keg valve 1003 can be pressed open to allow for filling liquid into the keg 1001 while venting gas out of the keg 1001, as described herein.

Figure 10B:
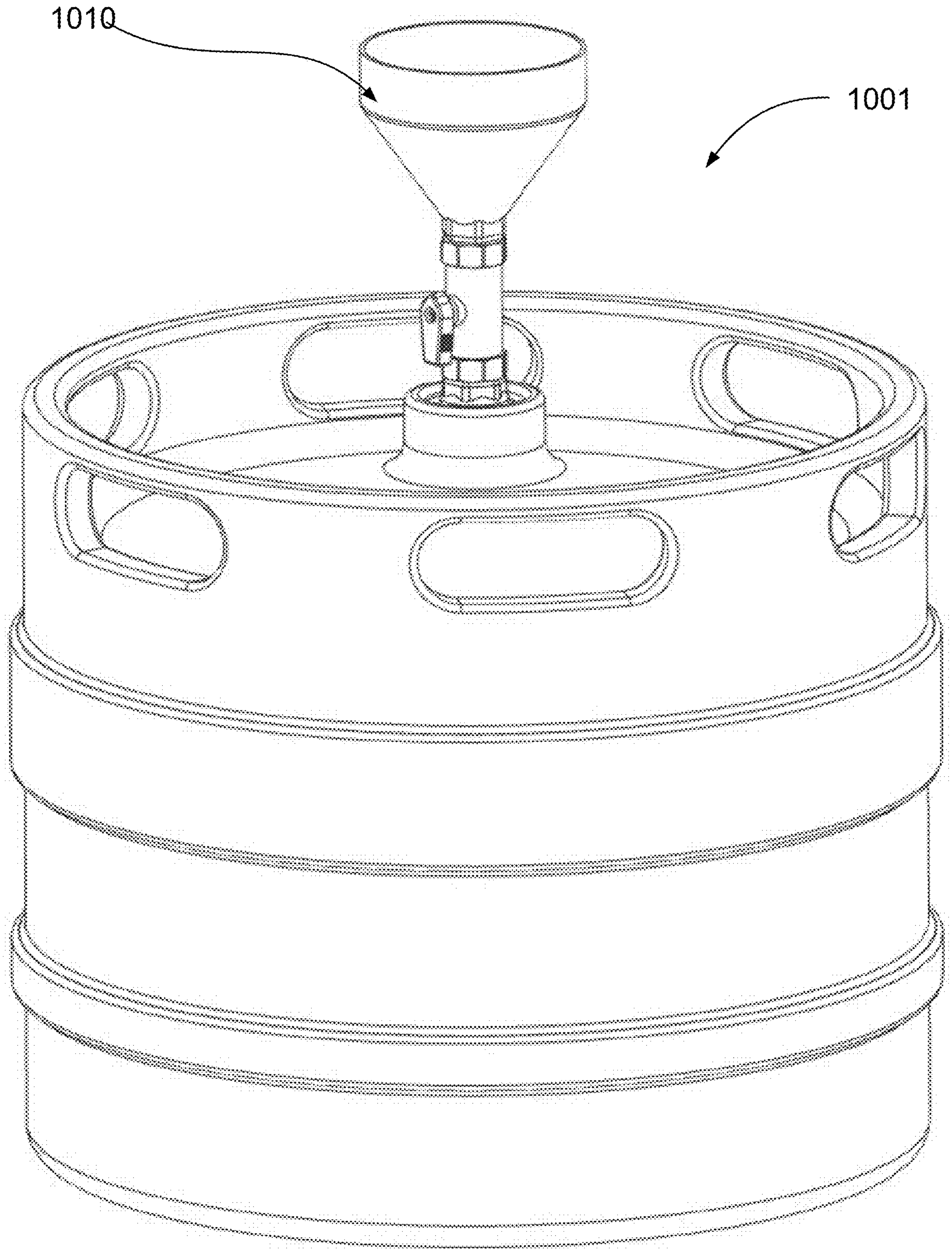
FIG. 10B illustrates a perspective view of a keg with a filling apparatus having a valve according to an exemplary embodiment engaged thereto.

FIG. 10B depicts a keg 1001 with a device 1010 according to exemplary embodiments engaged therewith. For example, the device may be that shown in FIG. 2 or FIG. 3. In other embodiments, the device depicted in FIGS. 4 or 5 may be used.

Figure 10C:
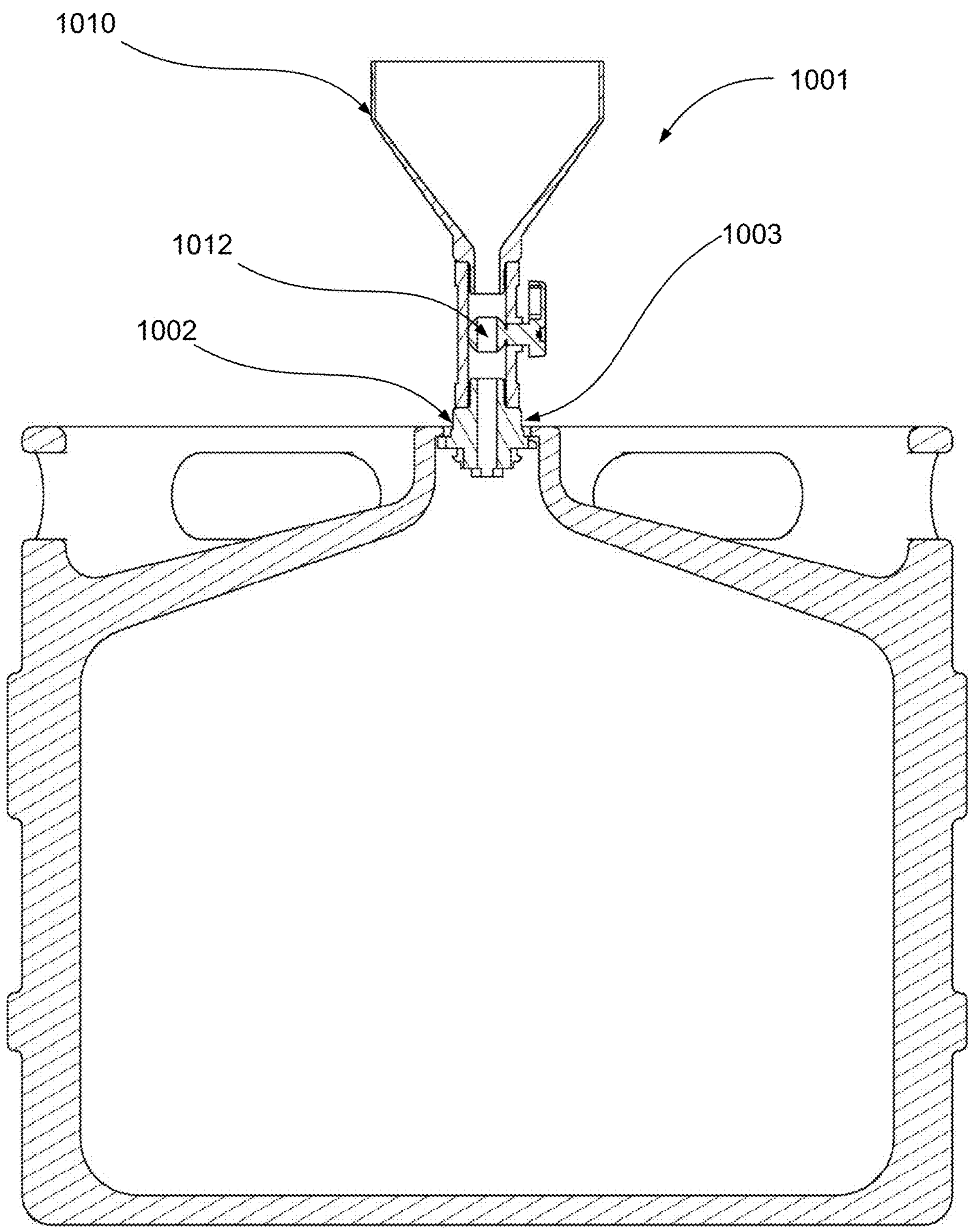
FIG. 10C illustrates a cross-section view of a keg with a filling apparatus having a valve according to an exemplary embodiment engaged thereto.

FIG. 10C shows a cross section of a keg 1001 with the device 1010 engaged thereto. Not shown in FIG. 10C is the keg spear portion which may extend downward into the keg from the keg bung assembly 1002. As shown in FIG. 10C, the valve assembly 1012 of the device is open, allowing for a direct liquid path from the device into the keg through the keg valve assembly 1003. Accordingly, since the device 1010 may depress the liquid or ball valve and the ring valve of the keg, liquid may be poured directly into the keg and gas from the keg, displaced by the liquid, may be vented to the atmosphere.

Figure 11A:
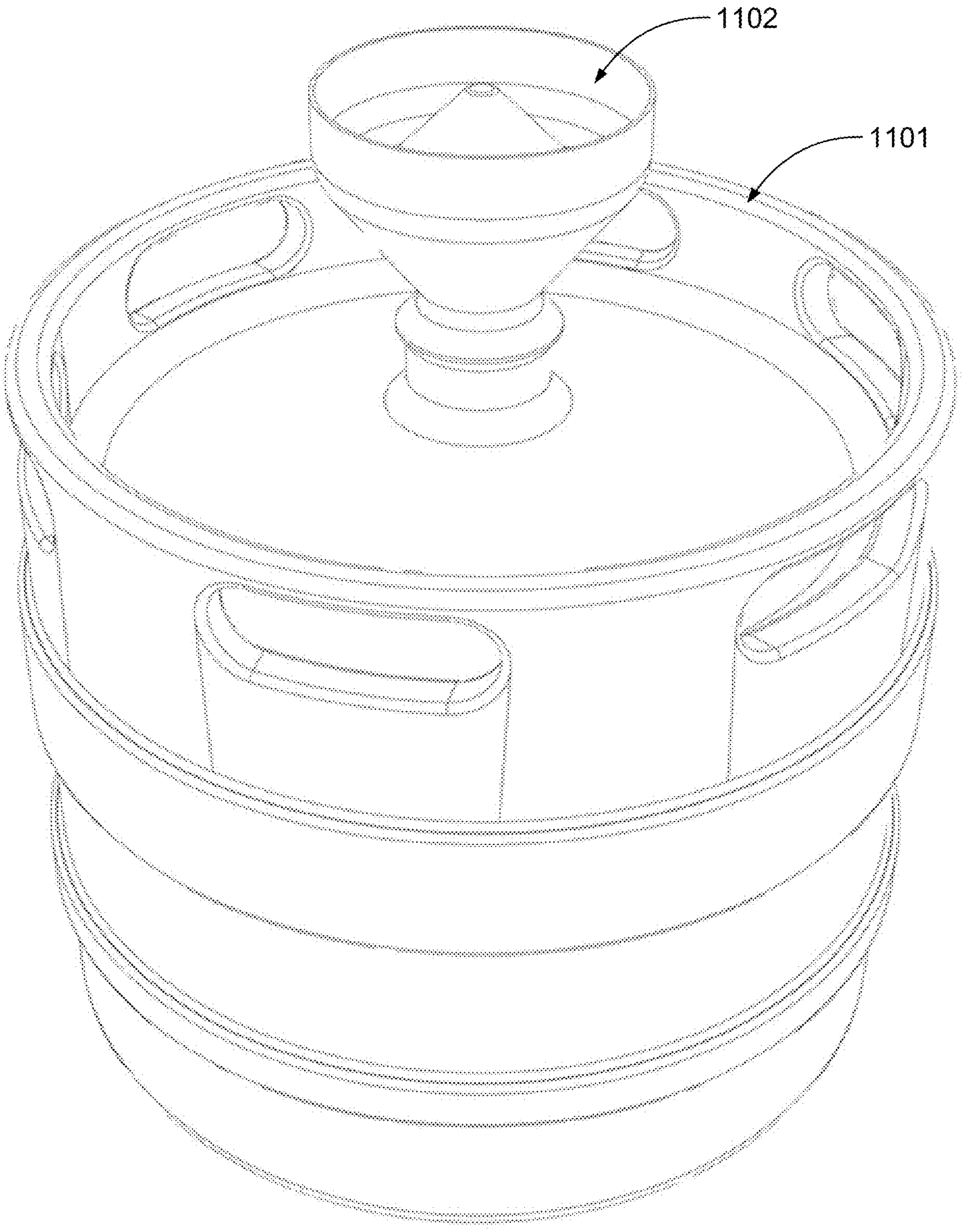
FIG. 11A illustrates a perspective view of a keg with a filling apparatus having deflector structure according to an exemplary embodiment engaged thereto.
Figure 11B:
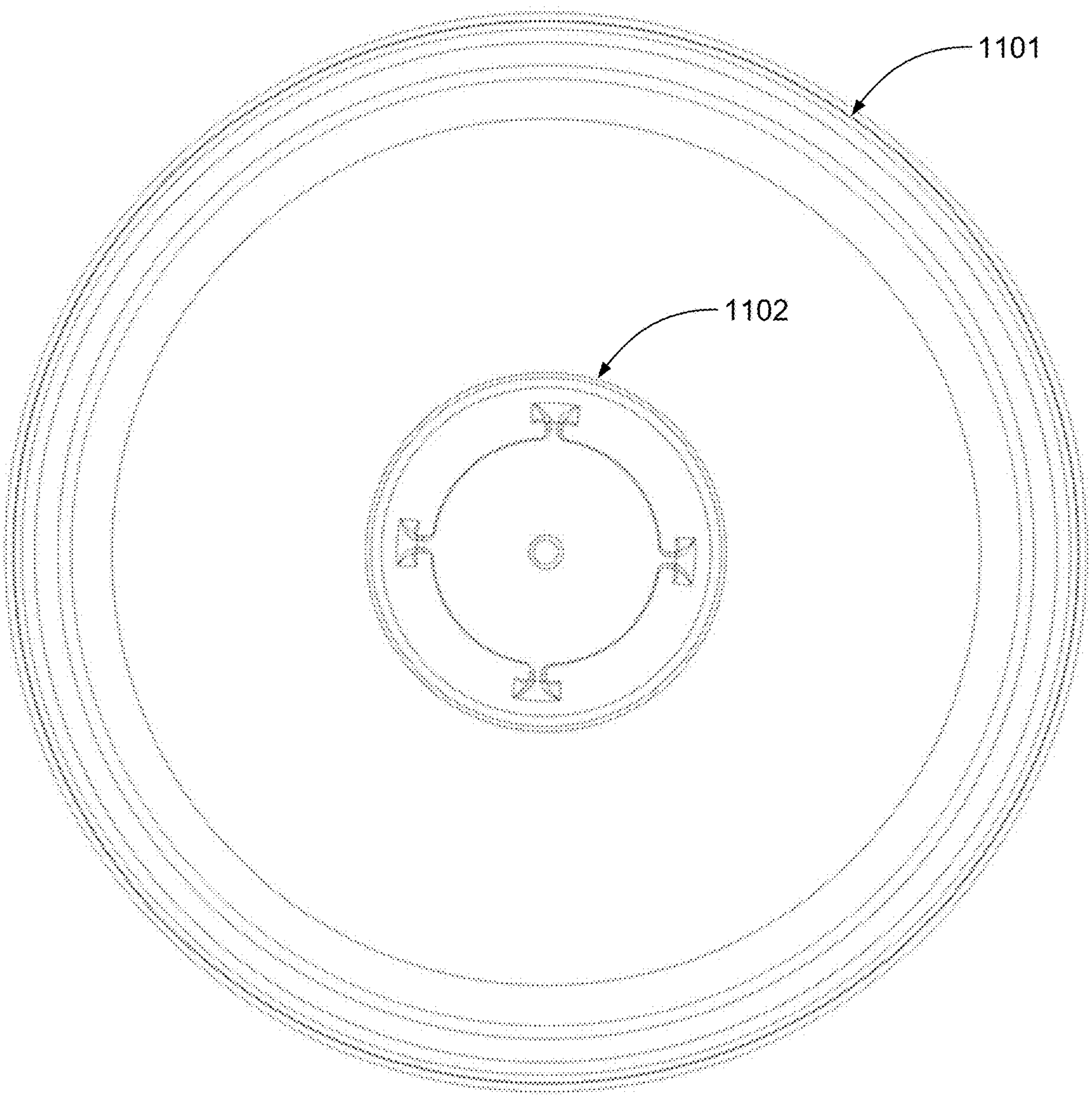
FIG. 11B illustrates a top view of a keg with a filling apparatus having deflector structure according to an exemplary embodiment engaged thereto.

FIG. 11A illustrates a top view of an example keg 1101, according to an embodiment of the invention. The keg 1101 may be the same as that shown in FIG. 10A. For example, the keg 1101 may be a conventional steel keg or a one-time use plastic keg. In various embodiments, the key may be of any type and may be made of any material, such as a recyclable material, plastic, metal. The keg may be clear or opaque. A filling apparatus 1102 may be attached to the keg 1101 as depicted. The filling apparatus 1102 may be similar to the apparatus depicted in FIG. 5 and described above. When the filling apparatus 1102 disclosed herein is coupled to the keg 1101 via the bung assembly (such as that depicted in FIG. 10A at 1002), a keg valve (such as valve 1003) can be pressed open to allow for filling liquid into the keg 1101 while venting gas out of the keg 1101, as described herein. FIG. 11B depicts a top view of keg 1101 with a device 1102 according to exemplary embodiments engaged therewith. For example, the device may be that shown in FIG. 5.

Figure 12:
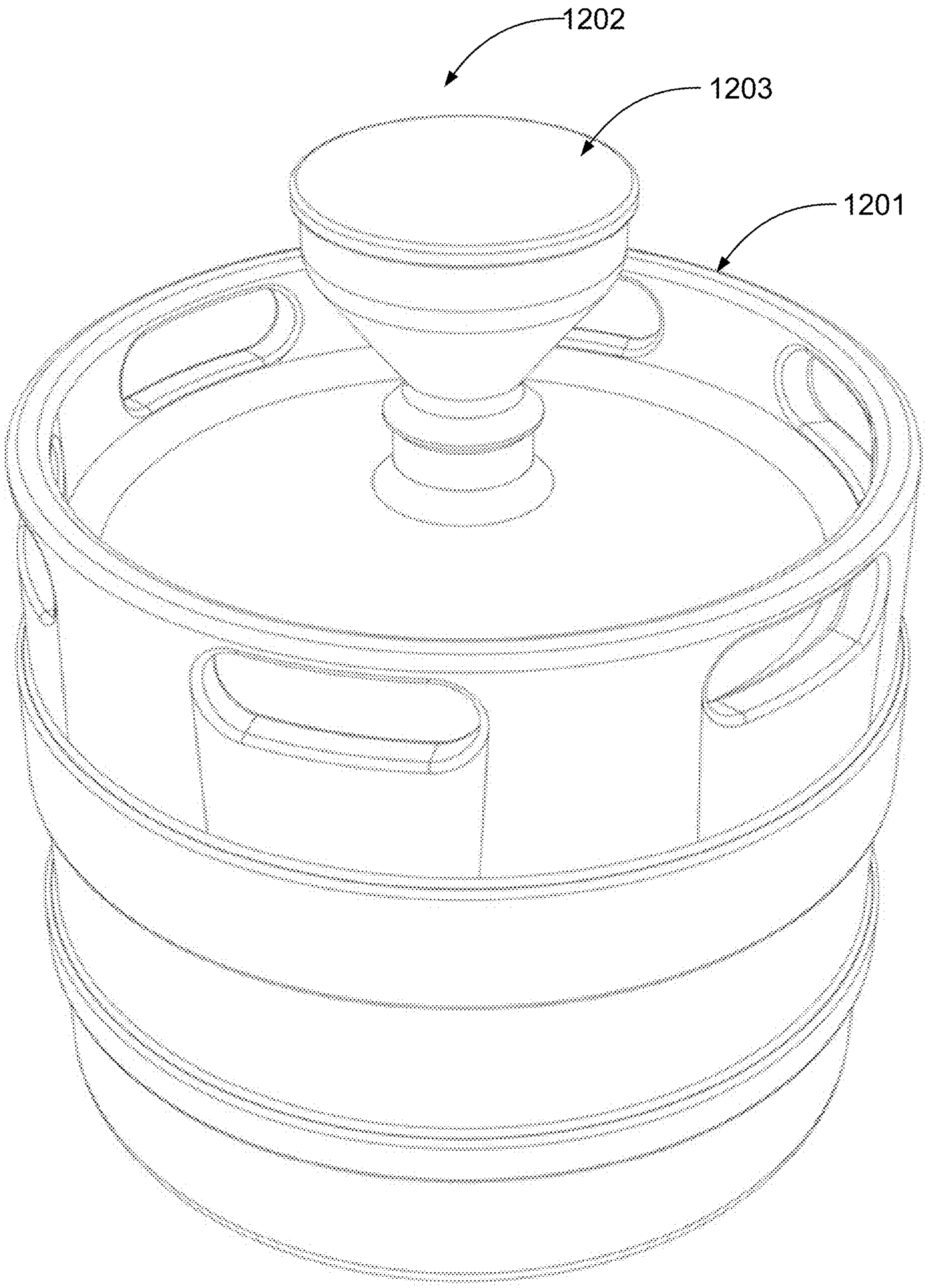
FIG. 12 illustrates a perspective view of a keg with a filling apparatus having a cap according to an exemplary embodiment engaged thereto.

FIG. 12 illustrates a top view of an example keg 1201, according to an embodiment of the invention. The keg 1201 may be the same as that shown in FIG. 10A. For example, the keg 1201 may be a conventional steel keg or a one-time use plastic keg. In various embodiments, the key may be of any type and may be made of any material, such as a recyclable material, plastic, metal. The keg may be clear or opaque. A filling apparatus 1202 may be attached to the keg 1201 as depicted. The filling apparatus 1202 may be similar to the apparatus depicted in FIG. 6 and described above. The filling apparatus 1202 is depicted with its cap 1203 in place. When the filling apparatus 1202 disclosed herein is coupled to the keg 1201 via the bung assembly (such as that depicted in FIG. 10A at 1002), a keg valve (such as valve 1003) can be pressed open to allow for filling liquid into the keg 1201 while venting gas out of the keg 1201, as described herein.

Figure 13A:
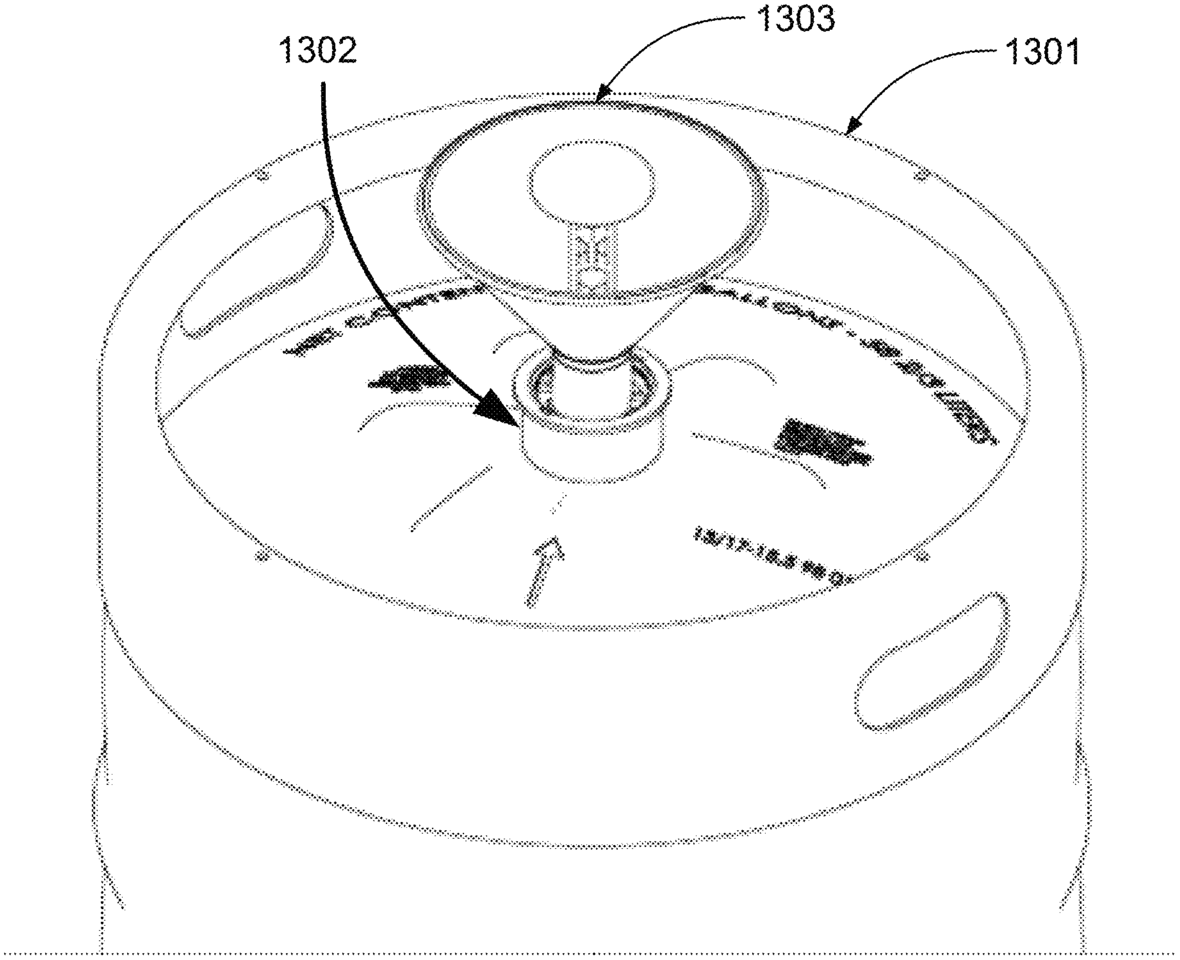
FIG. 13A illustrates a perspective view of the upper portion of a keg with a filling apparatus having a piston according to an exemplary embodiment engaged thereto.
Figure 13B:
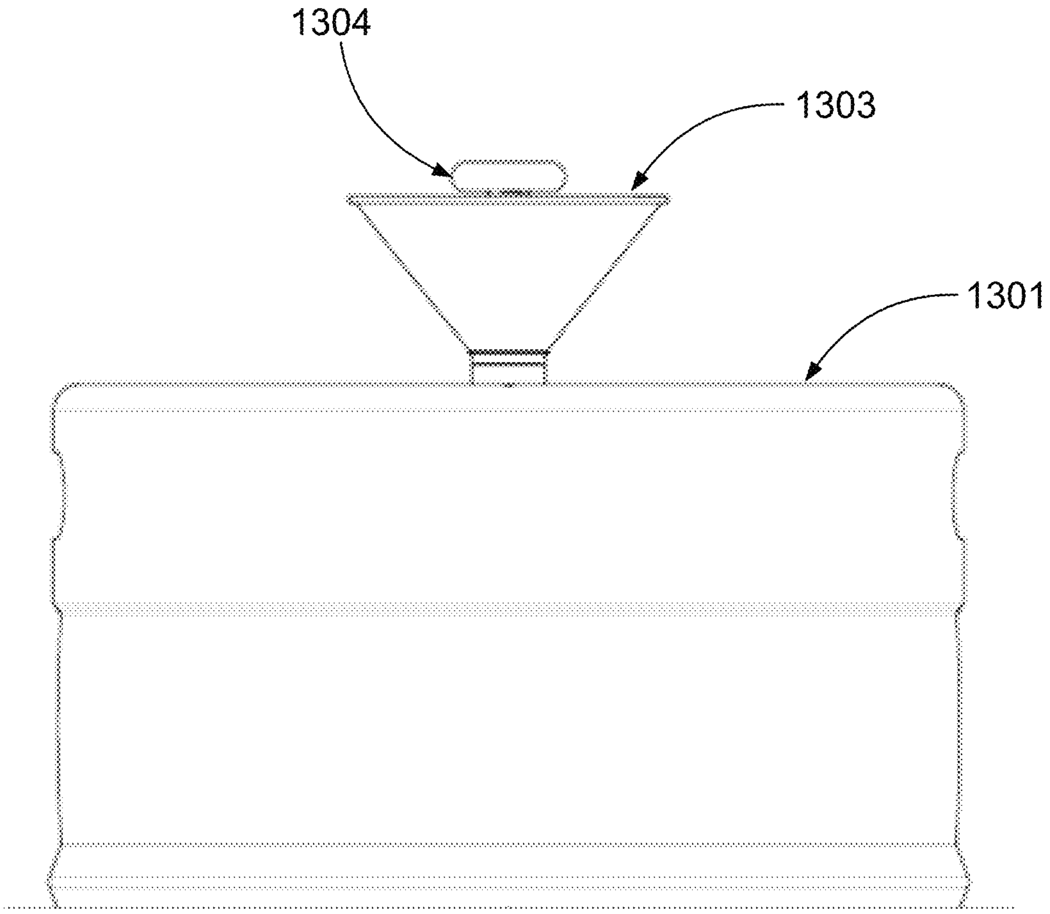
FIG. 13B illustrates a side view of the upper portion of a keg with a filling apparatus having a piston according to an exemplary embodiment engaged thereto.
Figure 13C:
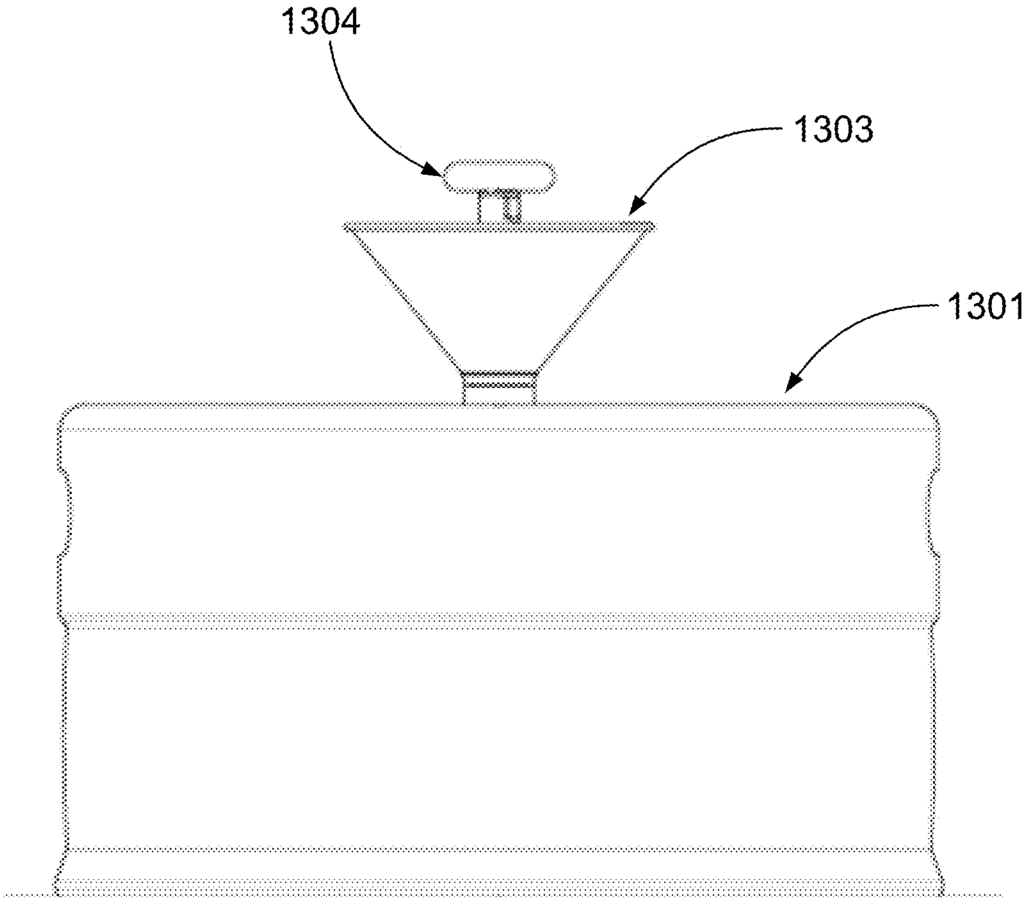
FIG. 13C illustrates a second side view of the upper portion of a keg with a filling apparatus having a piston according to an exemplary embodiment engaged thereto.

FIGS. 13A, 13B, and 13C (collectively referred to as FIG. 13) illustrate views of the upper portion of a keg 1301 according to an embodiment of the invention having a filling apparatus with a piston attached thereto. The keg 1301 may be of the same type as that depicted in FIGS. 10, 11, and/or 12. It should be appreciated that the markings/writing on the upper portion of the keg are exemplary and non-limiting. The keg 1301 may have a bung assembly 1302 containing a valve structure as described above (e.g., a valve having a ball and ring portion). The keg 1301 may have a filling apparatus 1303 engaged to the valve portion of the bung assembly 1302. The filling apparatus may be that according to exemplary embodiments. The filling apparatus 1303 may have a piston assembly 1304 as described above with respect to FIG. 7, although any of the filling apparatus described herein may be engaged to the keg 1301. In FIG. 13B, the piston assembly 1304 is in the lowered or engaged position. In FIG. 13C, the piston assembly 1304 is the raised or disengaged position.

Figure 14A:
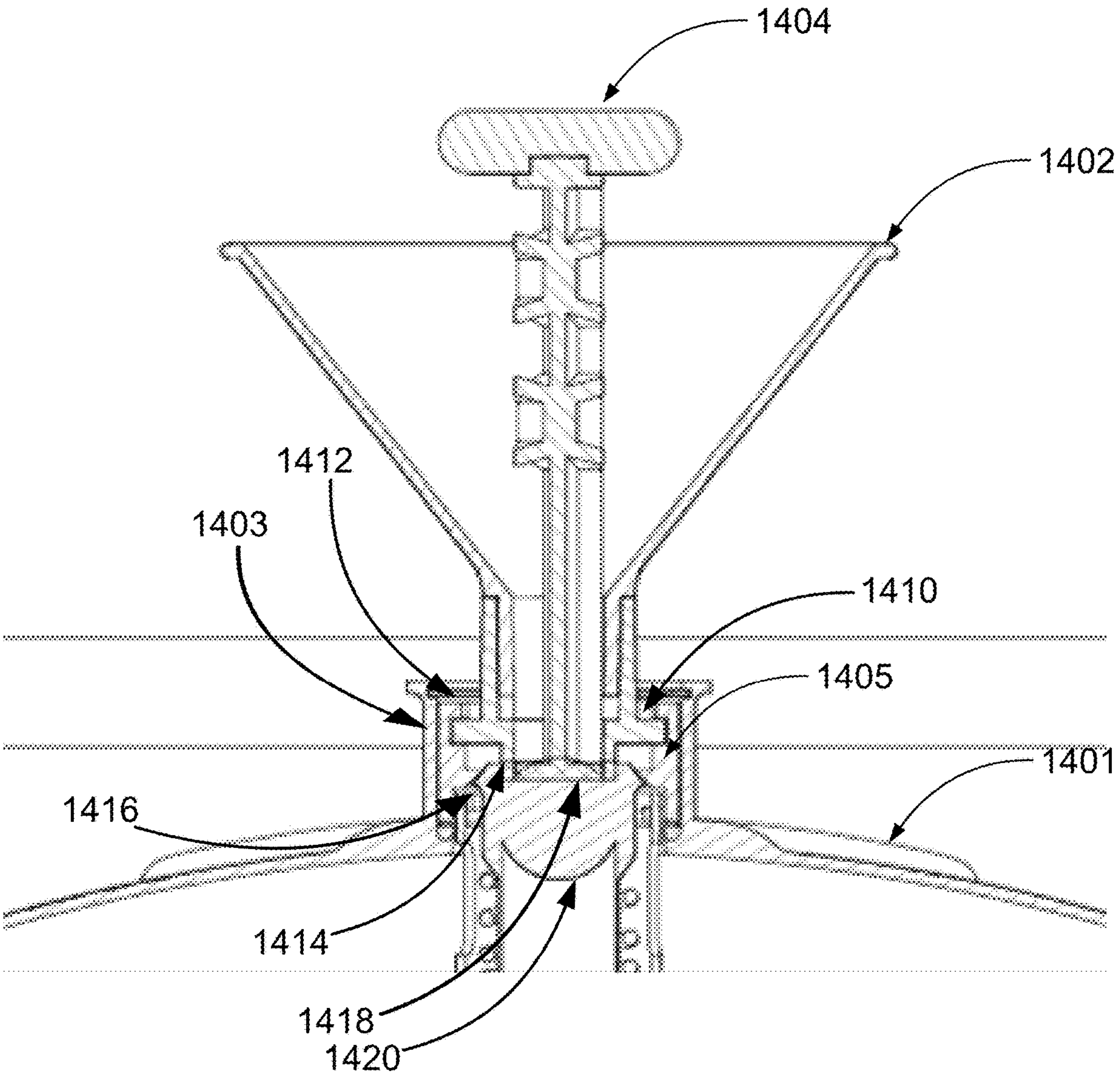
FIG. 14A illustrates cross-section of a side view of the upper portion of a keg with a filling apparatus having a piston with the piston in the raised position according to an exemplary embodiment engaged thereto.
Figure 14B:
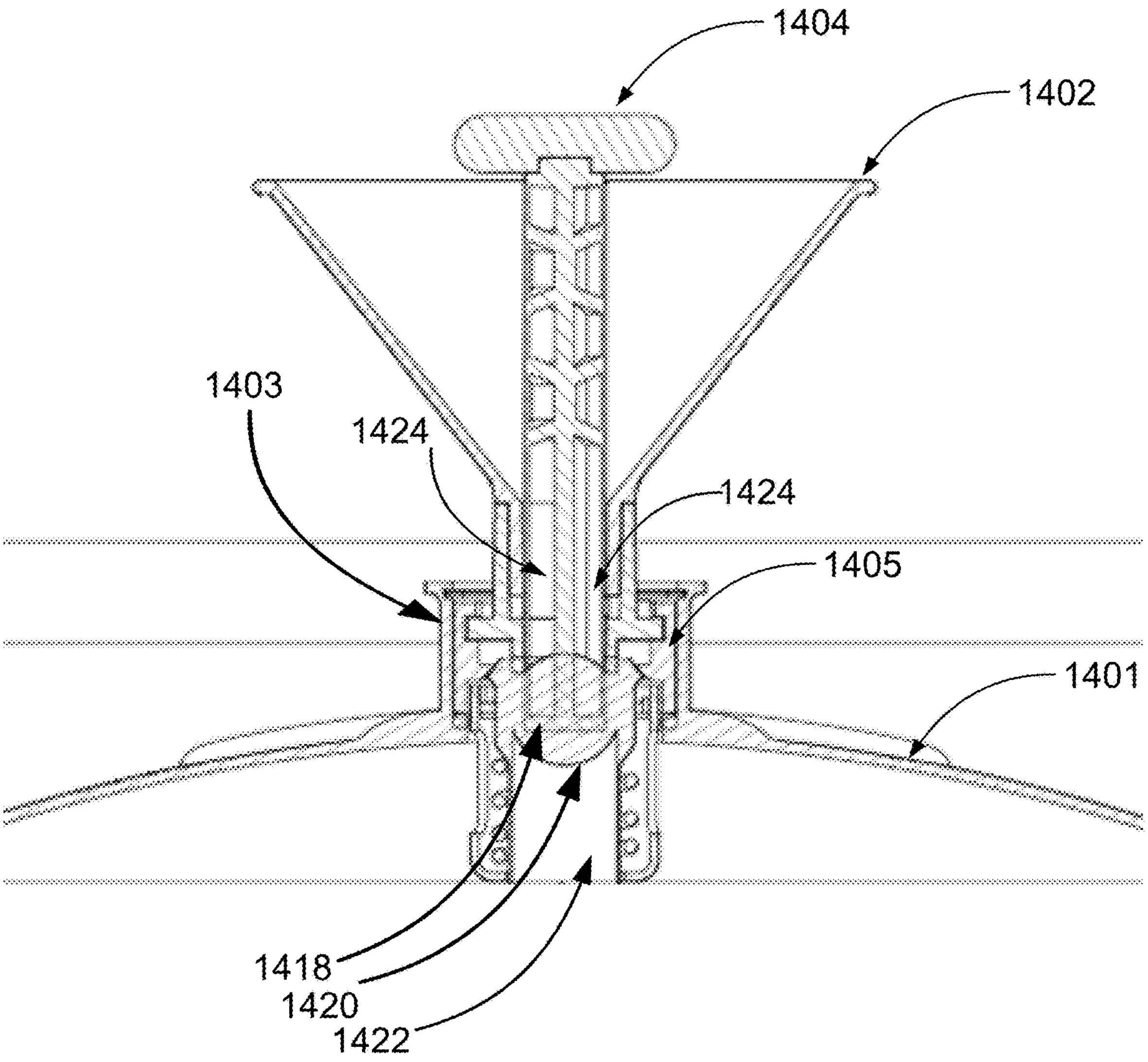
FIG. 14B illustrates cross-section of a side view of the upper portion of a keg with a filling apparatus having a piston with the piston in the lower position according to an exemplary embodiment engaged thereto.

FIGS. 14A and 14B (collectively referred to a FIG. 14) illustrate cross-section views of the upper portion of a keg 1401 according to an embodiment of the invention having a filling apparatus 1402 with a piston 1404 engaged to the bung assembly 1403 (specifically, engaged to the valve structure 1405 in the bung assembly). The cross-sections are taken along a similar line to that shown in FIG. 7B for the cross-section of FIG. 7J; stated differently, the cross-sections are taken in a plane parallel to the views of FIGS. 13B and 13C (that is, a plane running down the center of the device and keg). Only the top portion of the keg, containing the valve structure is shown for ease of illustration. In FIG. 14A, the piston 1404 is in the raised or disengaged position. In this position, the liquid pathway through the apparatus 1402 is closed. In FIG. 14B, the piston 1404 is in the lowered or engaged position. Once in the lowered or engaged position, the liquid pathway is created from the filling apparatus into the keg though the ball valve portion of the valve. A gas venting pathway is created once the filling apparatus is engaged with the keg through the ring valve portion of the valve. The gas venting pathway is open even with the piston in the raised position.

The filling apparatus 1402 may have a coupling or locking ring 1410 that mates with a flange portion 1412 of keg valve assembly. The locking ring 1410 is mated with the flange portion and rotated to engage the tabs on the flange portion. The tabs ride up on the ramp portion of the locking ring 1410. A probe portion 1414 of the filling apparatus 1402 engages with and depresses the ring valve portion 1416 of the keg valve assembly. The probe portion 1414 is dimensioned to press down the ring valve portion and allow gas to vent from the keg around the probe portion to the atmosphere. The piston 1404 in FIG. 14A is in the raised position. As such, the lower end 1418 of the piston is flush with the lower extremity of the filling apparatus (i.e., the probe portion 1414). In this position, ball valve 1420 is not engaged and no liquid pathway exists through the filling apparatus and no gas pathway exists for through this portion of the filling apparatus. Instead, the only venting pathway for gas in the keg to vent is through the ring valve portion. Thus, when the filling apparatus is first engaged with the keg, the piston is kept in this position and no liquid should spray or exit the keg during gassing through the filling apparatus. FIG. 14B depicts the piston 1404 in a lower or engaged position. In this position, the lower end 1418 of the piston is extended past the lower extremity of the filling apparatus and engaged with the ball valve 1420 such that the ball valve is depressed. A liquid pathway is now created from the filling apparatus into the keg through the ball valve and into the keg spear 1422. The liquid pathway may be that depicted in FIG. 7J. The liquid may flow down through the apparatus and around the piston through channels 1424 on the piston. The piston 1404 may be engaged and disengaged by pushing or pulling the piston. According to exemplary embodiments, the piston should be engaged following degassing of the keg and should be disengaged prior to removal of the piston from the keg.

Various embodiments of the invention provide a number of advantages. For example, the filling apparatus filling apparatus is easy to use, requiring little training and no other equipment or device. One person is able to use the filling apparatus effectively and easily, e.g., attach it to a keg and fill the keg with spirits using the filling apparatus. It is small enough to be transported easily and stored in a small space. It requires very little expertise to use effectively. The combination of the keg partially filled with a liquid, non-alcoholic pre-mix for a mixed drink, and the filling apparatus which can be easily used by a bartender or restaurant worker to add alcohol to the partially-filled keg in predetermined amounts, together enable a bar or restaurant to efficiently make and serve mixed drinks of consistently high quality on draft using standard, widely deployed coupling and serving equipment, such as the Sankey-D coupler and taps.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

Although some embodiments of the invention are illustrated and described herein as embodied in a hand-held pressure release and gravity filling funnel, it is not intended to be limited to the details shown because various modifications and structural changes may be made therein without departing from the spirit of the invention and within the scope and range of equivalents of the attributes described. Additionally, well-known elements of exemplary embodiments of the invention are not described in detail or omitted so as not to obscure the relevant details of the invention.

Further, it is to be understood that the terminology used herein is for the purpose of describing particular embodiments only and is not intended to be limiting. The terms "a" or "an" as used herein, are defined as one or more than one. The term "plurality" as used herein, is defined as two or more than two. The term "another" as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper," "lower," "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. The term "funnel axis" should be understood to mean in a direction corresponding to the funnel channel.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

What is claimed is:

1. An apparatus for pouring alcohol into a keg, comprising:

an upper hollow body connected to a lower portion, the lower portion comprising a locking ring to lock the apparatus onto the keg, and a probe to displace at least a portion of a valve on the keg, allowing gas to escape from the keg and allowing the alcohol to be poured into the keg through the upper hollow body and exiting through a lower extremity of the lower portion into the keg.

2. A method of distributing mixed drinks using the apparatus of claim 1, the method comprising:

providing the keg containing a non-alcoholic mix of liquids, wherein the mix is designed to be converted to a mixed drink by addition of the alcohol; a quantity of mix in the keg is predetermined to allow for the addition of a predetermined quantity of the alcohol into the keg to complete the mixed drink; and the valve on the keg is designed to connect to a coupler used to dispense beverages from the keg;

providing the apparatus to engage the keg and for pouring the alcohol into the keg, and providing instructions for actuating at least a portion of the valve to open a liquid pathway though the apparatus to allow the alcohol to be poured into the keg through the upper hollow body and exiting through the lower portion into the keg.

3. The method of claim 2, wherein the valve comprises a Sankey-D valve.

4. The method of claim 2, further comprising providing the instructions to an end user regarding the process for installing the apparatus on the keg.

5. The method of claim 4, wherein the instructions include amounts and types of alcohol to be added to the mix in the keg.

6. The method of claim 2, wherein:

the quantity of mix is about two thirds of a capacity of the keg, and the quantity of the alcohol is about one third of the capacity of the keg.

7. A method of preparing mixed drinks using the apparatus of claim 1, the method comprising:

receiving the keg containing a non-alcoholic mix of liquids, wherein (a) the mix is designed to be converted to a mixed drink by addition of the alcohol; (b) the quantity of the mix in the keg is predetermined to allow for the addition of a predetermined quantity of the alcohol into the keg to complete the mixed drink; and (c) the valve on the keg is designed to be connected to a coupler through which the mixed drink is dispensed; and using the apparatus to pour the alcohol into the keg.

8. The method of claim 7, wherein the keg comprises a Sankey-D valve.

9. The method of claim 7, further comprising:

mixing the mix with the alcohol to complete the mixed drink in the keg;

connecting the keg to a Sankey-D coupler; and dispensing the mixed drink through a tap connected to the Sankey-D coupler.

10. The apparatus of claim 1, wherein the lower portion is designed to enable a flow rate of one liter of the alcohol into the keg in about twenty seconds or less.

11. The apparatus of claim 1, wherein the keg comprises a Sankey-D valve, and wherein the locking ring and the probe are sized to engage the Sankey-D valve.

12. The apparatus of claim 1, wherein the keg includes a non-alcoholic mix of liquids designed to be converted to a mixed drink by addition of the alcohol.

13. The apparatus of claim 12, wherein a quantity of the non-alcoholic mix is about two thirds of a capacity of the keg, and a quantity of the alcohol is about one third of the capacity of the keg.

14. An apparatus for pouring alcohol into a keg, comprising:

an upper hollow body connected to a lower portion, the lower portion comprising a locking mechanism to lock the apparatus onto the keg, and a probe to displace at least a portion of a valve on the keg, allowing gas to escape from the keg and allowing the alcohol to be poured into the keg through the upper hollow body and exiting through a lower extremity of the lower portion into the keg, wherein the keg includes a non-alcoholic mix of liquids designed to be converted to a mixed drink by addition of the alcohol.

15. The apparatus of claim 14, wherein the keg comprises a Sankey-D valve, and wherein the probe is sized to engage the Sankey-D valve.

16. The apparatus of claim 14, wherein the upper hollow body approximates a funnel shape.

* * * * *